United States Patent
Huynh et al.

(10) Patent No.: US 10,671,944 B2
(45) Date of Patent: Jun. 2, 2020

(54) METHOD FOR SELLING AND SEARCHING FOR ITEMS

(71) Applicant: Amazon Technologies, Inc., Seattle, WA (US)

(72) Inventors: Steve Huynh, Seattle, WA (US); Owen Cummings, Seattle, WA (US); Karl Gohde, Issaquah, WA (US); Antonio Gabriel Perez de Tejada Martinez, Seattle, WA (US); Adam Douglas Morley, Seattle, WA (US); Graham Pedersen, Seattle, WA (US); James Christopher Sorenson, III, Seattle, WV (US)

(73) Assignee: Amazon Technologies, Inc., Seattle, WA (US)

( * ) Notice: Subject to any disclaimer, the term of this patent is extended or adjusted under 35 U.S.C. 154(b) by 627 days.

(21) Appl. No.: 15/369,941

(22) Filed: Dec. 6, 2016

(65) Prior Publication Data
US 2018/0157997 A1 Jun. 7, 2018

(51) Int. Cl.
*G06F 9/44* (2018.01)
*G06K 19/06* (2006.01)
(Continued)

(52) U.S. Cl.
CPC ......... *G06Q 10/02* (2013.01); *G06Q 30/0625* (2013.01)

(58) Field of Classification Search
CPC .................... G06Q 10/02; G06F 16/24561
See application file for complete search history.

(56) References Cited

U.S. PATENT DOCUMENTS

| 6,093,216 A * | 7/2000 | Adl-Tabatabai .... G06F 9/45516 707/999.202 |
| 8,870,084 B2 * | 10/2014 | Hamman .............. H04L 9/0866 235/380 |

(Continued)

FOREIGN PATENT DOCUMENTS

| EP | 1566753 A2 | 8/2005 |
| WO | 9847081 A1 | 10/1998 |
| WO | 2008106293 A1 | 9/2008 |

OTHER PUBLICATIONS

International Search Report and Written Opinion in PCT/US2017/063973, dated Apr. 10, 2018.

(Continued)

*Primary Examiner* — Talia F Crawley
(74) *Attorney, Agent, or Firm* — Pierce Atwood LLP

(57) ABSTRACT

A system capable of identifying and locking resources (e.g., items, tickets, etc.) may map resources to a bit vector and use bit vectors to efficiently identify and lock the resources. For example, tickets to a concert may be mapped to a bit vector and the system may generate an availability bit vector indicating an availability of the seat locations. Thus, the tickets may be reserved by changing a binary value for bits corresponding to individual tickets. In addition, the system may generate bit vectors corresponding to metadata associated with the seat locations (e.g., aisle seat, handicap accessible, first ten rows, back ten rows, etc.), allowing the system to easily identify available seat locations that satisfy the search request. As the bit vectors are relatively small and can be processed easily, the system may improve a latency and reduce an error rate associated with searching for and reserving seat locations.

20 Claims, 33 Drawing Sheets

(51) Int. Cl.
*H04L 9/08* (2006.01)
*G06Q 20/38* (2012.01)
*G06Q 20/40* (2012.01)
*G06Q 10/02* (2012.01)
*G06Q 30/06* (2012.01)

(56) References Cited

U.S. PATENT DOCUMENTS

| | | | | |
|---|---|---|---|---|
| 2004/0139070 | A1* | 7/2004 | Dysart | G06F 16/951 |
| 2005/0187962 | A1* | 8/2005 | Grondin | G06F 16/1744 |
| 2005/0235226 | A1* | 10/2005 | Watanabe | G06F 3/04812 |
| | | | | 715/835 |
| 2007/0266044 | A1* | 11/2007 | Grondin | G06F 16/1744 |
| 2008/0228533 | A1* | 9/2008 | McGuire | G06Q 10/02 |
| | | | | 705/5 |
| 2013/0062420 | A1* | 3/2013 | Hamman | H04L 9/0866 |
| | | | | 235/494 |
| 2013/0212071 | A1* | 8/2013 | Grondin | G06F 16/1744 |
| | | | | 707/661 |
| 2015/0199620 | A1* | 7/2015 | Towfiq | G09G 5/391 |
| | | | | 705/5 |
| 2016/0085832 | A1* | 3/2016 | Lam | G06F 16/24561 |
| | | | | 707/722 |
| 2017/0161650 | A1* | 6/2017 | McGuire | G06Q 10/02 |

OTHER PUBLICATIONS

The Examiner's attention is hereby drawn to the specification and file history of co-pending U.S. Appl. No. 15/370,060, entitled "Method For Selling and Searching For Items", filed Dec. 6, 2016, which may contain information relevant to the present application.
International Preliminary Report on Patentability dated Jun. 20, 2019 in International Application No. PCT/US2017/063973.

\* cited by examiner

FIG. 1
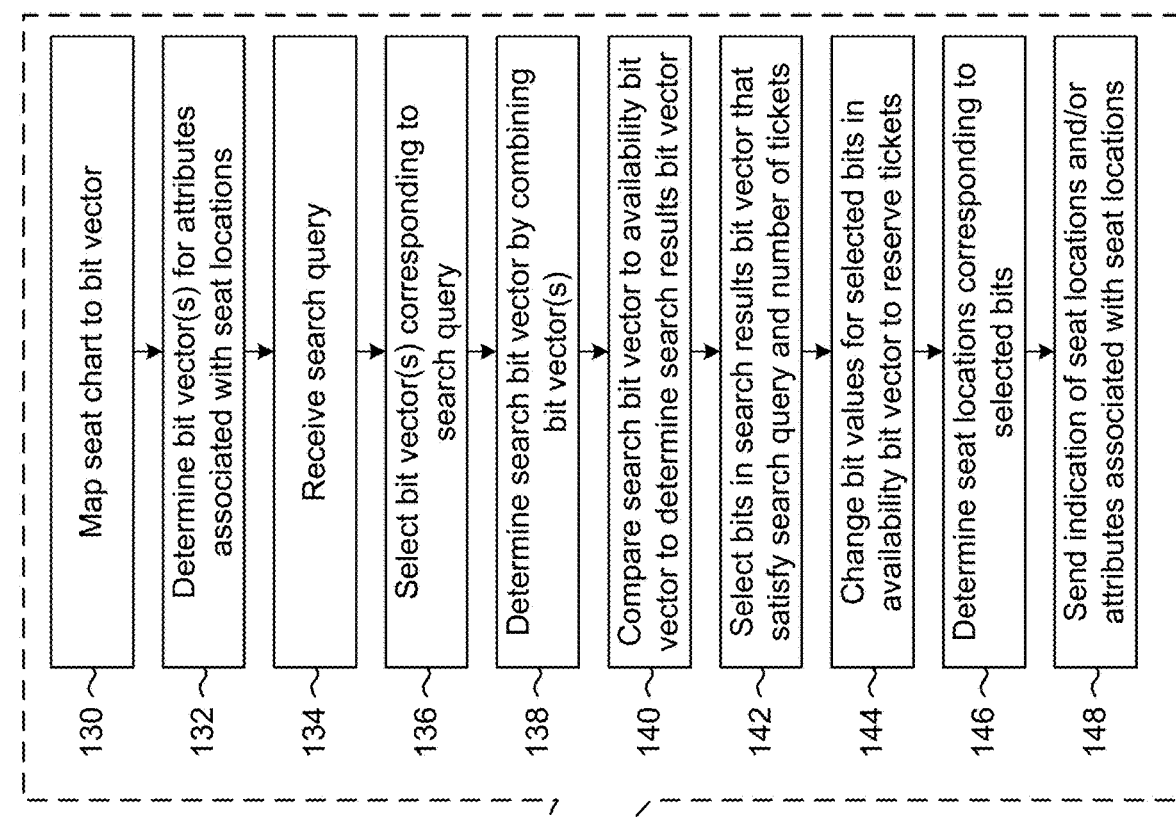
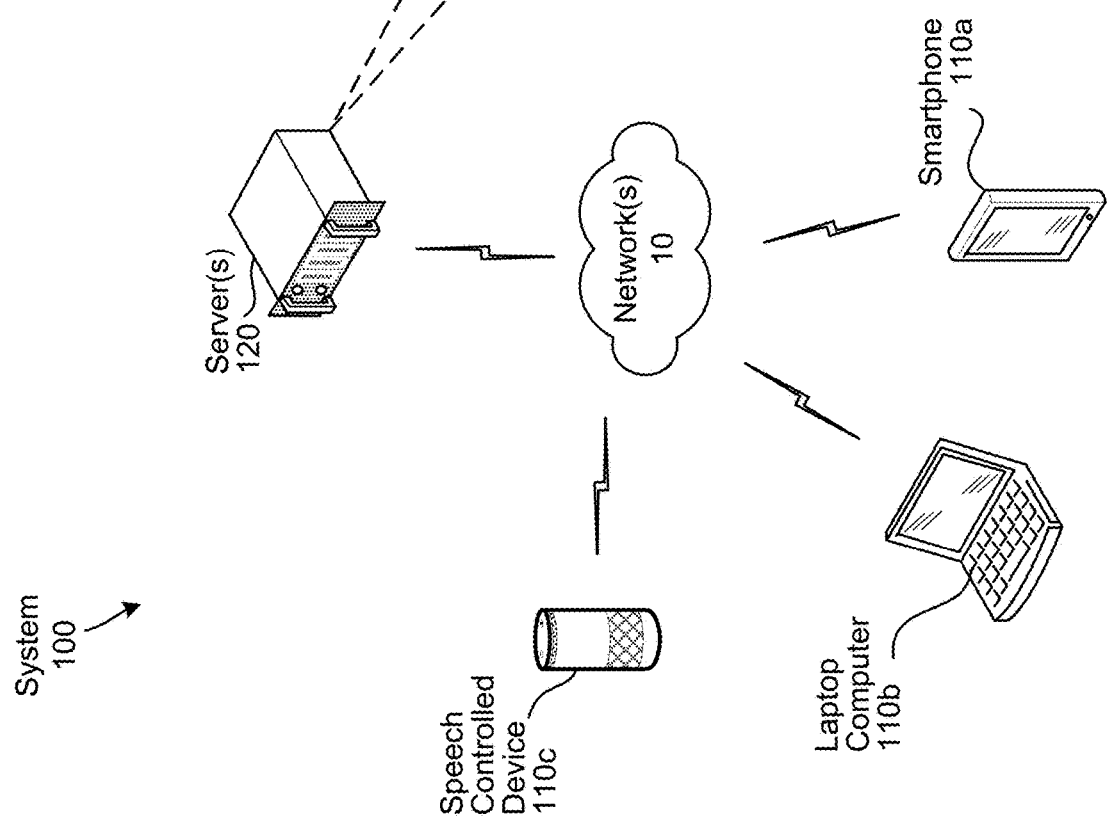

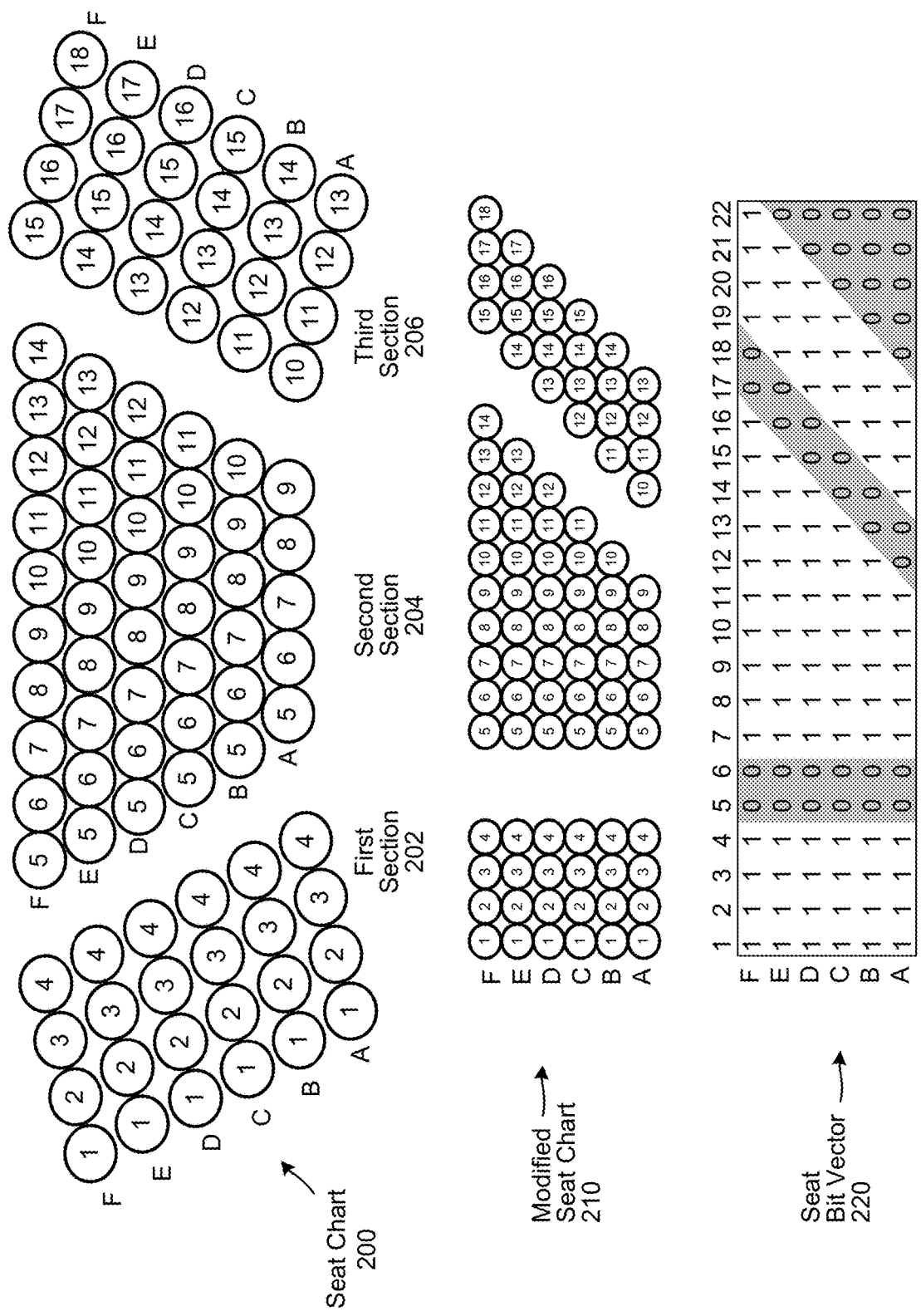

FIG. 2C
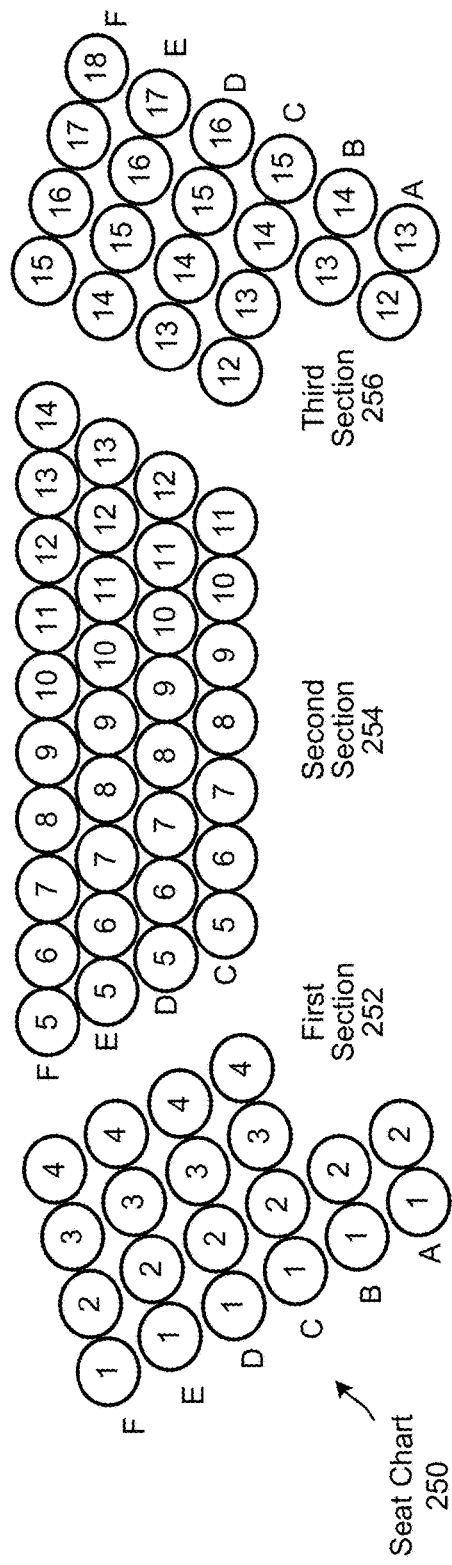
Seat Chart 250
Modified Seat Chart 260
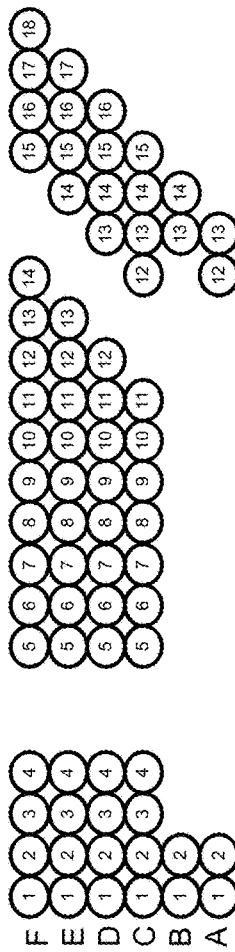
Seat Bit Vector 270

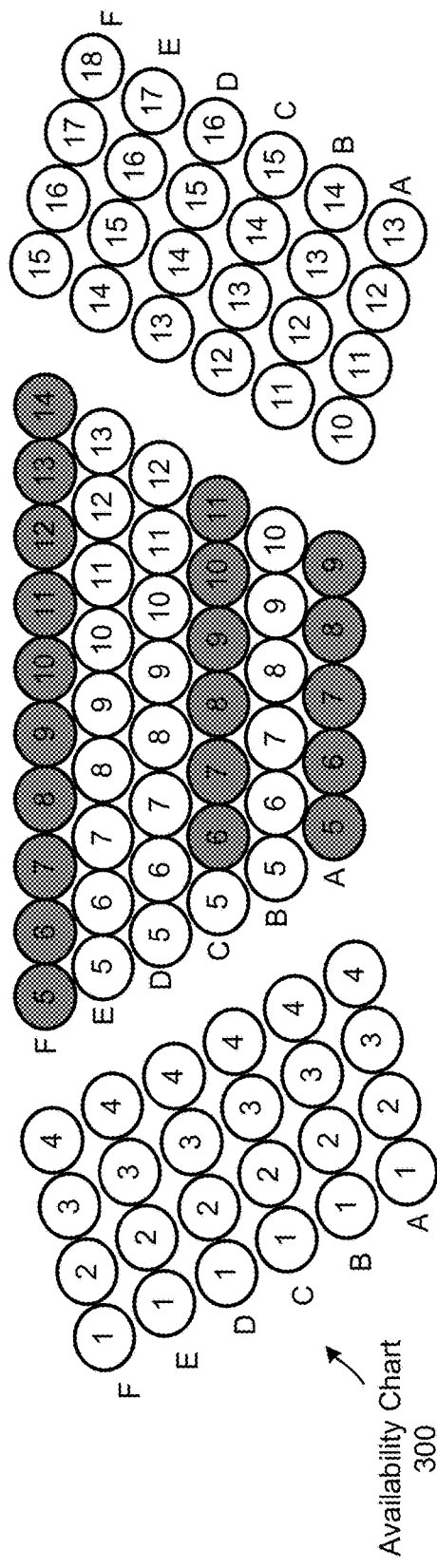
FIG. 3A
Availability Chart 300
Modified Availability Chart 310
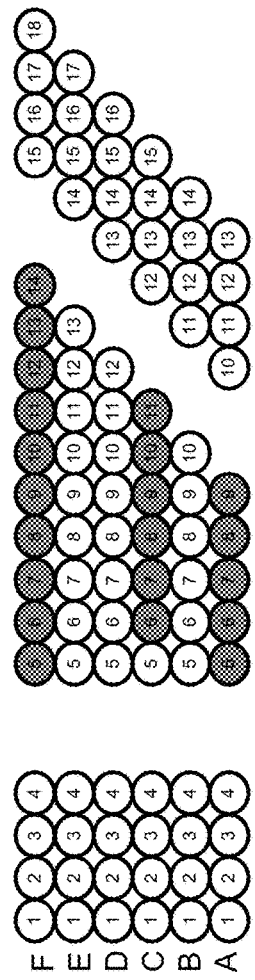
Availability Bit Vector 320

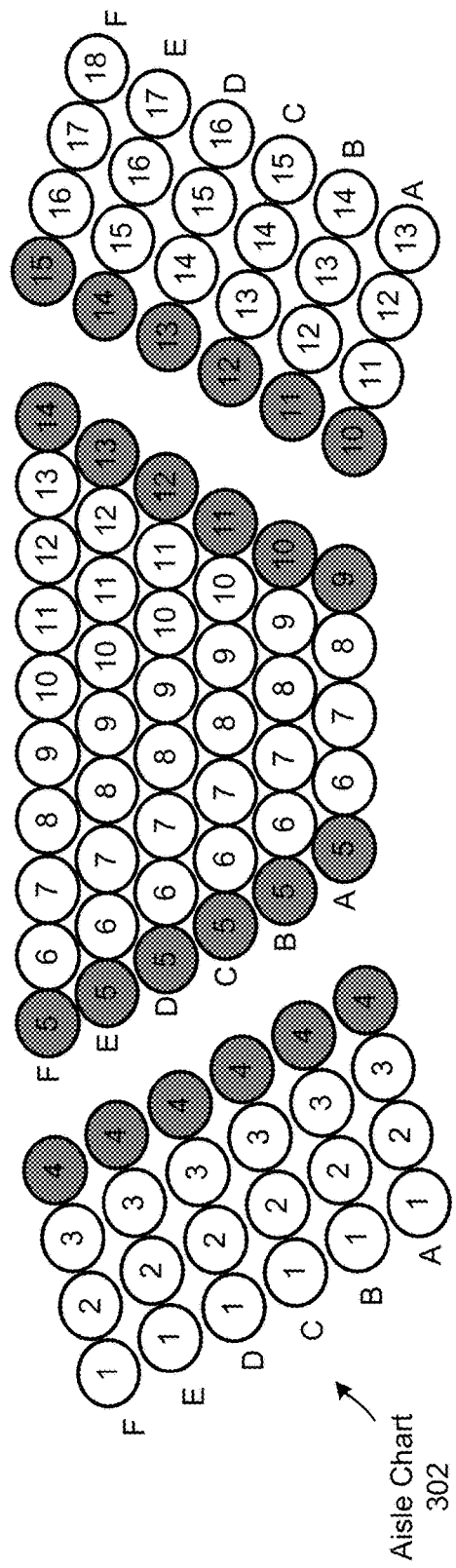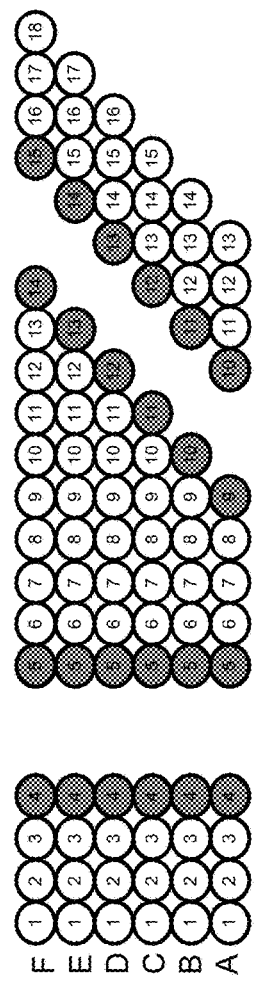
FIG. 3B
Aisle Chart 302
Modified Aisle Chart 312
Aisle Bit Vector 322

FIG. 3C
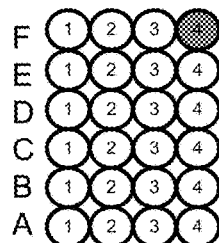
Handicap Accessible Chart 314
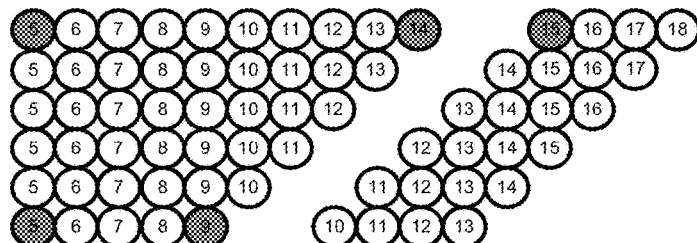
Handicap Accessible Bit Vector 324
FIG. 3D
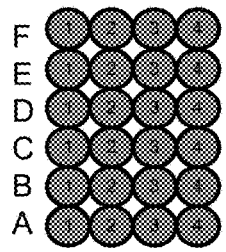
Price Chart 316
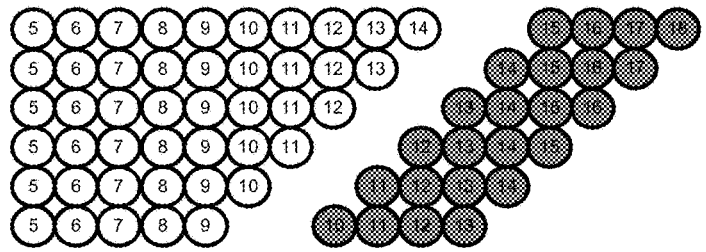
Price Bit Vector 326

FIG. 3E
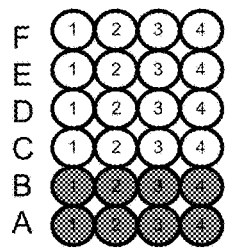
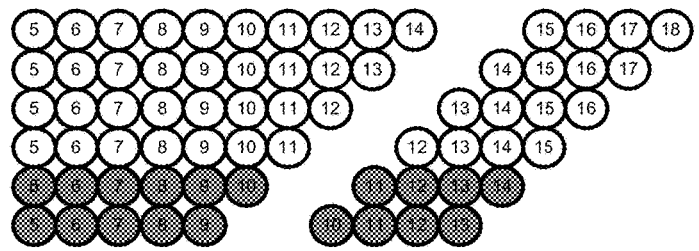
Front Rows Chart 330
Front Rows Bit Vector 340
FIG. 3F
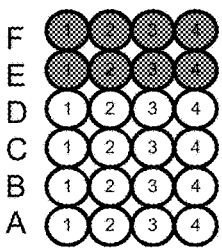
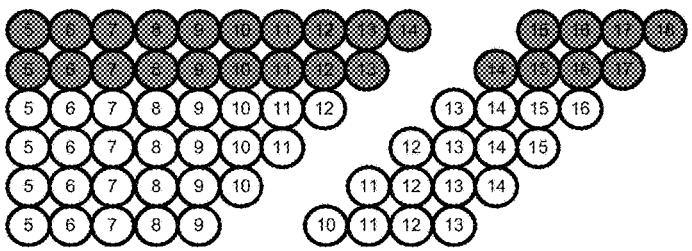
Back Rows Chart 332
Back Rows Bit Vector 342

FIG. 4B
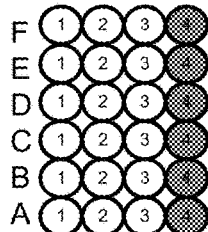
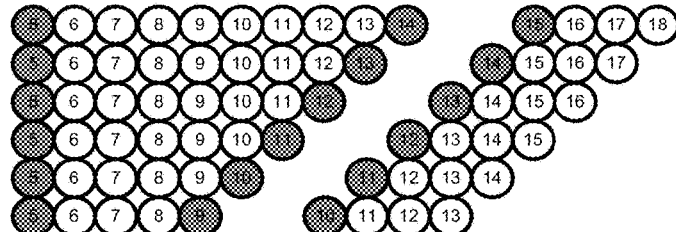
Aisle Chart 410
Aisle Bit Vector 420
Reserving three seat locations
Modified Aisle Bit Vector 440
Seat Bit Vector 220
Masked Aisle Bit Vector 442

Reserving three seat locations

FIG. 5A

|   | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|----|----|----|----|----|----|----|----|----|----|----|----|----|
| F | 1 | 1 | 1 | 1 | 0 | 0 | 0 | 0 | 0 | 0 | 0 | 0 | 0 | 0 | 0 | 0 | 0 | 0 | 1 | 1 | 1 | 1 |
| E | 1 | 1 | 1 | 1 | 0 | 0 | 1 | 1 | 1 | 1 | 1 | 1 | 1 | 1 | 1 | 0 | 0 | 1 | 1 | 1 | 1 | 0 |
| D | 1 | 1 | 1 | 1 | 0 | 0 | 1 | 1 | 1 | 1 | 1 | 1 | 1 | 1 | 0 | 0 | 1 | 1 | 1 | 1 | 0 | 0 |
| C | 1 | 1 | 1 | 1 | 0 | 0 | 1 | 0 | 0 | 0 | 0 | 0 | 0 | 0 | 0 | 1 | 1 | 1 | 1 | 0 | 0 | 0 |
| B | 1 | 1 | 1 | 1 | 0 | 0 | 1 | 1 | 1 | 1 | 1 | 1 | 0 | 0 | 1 | 1 | 1 | 1 | 0 | 0 | 0 | 0 |
| A | 1 | 1 | 1 | 1 | 0 | 0 | 0 | 0 | 0 | 0 | 0 | 0 | 0 | 1 | 1 | 1 | 1 | 0 | 0 | 0 | 0 | 0 |

Availability Bit Vector 320

|   | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|----|----|----|----|----|----|----|----|----|----|----|----|----|
| F | 0 | 1 | 1 | 1 | 1 | 1 | 1 | 1 | 1 | 0 | 0 | 0 | 0 | 1 | 1 | 1 | 1 | 1 | 1 | 1 | 1 | 0 |
| E | 0 | 1 | 1 | 1 | 1 | 1 | 1 | 1 | 1 | 0 | 0 | 0 | 1 | 1 | 1 | 1 | 1 | 1 | 1 | 1 | 0 | 0 |
| D | 0 | 1 | 1 | 1 | 1 | 1 | 1 | 1 | 1 | 0 | 0 | 1 | 1 | 1 | 1 | 1 | 1 | 1 | 1 | 0 | 0 | 0 |
| C | 0 | 1 | 1 | 1 | 1 | 1 | 1 | 1 | 1 | 0 | 1 | 1 | 1 | 1 | 1 | 1 | 1 | 1 | 0 | 0 | 0 | 0 |
| B | 0 | 1 | 1 | 1 | 1 | 1 | 1 | 1 | 1 | 1 | 1 | 1 | 1 | 1 | 1 | 1 | 1 | 0 | 0 | 0 | 0 | 0 |
| A | 0 | 1 | 1 | 1 | 1 | 1 | 1 | 1 | 1 | 1 | 1 | 1 | 1 | 1 | 1 | 1 | 0 | 0 | 0 | 0 | 0 | 0 |

Modified Aisle Bit Vector 440

|   | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|----|----|----|----|----|----|----|----|----|----|----|----|----|
| F | 0 | 1 | 1 | 1 | 0 | 0 | 0 | 0 | 0 | 0 | 0 | 0 | 0 | 0 | 0 | 0 | 0 | 0 | 1 | 1 | 1 | 0 |
| E | 0 | 1 | 1 | 1 | 0 | 0 | 1 | 1 | 1 | 0 | 0 | 0 | 1 | 1 | 1 | 0 | 0 | 1 | 1 | 1 | 0 | 0 |
| D | 0 | 1 | 1 | 1 | 0 | 0 | 1 | 1 | 1 | 0 | 0 | 1 | 1 | 1 | 0 | 0 | 1 | 1 | 1 | 0 | 0 | 0 |
| C | 0 | 1 | 1 | 1 | 0 | 0 | 1 | 0 | 0 | 0 | 0 | 0 | 0 | 0 | 0 | 1 | 1 | 1 | 0 | 0 | 0 | 0 |
| B | 0 | 1 | 1 | 1 | 0 | 0 | 1 | 1 | 1 | 1 | 1 | 1 | 0 | 0 | 1 | 1 | 1 | 0 | 0 | 0 | 0 | 0 |
| A | 0 | 1 | 1 | 1 | 0 | 0 | 0 | 0 | 0 | 0 | 0 | 0 | 0 | 1 | 1 | 1 | 0 | 0 | 0 | 0 | 0 | 0 |

Search Results Bit Vector 540

FIG. 5B

|  | | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|---|
| Availability Bit Vector 320 | F | 1 | 1 | 1 | 1 | 0 | 0 | 0 | 0 | 0 | 0 | 0 | 0 | 0 | 0 | 0 | 0 | 0 | 0 | 1 | 1 | 1 | 1 |
| | E | 1 | 1 | 1 | 1 | 0 | 0 | 1 | 1 | 1 | 1 | 1 | 1 | 1 | 1 | 0 | 0 | 1 | 1 | 1 | 1 | 1 | 0 |
| | D | 1 | 1 | 1 | 1 | 0 | 0 | 1 | 1 | 1 | 1 | 1 | 1 | 1 | 0 | 0 | 1 | 1 | 1 | 1 | 0 | 0 | 0 |
| | C | 1 | 1 | 1 | 1 | 0 | 0 | 1 | 0 | 0 | 0 | 0 | 0 | 0 | 0 | 1 | 1 | 1 | 1 | 0 | 0 | 0 | 0 |
| | B | 1 | 1 | 1 | 1 | 0 | 0 | 1 | 1 | 1 | 1 | 1 | 1 | 0 | 0 | 1 | 1 | 1 | 1 | 0 | 0 | 0 | 0 |
| | A | 1 | 1 | 1 | 1 | 0 | 0 | 0 | 0 | 0 | 0 | 0 | 0 | 0 | 1 | 1 | 1 | 1 | 0 | 0 | 0 | 0 | 0 |

|  | | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|---|
| Modified Handicap Accessible Bit Vector 480 | F | 0 | 1 | 1 | 1 | 1 | 1 | 1 | 1 | 1 | 0 | 0 | 0 | 0 | 1 | 1 | 1 | 1 | 1 | 1 | 1 | 1 | 0 |
| | E | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | D | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | C | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | B | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | A | 0 | 1 | 1 | 1 | 1 | 1 | 1 | 1 | 1 | 1 | 1 | 1 | 0 | 0 | 0 | 0 | 0 | 0 | 0 | 0 | 0 | 0 |

|  | | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|---|
| Search Results Bit Vector 542 | F | 0 | 1 | 1 | 1 | 0 | 0 | 0 | 0 | 0 | 0 | 0 | 0 | 0 | 0 | 0 | 0 | 0 | 0 | 1 | 1 | 1 | 0 |
| | E | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | D | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | C | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | B | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | A | 0 | 1 | 1 | 1 | 0 | 0 | 0 | 0 | 0 | 0 | 0 | 0 | 0 | 0 | 0 | 0 | 0 | 0 | 0 | 0 | 0 | 0 |

FIG. 6A

Price Bit Vector 610

|   | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|----|----|----|----|----|----|----|----|----|----|----|----|----|
| F | 1 | 1 | 1 | 1 | 0 | 0 | 0 | 0 | 0 | 0 | 0 | 0 | 0 | 0 | 0 | 0 | 0 | 0 | 1 | 1 | 1 | 1 |
| E | 1 | 1 | 1 | 1 | 0 | 0 | 0 | 0 | 0 | 0 | 0 | 0 | 0 | 0 | 0 | 0 | 1 | 1 | 1 | 1 | 0 |
| D | 1 | 1 | 1 | 1 | 0 | 0 | 0 | 0 | 0 | 0 | 0 | 0 | 0 | 0 | 0 | 1 | 1 | 1 | 1 | 0 | 0 |
| C | 1 | 1 | 1 | 1 | 0 | 0 | 0 | 0 | 0 | 0 | 0 | 0 | 0 | 0 | 1 | 1 | 1 | 1 | 0 | 0 | 0 |
| B | 1 | 1 | 1 | 1 | 0 | 0 | 0 | 0 | 0 | 0 | 0 | 0 | 0 | 1 | 1 | 1 | 1 | 0 | 0 | 0 | 0 |
| A | 1 | 1 | 1 | 1 | 0 | 0 | 0 | 0 | 0 | 0 | 0 | 0 | 1 | 1 | 1 | 1 | 0 | 0 | 0 | 0 | 0 |

Front Rows Bit Vector 620

|   | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|----|----|----|----|----|----|----|----|----|----|----|----|----|
| F | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| E | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| D | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| C | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| B | 1 | 1 | 1 | 1 | 0 | 0 | 1 | 1 | 1 | 1 | 1 | 1 | 0 | 0 | 1 | 1 | 1 | 1 | 0 | 0 | 0 | 0 |
| A | 1 | 1 | 1 | 1 | 0 | 0 | 1 | 1 | 1 | 1 | 0 | 0 | 1 | 1 | 1 | 1 | 0 | 0 | 0 | 0 | 0 | 0 |

Modified Aisle Bit Vector 630

|   | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|----|----|----|----|----|----|----|----|----|----|----|----|----|
| F | 0 | 1 | 1 | 1 | 1 | 1 | 1 | 1 | 1 | 0 | 0 | 0 | 0 | 1 | 1 | 1 | 1 | 1 | 1 | 1 | 1 | 0 |
| E | 0 | 1 | 1 | 1 | 1 | 1 | 1 | 1 | 1 | 0 | 0 | 0 | 1 | 1 | 1 | 1 | 1 | 1 | 1 | 1 | 0 | 0 |
| D | 0 | 1 | 1 | 1 | 1 | 1 | 1 | 1 | 1 | 0 | 0 | 1 | 1 | 1 | 1 | 1 | 1 | 1 | 1 | 0 | 0 | 0 |
| C | 0 | 1 | 1 | 1 | 1 | 1 | 1 | 1 | 1 | 0 | 1 | 1 | 1 | 1 | 1 | 1 | 1 | 1 | 0 | 0 | 0 | 0 |
| B | 0 | 1 | 1 | 1 | 1 | 1 | 1 | 1 | 1 | 1 | 1 | 1 | 1 | 1 | 1 | 1 | 1 | 0 | 0 | 0 | 0 | 0 |
| A | 0 | 1 | 1 | 1 | 1 | 1 | 1 | 1 | 1 | 1 | 1 | 1 | 1 | 1 | 1 | 1 | 0 | 0 | 0 | 0 | 0 | 0 |

Search Bit Vector 640

|   | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|----|----|----|----|----|----|----|----|----|----|----|----|----|
| F | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| E | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| D | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| C | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| B | 0 | 1 | 1 | 1 | 0 | 0 | 0 | 0 | 0 | 0 | 0 | 0 | 0 | 1 | 1 | 1 | 1 | 0 | 0 | 0 | 0 | 0 |
| A | 0 | 1 | 1 | 1 | 0 | 0 | 0 | 0 | 0 | 0 | 0 | 0 | 1 | 1 | 1 | 1 | 0 | 0 | 0 | 0 | 0 | 0 |

FIG. 6B

FIG. 7B
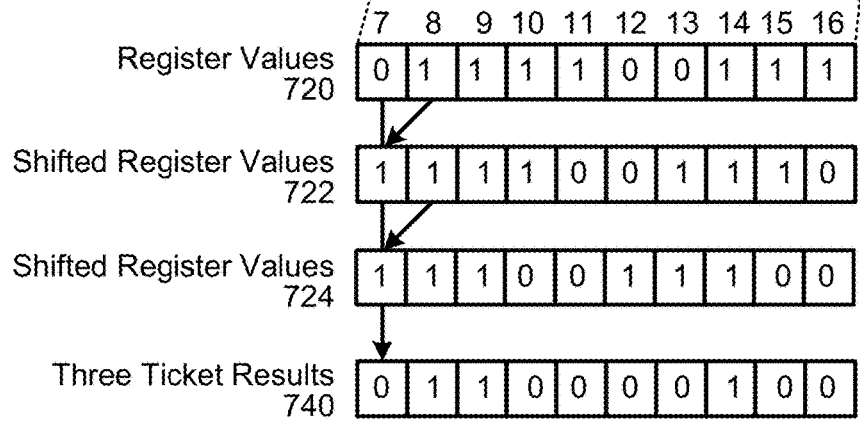
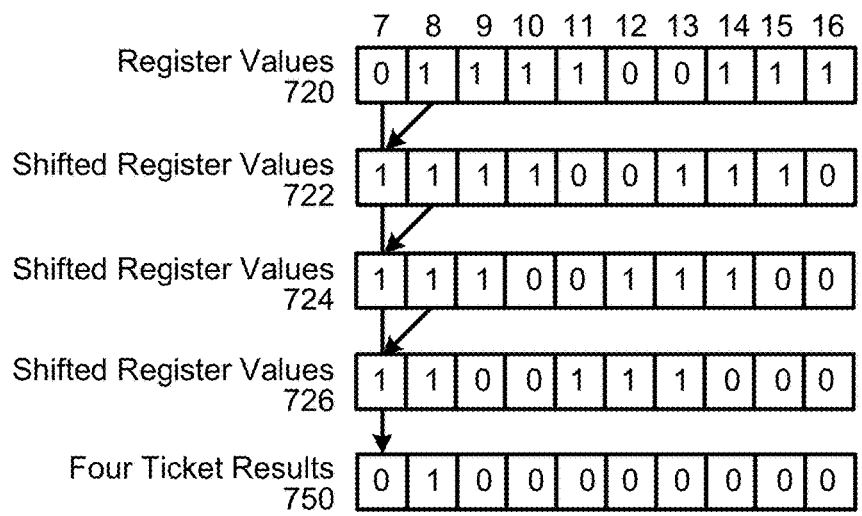

FIG. 7C

Search Results Bit Vector 710

|   | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|----|----|----|----|----|----|----|----|----|----|----|----|----|
| F | 1 | 1 | 1 | 1 | 0 | 0 | 0 | 1 | 1 | 1  | 0  | 0  | 1  | 1  | 1  | 0  | 0  | 1  | 1  | 1  | 1  | 1  |
| E | 1 | 1 | 1 | 1 | 0 | 0 | 1 | 1 | 1 | 1  | 1  | 1  | 1  | 1  | 0  | 0  | 1  | 1  | 1  | 1  | 0  |
| D | 1 | 1 | 1 | 1 | 0 | 0 | 1 | 1 | 1 | 1  | 1  | 1  | 1  | 0  | 0  | 1  | 1  | 1  | 1  | 0  | 0  |
| C | 1 | 1 | 1 | 1 | 0 | 0 | 1 | 0 | 0 | 0  | 0  | 0  | 0  | 0  | 1  | 1  | 1  | 1  | 0  | 0  | 0  |
| B | 1 | 1 | 1 | 1 | 0 | 0 | 1 | 1 | 1 | 1  | 1  | 0  | 0  | 0  | 0  | 1  | 1  | 0  | 0  | 0  | 0  |
| A | 1 | 1 | 1 | 1 | 0 | 0 | 0 | 0 | 0 | 0  | 0  | 0  | 0  | 1  | 1  | 0  | 0  | 0  | 0  | 0  | 0  |

Reserving two seat locations

Search Results Bit Vector 712

|   | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|----|----|----|----|----|----|----|----|----|----|----|----|----|
| F | 1 | 1 | 1 | 0 | 0 | 0 | 0 | 1 | 1 | 1  | 0  | 0  | 0  | 1  | 1  | 0  | 0  | 0  | 1  | 1  | 1  | 0  |
| E | 1 | 1 | 1 | 0 | 0 | 0 | 1 | 1 | 1 | 1  | 1  | 1  | 1  | 0  | 0  | 0  | 1  | 1  | 1  | 0  | 0  |
| D | 1 | 1 | 1 | 0 | 0 | 0 | 1 | 1 | 1 | 1  | 1  | 1  | 0  | 0  | 0  | 1  | 1  | 1  | 0  | 0  | 0  |
| C | 1 | 1 | 1 | 0 | 0 | 0 | 0 | 0 | 0 | 0  | 0  | 0  | 0  | 0  | 0  | 1  | 1  | 1  | 0  | 0  | 0  |
| B | 1 | 1 | 1 | 0 | 0 | 0 | 1 | 1 | 1 | 1  | 0  | 0  | 0  | 0  | 0  | 1  | 0  | 0  | 0  | 0  | 0  |
| A | 1 | 1 | 1 | 0 | 0 | 0 | 0 | 0 | 0 | 0  | 0  | 0  | 0  | 0  | 1  | 0  | 0  | 0  | 0  | 0  | 0  | 0  |

Reserving three seat locations

Search Results Bit Vector 714

|   | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|----|----|----|----|----|----|----|----|----|----|----|----|----|
| F | 1 | 1 | 0 | 0 | 0 | 0 | 0 | 1 | 1 | 0  | 0  | 0  | 0  | 1  | 0  | 0  | 0  | 0  | 1  | 1  | 0  | 0  |
| E | 1 | 1 | 0 | 0 | 0 | 0 | 1 | 1 | 1 | 1  | 1  | 1  | 0  | 0  | 0  | 0  | 1  | 1  | 0  | 0  | 0  |
| D | 1 | 1 | 0 | 0 | 0 | 0 | 1 | 1 | 1 | 1  | 1  | 0  | 0  | 0  | 0  | 1  | 1  | 0  | 0  | 0  | 0  |
| C | 1 | 1 | 0 | 0 | 0 | 0 | 0 | 0 | 0 | 0  | 0  | 0  | 0  | 0  | 0  | 1  | 1  | 0  | 0  | 0  | 0  |
| B | 1 | 1 | 0 | 0 | 0 | 0 | 1 | 1 | 1 | 0  | 0  | 0  | 0  | 0  | 0  | 0  | 0  | 0  | 0  | 0  | 0  |
| A | 1 | 1 | 0 | 0 | 0 | 0 | 0 | 0 | 0 | 0  | 0  | 0  | 0  | 0  | 0  | 0  | 0  | 0  | 0  | 0  | 0  | 0  |

Reserving four seat locations

Search Results Bit Vector 716

|   | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|----|----|----|----|----|----|----|----|----|----|----|----|----|
| F | 1 | 0 | 0 | 0 | 0 | 0 | 0 | 1 | 0 | 0  | 0  | 0  | 0  | 0  | 0  | 0  | 0  | 1  | 0  | 0  | 0  |
| E | 1 | 0 | 0 | 0 | 0 | 0 | 1 | 1 | 1 | 1  | 0  | 0  | 0  | 0  | 1  | 0  | 0  | 0  | 0  | 0  |
| D | 1 | 0 | 0 | 0 | 0 | 0 | 1 | 1 | 1 | 1  | 0  | 0  | 0  | 0  | 1  | 0  | 0  | 0  | 0  | 0  |
| C | 1 | 0 | 0 | 0 | 0 | 0 | 0 | 0 | 0 | 0  | 0  | 0  | 0  | 0  | 1  | 0  | 0  | 0  | 0  | 0  |
| B | 1 | 0 | 0 | 0 | 0 | 0 | 1 | 1 | 0 | 0  | 0  | 0  | 0  | 0  | 0  | 0  | 0  | 0  | 0  | 0  |
| A | 1 | 0 | 0 | 0 | 0 | 0 | 0 | 0 | 0 | 0  | 0  | 0  | 0  | 0  | 0  | 0  | 0  | 0  | 0  | 0  |

FIG. 8B

Search Results Bit Vector 710

|   | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|----|----|----|----|----|----|----|----|----|----|----|----|----|
| F | 1 | 1 | 1 | 1 | 0 | 0 | 0 | 1 | 1 | 1  | 1  | 0  | 0  | 1  | 1  | 1  | 0  | 0  | 1  | 1  | 1  | 1  |
| E | 1 | 1 | 1 | 1 | 0 | 0 | 1 | 1 | 1 | 1  | 1  | 1  | 1  | 1  | 1  | 0  | 0  | 1  | 1  | 1  | 1  | 0  |
| D | 1 | 1 | 1 | 1 | 0 | 0 | 1 | 1 | 1 | 1  | 1  | 1  | 1  | 0  | 0  | 1  | 1  | 1  | 1  | 0  | 0  |    |
| C | 1 | 1 | 1 | 1 | 0 | 0 | 1 | 0 | 0 | 0  | 0  | 0  | 0  | 0  | 0  | 1  | 1  | 1  | 1  | 0  | 0  | 0  |
| B | 1 | 1 | 1 | 1 | 0 | 0 | 1 | 1 | 1 | 1  | 1  | 0  | 0  | 0  | 0  | 1  | 1  | 0  | 0  | 0  | 0  |    |
| A | 1 | 1 | 1 | 1 | 0 | 0 | 0 | 0 | 0 | 0  | 0  | 0  | 0  | 1  | 1  | 0  | 0  | 0  | 0  | 0  | 0  | 0  |

Reserving two seat locations

Optimized Search Results Bit Vector 812

|   | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|----|----|----|----|----|----|----|----|----|----|----|----|----|
| F | 1 | 0 | 0 | 0 | 0 | 0 | 0 | 1 | 0 | 0  | 0  | 0  | 1  | 0  | 0  | 0  | 0  | 1  | 0  | 0  | 0  |    |
| E | 1 | 0 | 0 | 0 | 0 | 0 | 1 | 0 | 0 | 0  | 0  | 0  | 0  | 0  | 0  | 0  | 1  | 0  | 0  | 0  | 0  |    |
| D | 1 | 0 | 0 | 0 | 0 | 0 | 1 | 0 | 0 | 0  | 0  | 0  | 0  | 0  | 0  | 1  | 0  | 0  | 0  | 0  | 0  |    |
| C | 1 | 0 | 0 | 0 | 0 | 0 | 0 | 0 | 0 | 0  | 0  | 0  | 0  | 0  | 0  | 1  | 0  | 0  | 0  | 0  | 0  |    |
| B | 1 | 0 | 0 | 0 | 0 | 0 | 1 | 0 | 0 | 0  | 0  | 0  | 0  | 0  | 1  | 0  | 0  | 0  | 0  | 0  | 0  |    |
| A | 1 | 0 | 0 | 0 | 0 | 0 | 0 | 0 | 0 | 0  | 0  | 0  | 1  | 0  | 0  | 0  | 0  | 0  | 0  | 0  | 0  |    |

Reserving three seat locations

Optimized Search Results Bit Vector 814

|   | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|----|----|----|----|----|----|----|----|----|----|----|----|----|
| F | 1 | 0 | 0 | 0 | 0 | 0 | 0 | 1 | 0 | 0  | 0  | 0  | 1  | 0  | 0  | 0  | 0  | 1  | 0  | 0  | 0  |    |
| E | 1 | 0 | 0 | 0 | 0 | 0 | 1 | 0 | 0 | 0  | 0  | 0  | 0  | 0  | 0  | 0  | 1  | 0  | 0  | 0  | 0  |    |
| D | 1 | 0 | 0 | 0 | 0 | 0 | 1 | 0 | 0 | 0  | 0  | 0  | 0  | 0  | 0  | 1  | 0  | 0  | 0  | 0  | 0  |    |
| C | 1 | 0 | 0 | 0 | 0 | 0 | 0 | 0 | 0 | 0  | 0  | 0  | 0  | 0  | 0  | 1  | 0  | 0  | 0  | 0  | 0  |    |
| B | 1 | 0 | 0 | 0 | 0 | 0 | 1 | 0 | 0 | 0  | 0  | 0  | 0  | 0  | 0  | 0  | 0  | 0  | 0  | 0  | 0  |    |
| A | 1 | 0 | 0 | 0 | 0 | 0 | 0 | 0 | 0 | 0  | 0  | 0  | 0  | 0  | 0  | 0  | 0  | 0  | 0  | 0  | 0  |    |

Reserving four seat locations

Optimized Search Results Bit Vector 816

|   | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|----|----|----|----|----|----|----|----|----|----|----|----|----|
| F | 1 | 0 | 0 | 0 | 0 | 0 | 0 | 1 | 0 | 0  | 0  | 0  | 0  | 0  | 0  | 0  | 0  | 1  | 0  | 0  | 0  |    |
| E | 1 | 0 | 0 | 0 | 0 | 0 | 1 | 0 | 0 | 0  | 0  | 0  | 0  | 0  | 0  | 0  | 1  | 0  | 0  | 0  | 0  |    |
| D | 1 | 0 | 0 | 0 | 0 | 0 | 1 | 0 | 0 | 0  | 0  | 0  | 0  | 0  | 0  | 1  | 0  | 0  | 0  | 0  | 0  |    |
| C | 1 | 0 | 0 | 0 | 0 | 0 | 0 | 0 | 0 | 0  | 0  | 0  | 0  | 0  | 0  | 1  | 0  | 0  | 0  | 0  | 0  |    |
| B | 1 | 0 | 0 | 0 | 0 | 0 | 1 | 0 | 0 | 0  | 0  | 0  | 0  | 0  | 0  | 0  | 0  | 0  | 0  | 0  | 0  |    |
| A | 1 | 0 | 0 | 0 | 0 | 0 | 0 | 0 | 0 | 0  | 0  | 0  | 0  | 0  | 0  | 0  | 0  | 0  | 0  | 0  | 0  |    |

FIG. 9A
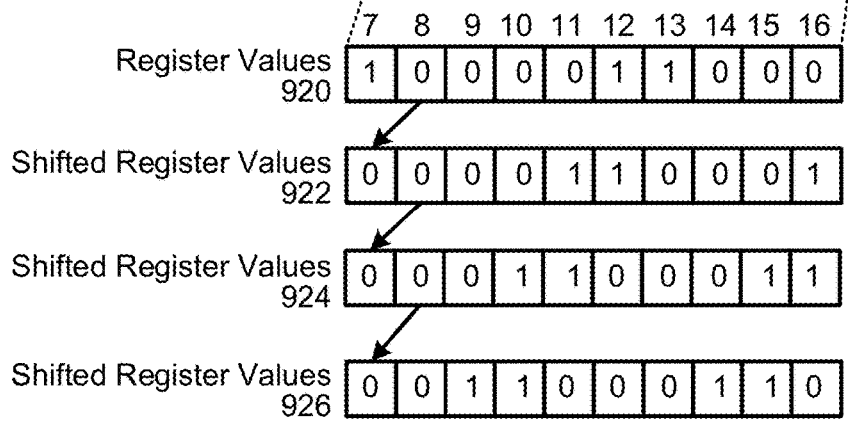
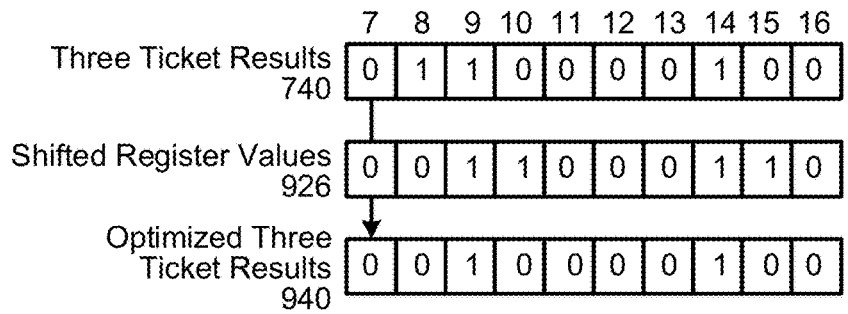

FIG. 9B

|   | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|----|----|----|----|----|----|----|----|----|----|----|----|----|
| F | 1 | 1 | 1 | 1 | 0 | 0 | 0 | 1 | 1 | 1  | 1  | 0  | 0  | 1  | 1  | 1  | 0  | 0  | 1  | 1  | 1  | 1  |
| E | 1 | 1 | 1 | 1 | 0 | 0 | 1 | 1 | 1 | 1  | 1  | 1  | 1  | 1  | 0  | 0  | 1  | 1  | 1  | 1  | 1  | 0  |
| D | 1 | 1 | 1 | 1 | 0 | 0 | 1 | 1 | 1 | 1  | 1  | 1  | 1  | 0  | 0  | 1  | 1  | 1  | 1  | 0  | 0  | 0  |
| C | 1 | 1 | 1 | 1 | 0 | 0 | 1 | 0 | 0 | 0  | 0  | 0  | 0  | 0  | 0  | 1  | 1  | 1  | 1  | 0  | 0  | 0  |
| B | 1 | 1 | 1 | 1 | 0 | 0 | 1 | 1 | 1 | 1  | 1  | 0  | 0  | 0  | 0  | 1  | 1  | 0  | 0  | 0  | 0  | 0  |
| A | 1 | 1 | 1 | 1 | 0 | 0 | 0 | 0 | 0 | 0  | 0  | 0  | 0  | 1  | 1  | 0  | 0  | 0  | 0  | 0  | 0  | 0  |

Search Results Bit Vector 710

Reserving two seat locations

|   | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|----|----|----|----|----|----|----|----|----|----|----|----|----|
| F | 0 | 0 | 1 | 0 | 0 | 0 | 0 | 0 | 0 | 1  | 0  | 0  | 0  | 0  | 1  | 0  | 0  | 0  | 0  | 0  | 1  | 0  |
| E | 0 | 0 | 1 | 0 | 0 | 0 | 0 | 0 | 0 | 0  | 0  | 0  | 1  | 0  | 0  | 0  | 0  | 0  | 1  | 0  | 0  | 0  |
| D | 0 | 0 | 1 | 0 | 0 | 0 | 0 | 0 | 0 | 0  | 0  | 1  | 0  | 0  | 0  | 0  | 0  | 1  | 0  | 0  | 0  | 0  |
| C | 0 | 0 | 1 | 0 | 0 | 0 | 0 | 0 | 0 | 0  | 0  | 0  | 0  | 0  | 0  | 0  | 0  | 1  | 0  | 0  | 0  | 0  |
| B | 0 | 0 | 1 | 0 | 0 | 0 | 0 | 0 | 0 | 0  | 1  | 0  | 0  | 0  | 0  | 1  | 0  | 0  | 0  | 0  | 0  | 0  |
| A | 0 | 0 | 1 | 0 | 0 | 0 | 0 | 0 | 0 | 0  | 0  | 0  | 0  | 1  | 0  | 0  | 0  | 0  | 0  | 0  | 0  | 0  |

Optimized Search Results Bit Vector 912

Reserving three seat locations

|   | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|----|----|----|----|----|----|----|----|----|----|----|----|----|
| F | 0 | 1 | 0 | 0 | 0 | 0 | 0 | 0 | 1 | 0  | 0  | 0  | 0  | 1  | 0  | 0  | 0  | 0  | 0  | 1  | 0  | 0  |
| E | 0 | 1 | 0 | 0 | 0 | 0 | 0 | 0 | 0 | 0  | 0  | 0  | 1  | 0  | 0  | 0  | 0  | 0  | 1  | 0  | 0  | 0  |
| D | 0 | 1 | 0 | 0 | 0 | 0 | 0 | 0 | 0 | 0  | 1  | 0  | 0  | 0  | 0  | 0  | 1  | 0  | 0  | 0  | 0  | 0  |
| C | 0 | 1 | 0 | 0 | 0 | 0 | 0 | 0 | 0 | 0  | 0  | 0  | 0  | 0  | 0  | 0  | 1  | 0  | 0  | 0  | 0  | 0  |
| B | 0 | 1 | 0 | 0 | 0 | 0 | 0 | 0 | 0 | 1  | 0  | 0  | 0  | 0  | 0  | 0  | 0  | 0  | 0  | 0  | 0  | 0  |
| A | 0 | 1 | 0 | 0 | 0 | 0 | 0 | 0 | 0 | 0  | 0  | 0  | 0  | 0  | 0  | 0  | 0  | 0  | 0  | 0  | 0  | 0  |

Optimized Search Results Bit Vector 914

Reserving four seat locations

|   | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|----|----|----|----|----|----|----|----|----|----|----|----|----|
| F | 1 | 0 | 0 | 0 | 0 | 0 | 0 | 1 | 0 | 0  | 0  | 0  | 0  | 0  | 0  | 0  | 0  | 0  | 1  | 0  | 0  | 0  |
| E | 1 | 0 | 0 | 0 | 0 | 0 | 0 | 0 | 0 | 0  | 1  | 0  | 0  | 0  | 0  | 0  | 1  | 0  | 0  | 0  | 0  | 0  |
| D | 1 | 0 | 0 | 0 | 0 | 0 | 0 | 0 | 0 | 1  | 0  | 0  | 0  | 0  | 0  | 1  | 0  | 0  | 0  | 0  | 0  | 0  |
| C | 1 | 0 | 0 | 0 | 0 | 0 | 0 | 0 | 0 | 0  | 0  | 0  | 0  | 0  | 0  | 1  | 0  | 0  | 0  | 0  | 0  | 0  |
| B | 1 | 0 | 0 | 0 | 0 | 0 | 0 | 0 | 1 | 0  | 0  | 0  | 0  | 0  | 0  | 0  | 0  | 0  | 0  | 0  | 0  | 0  |
| A | 1 | 0 | 0 | 0 | 0 | 0 | 0 | 0 | 0 | 0  | 0  | 0  | 0  | 0  | 0  | 0  | 0  | 0  | 0  | 0  | 0  | 0  |

Optimized Search Results Bit Vector 916

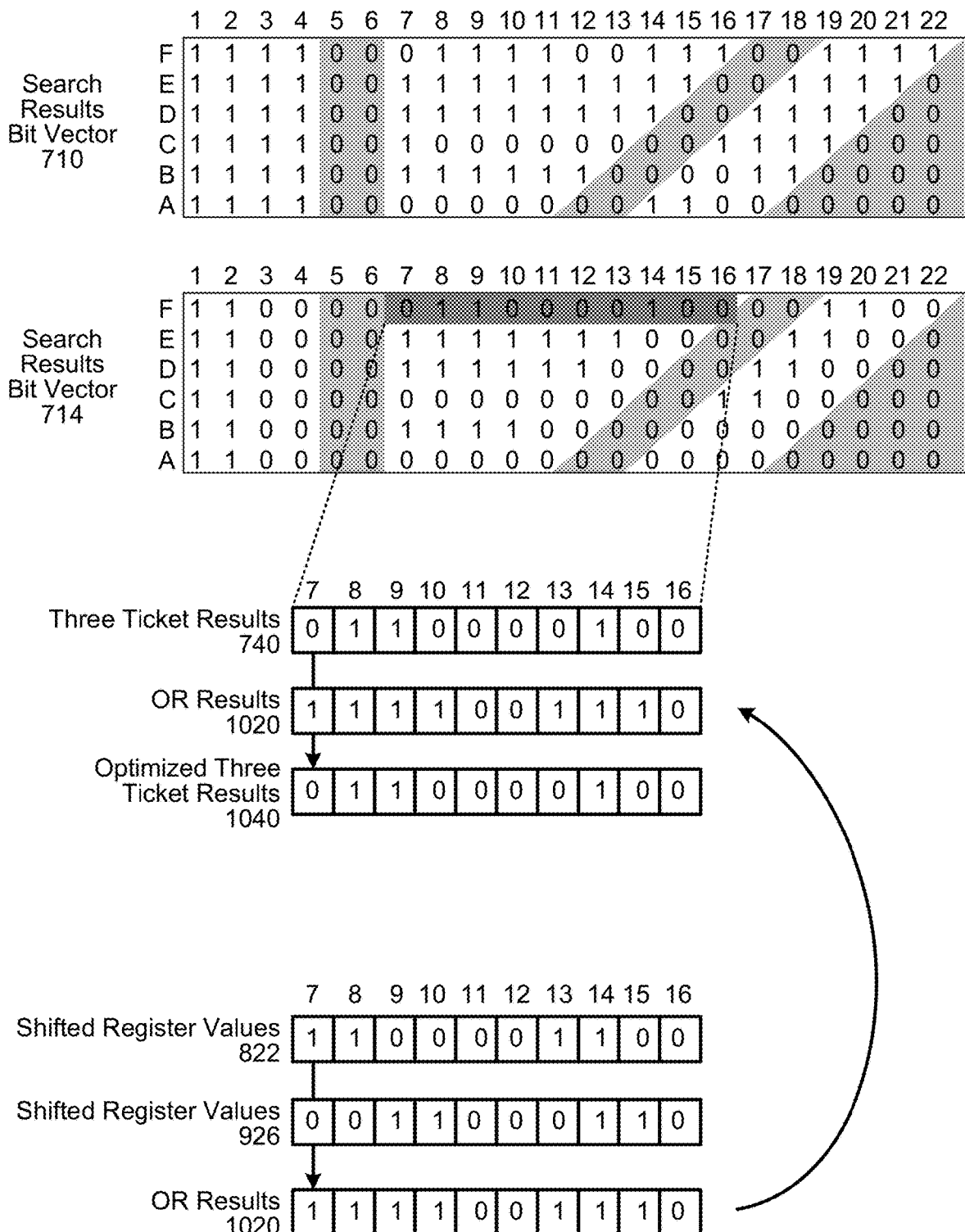

FIG. 10B

Search Results Bit Vector 710

|   | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|----|----|----|----|----|----|----|----|----|----|----|----|----|
| F | 1 | 1 | 1 | 1 | 0 | 0 | 0 | 1 | 1 | 1  | 1  | 0  | 0  | 1  | 1  | 1  | 0  | 0  | 1  | 1  | 1  | 1  |
| E | 1 | 1 | 1 | 1 | 0 | 0 | 1 | 1 | 1 | 1  | 1  | 1  | 1  | 1  | 1  | 0  | 0  | 1  | 1  | 1  | 1  | 0  |
| D | 1 | 1 | 1 | 1 | 0 | 0 | 1 | 1 | 1 | 1  | 1  | 1  | 1  | 0  | 0  | 1  | 1  | 1  | 1  | 0  | 0  | 0  |
| C | 1 | 1 | 1 | 1 | 0 | 0 | 1 | 0 | 0 | 0  | 0  | 0  | 0  | 0  | 0  | 1  | 1  | 1  | 1  | 0  | 0  | 0  |
| B | 1 | 1 | 1 | 1 | 0 | 0 | 1 | 1 | 1 | 1  | 1  | 0  | 0  | 0  | 0  | 1  | 1  | 0  | 0  | 0  | 0  | 0  |
| A | 1 | 1 | 1 | 1 | 0 | 0 | 0 | 0 | 0 | 0  | 0  | 0  | 0  | 1  | 1  | 0  | 0  | 0  | 0  | 0  | 0  | 0  |

Reserving two seat locations

Optimized Search Results Bit Vector 1012

|   | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|----|----|----|----|----|----|----|----|----|----|----|----|----|
| F | 1 | 0 | 1 | 0 | 0 | 0 | 0 | 1 | 0 | 1  | 0  | 0  | 0  | 1  | 1  | 0  | 0  | 0  | 1  | 0  | 1  | 0  |
| E | 1 | 0 | 1 | 0 | 0 | 0 | 1 | 0 | 0 | 0  | 0  | 0  | 0  | 1  | 0  | 0  | 0  | 1  | 0  | 1  | 0  | 0  |
| D | 1 | 0 | 1 | 0 | 0 | 0 | 1 | 0 | 0 | 0  | 0  | 1  | 0  | 0  | 0  | 1  | 0  | 1  | 0  | 0  | 0  | 0  |
| C | 1 | 0 | 1 | 0 | 0 | 0 | 0 | 0 | 0 | 0  | 0  | 0  | 0  | 0  | 0  | 1  | 0  | 1  | 0  | 0  | 0  | 0  |
| B | 1 | 0 | 1 | 0 | 0 | 0 | 1 | 0 | 0 | 0  | 1  | 0  | 0  | 0  | 0  | 1  | 0  | 0  | 0  | 0  | 0  | 0  |
| A | 1 | 0 | 1 | 0 | 0 | 0 | 0 | 0 | 0 | 0  | 0  | 0  | 0  | 1  | 0  | 0  | 0  | 0  | 0  | 0  | 0  | 0  |

Reserving three seat locations

Optimized Search Results Bit Vector 1014

|   | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|----|----|----|----|----|----|----|----|----|----|----|----|----|
| F | 1 | 1 | 0 | 0 | 0 | 0 | 0 | 1 | 1 | 0  | 0  | 0  | 0  | 1  | 0  | 0  | 0  | 0  | 1  | 1  | 0  | 0  |
| E | 1 | 1 | 0 | 0 | 0 | 0 | 1 | 0 | 0 | 0  | 0  | 1  | 0  | 0  | 0  | 0  | 0  | 1  | 1  | 0  | 0  | 0  |
| D | 1 | 1 | 0 | 0 | 0 | 0 | 1 | 0 | 0 | 0  | 1  | 0  | 0  | 0  | 0  | 1  | 1  | 0  | 0  | 0  | 0  | 0  |
| C | 1 | 1 | 0 | 0 | 0 | 0 | 0 | 0 | 0 | 0  | 0  | 0  | 0  | 0  | 0  | 1  | 1  | 0  | 0  | 0  | 0  | 0  |
| B | 1 | 1 | 0 | 0 | 0 | 0 | 1 | 0 | 0 | 1  | 0  | 0  | 0  | 0  | 0  | 0  | 0  | 0  | 0  | 0  | 0  | 0  |
| A | 1 | 1 | 0 | 0 | 0 | 0 | 0 | 0 | 0 | 0  | 0  | 0  | 0  | 0  | 0  | 0  | 0  | 0  | 0  | 0  | 0  | 0  |

Reserving four seat locations

Optimized Search Results Bit Vector 1016

|   | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|----|----|----|----|----|----|----|----|----|----|----|----|----|
| F | 1 | 0 | 0 | 0 | 0 | 0 | 0 | 1 | 0 | 0  | 0  | 0  | 0  | 0  | 0  | 0  | 0  | 0  | 1  | 0  | 0  | 0  |
| E | 1 | 0 | 0 | 0 | 0 | 0 | 1 | 0 | 0 | 0  | 1  | 0  | 0  | 0  | 0  | 0  | 0  | 1  | 0  | 0  | 0  | 0  |
| D | 1 | 0 | 0 | 0 | 0 | 0 | 1 | 0 | 0 | 1  | 0  | 0  | 0  | 0  | 0  | 1  | 0  | 0  | 0  | 0  | 0  | 0  |
| C | 1 | 0 | 0 | 0 | 0 | 0 | 0 | 0 | 0 | 0  | 0  | 0  | 0  | 0  | 0  | 1  | 0  | 0  | 0  | 0  | 0  | 0  |
| B | 1 | 0 | 0 | 0 | 0 | 0 | 1 | 0 | 1 | 0  | 0  | 0  | 0  | 0  | 0  | 0  | 0  | 0  | 0  | 0  | 0  | 0  |
| A | 1 | 0 | 0 | 0 | 0 | 0 | 0 | 0 | 0 | 0  | 0  | 0  | 0  | 0  | 0  | 0  | 0  | 0  | 0  | 0  | 0  | 0  |

FIG. 11B

Search Results Bit Vector 710

|   | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|----|----|----|----|----|----|----|----|----|----|----|----|----|
| F | 1 | 1 | 1 | 1 | 0 | 0 | 0 | 1 | 1 | 1  | 1  | 0  | 0  | 1  | 1  | 1  | 0  | 0  | 1  | 1  | 1  | 1  |
| E | 1 | 1 | 1 | 1 | 0 | 0 | 1 | 1 | 1 | 1  | 1  | 1  | 1  | 1  | 1  | 0  | 0  | 1  | 1  | 1  | 1  | 0  |
| D | 1 | 1 | 1 | 1 | 0 | 0 | 1 | 1 | 1 | 1  | 1  | 1  | 1  | 0  | 0  | 1  | 1  | 1  | 1  | 0  | 0  | 0  |
| C | 1 | 1 | 1 | 1 | 0 | 0 | 1 | 0 | 0 | 0  | 0  | 0  | 0  | 0  | 1  | 1  | 1  | 1  | 0  | 0  | 0  | 0  |
| B | 1 | 1 | 1 | 1 | 0 | 0 | 1 | 1 | 1 | 1  | 1  | 0  | 0  | 0  | 0  | 1  | 1  | 0  | 0  | 0  | 0  | 0  |
| A | 1 | 1 | 1 | 1 | 0 | 0 | 0 | 0 | 0 | 0  | 0  | 0  | 0  | 1  | 1  | 0  | 0  | 0  | 0  | 0  | 0  | 0  |

Reserving two seat locations

Optimized Search Results Bit Vector 1112

|   | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|----|----|----|----|----|----|----|----|----|----|----|----|----|
| F | 0 | 0 | 0 | 0 | 0 | 0 | 0 | 0 | 0 | 0  | 0  | 0  | 0  | 0  | 0  | 0  | 0  | 0  | 0  | 0  | 0  | 0  |
| E | 0 | 0 | 0 | 0 | 0 | 0 | 0 | 0 | 0 | 0  | 0  | 0  | 0  | 0  | 0  | 0  | 0  | 0  | 0  | 0  | 0  | 0  |
| D | 0 | 0 | 0 | 0 | 0 | 0 | 0 | 0 | 0 | 0  | 0  | 0  | 0  | 0  | 0  | 0  | 0  | 0  | 0  | 0  | 0  | 0  |
| C | 0 | 0 | 0 | 0 | 0 | 0 | 0 | 0 | 0 | 0  | 0  | 0  | 0  | 0  | 0  | 0  | 0  | 0  | 0  | 0  | 0  | 0  |
| B | 0 | 0 | 0 | 0 | 0 | 0 | 0 | 0 | 0 | 0  | 0  | 0  | 0  | 0  | 0  | 1  | 0  | 0  | 0  | 0  | 0  | 0  |
| A | 0 | 0 | 0 | 0 | 0 | 0 | 0 | 0 | 0 | 0  | 0  | 0  | 1  | 0  | 0  | 0  | 0  | 0  | 0  | 0  | 0  | 0  |

Reserving three seat locations

Optimized Search Results Bit Vector 1114

|   | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|----|----|----|----|----|----|----|----|----|----|----|----|----|
| F | 0 | 0 | 0 | 0 | 0 | 0 | 0 | 0 | 0 | 0  | 0  | 1  | 0  | 0  | 0  | 0  | 0  | 0  | 0  | 0  | 0  | 0  |
| E | 0 | 0 | 0 | 0 | 0 | 0 | 0 | 0 | 0 | 0  | 0  | 0  | 0  | 0  | 0  | 0  | 0  | 0  | 0  | 0  | 0  | 0  |
| D | 0 | 0 | 0 | 0 | 0 | 0 | 0 | 0 | 0 | 0  | 0  | 0  | 0  | 0  | 0  | 0  | 0  | 0  | 0  | 0  | 0  | 0  |
| C | 0 | 0 | 0 | 0 | 0 | 0 | 0 | 0 | 0 | 0  | 0  | 0  | 0  | 0  | 0  | 0  | 0  | 0  | 0  | 0  | 0  | 0  |
| B | 0 | 0 | 0 | 0 | 0 | 0 | 0 | 0 | 0 | 0  | 0  | 0  | 0  | 0  | 0  | 0  | 0  | 0  | 0  | 0  | 0  | 0  |
| A | 0 | 0 | 0 | 0 | 0 | 0 | 0 | 0 | 0 | 0  | 0  | 0  | 0  | 0  | 0  | 0  | 0  | 0  | 0  | 0  | 0  | 0  |

Reserving four seat locations

Optimized Search Results Bit Vector 1116

|   | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|----|----|----|----|----|----|----|----|----|----|----|----|----|
| F | 1 | 0 | 0 | 0 | 0 | 0 | 0 | 1 | 0 | 0  | 0  | 0  | 0  | 0  | 0  | 0  | 0  | 0  | 1  | 0  | 0  | 0  |
| E | 1 | 0 | 0 | 0 | 0 | 0 | 0 | 0 | 0 | 0  | 0  | 0  | 0  | 0  | 0  | 0  | 0  | 1  | 0  | 0  | 0  | 0  |
| D | 1 | 0 | 0 | 0 | 0 | 0 | 0 | 0 | 0 | 0  | 0  | 0  | 0  | 0  | 0  | 0  | 1  | 0  | 0  | 0  | 0  | 0  |
| C | 1 | 0 | 0 | 0 | 0 | 0 | 0 | 0 | 0 | 0  | 0  | 0  | 0  | 0  | 1  | 0  | 0  | 0  | 0  | 0  | 0  | 0  |
| B | 1 | 0 | 0 | 0 | 0 | 0 | 0 | 0 | 0 | 0  | 0  | 0  | 0  | 0  | 0  | 0  | 0  | 0  | 0  | 0  | 0  | 0  |
| A | 1 | 0 | 0 | 0 | 0 | 0 | 0 | 0 | 0 | 0  | 0  | 0  | 0  | 0  | 0  | 0  | 0  | 0  | 0  | 0  | 0  | 0  |

FIG. 12C

Search Results Bit Vector 710

|   | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|----|----|----|----|----|----|----|----|----|----|----|----|----|
| F | 1 | 1 | 1 | 1 | 0 | 0 | 0 | 1 | 1 | 1  | 1  | 0  | 0  | 1  | 1  | 1  | 0  | 0  | 1  | 1  | 1  | 1  |
| E | 1 | 1 | 1 | 1 | 0 | 0 | 1 | 1 | 1 | 1  | 1  | 1  | 1  | 1  | 1  | 0  | 0  | 1  | 1  | 1  | 1  | 0  |
| D | 1 | 1 | 1 | 1 | 0 | 0 | 1 | 1 | 1 | 1  | 1  | 1  | 1  | 0  | 0  | 1  | 1  | 1  | 1  | 0  | 0  | 0  |
| C | 1 | 1 | 1 | 1 | 0 | 0 | 1 | 0 | 0 | 0  | 0  | 0  | 0  | 0  | 0  | 1  | 1  | 1  | 1  | 0  | 0  | 0  |
| B | 1 | 1 | 1 | 1 | 0 | 0 | 1 | 1 | 1 | 1  | 1  | 0  | 0  | 0  | 0  | 1  | 1  | 0  | 0  | 0  | 0  | 0  |
| A | 1 | 1 | 1 | 1 | 0 | 0 | 0 | 0 | 0 | 0  | 0  | 0  | 0  | 1  | 1  | 0  | 0  | 0  | 0  | 0  | 0  | 0  |

Reserving two seat locations

Optimized Search Results Bit Vector 1212

|   | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|----|----|----|----|----|----|----|----|----|----|----|----|----|
| F | 1 | 0 | 1 | 0 | 0 | 0 | 0 | 1 | 0 | 1  | 0  | 0  | 0  | 1  | 1  | 0  | 0  | 0  | 1  | 0  | 1  | 0  |
| E | 1 | 0 | 1 | 0 | 0 | 0 | 1 | 0 | 1 | 1  | 1  | 0  | 1  | 0  | 0  | 0  | 0  | 1  | 0  | 1  | 0  | 0  |
| D | 1 | 0 | 1 | 0 | 0 | 0 | 1 | 0 | 1 | 1  | 1  | 0  | 1  | 0  | 0  | 0  | 1  | 0  | 1  | 0  | 0  | 0  |
| C | 1 | 0 | 1 | 0 | 0 | 0 | 0 | 0 | 0 | 0  | 0  | 0  | 0  | 0  | 0  | 0  | 1  | 0  | 1  | 0  | 0  | 0  |
| B | 1 | 0 | 1 | 0 | 0 | 0 | 1 | 0 | 1 | 0  | 1  | 0  | 0  | 0  | 0  | 1  | 0  | 0  | 0  | 0  | 0  | 0  |
| A | 1 | 0 | 1 | 0 | 0 | 0 | 0 | 0 | 0 | 0  | 0  | 0  | 0  | 1  | 0  | 0  | 0  | 0  | 0  | 0  | 0  | 0  |

Reserving three seat locations

Optimized Search Results Bit Vector 1214

|   | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|----|----|----|----|----|----|----|----|----|----|----|----|----|
| F | 0 | 0 | 0 | 0 | 0 | 0 | 0 | 0 | 0 | 0  | 0  | 0  | 1  | 0  | 0  | 0  | 0  | 0  | 0  | 0  | 0  | 0  |
| E | 0 | 0 | 0 | 0 | 0 | 0 | 1 | 0 | 1 | 1  | 1  | 0  | 1  | 0  | 0  | 0  | 0  | 0  | 0  | 0  | 0  | 0  |
| D | 0 | 0 | 0 | 0 | 0 | 0 | 1 | 0 | 1 | 1  | 0  | 1  | 0  | 0  | 0  | 0  | 0  | 0  | 0  | 0  | 0  | 0  |
| C | 0 | 0 | 0 | 0 | 0 | 0 | 0 | 0 | 0 | 0  | 0  | 0  | 0  | 0  | 0  | 0  | 0  | 0  | 0  | 0  | 0  | 0  |
| B | 0 | 0 | 0 | 0 | 0 | 0 | 1 | 0 | 0 | 1  | 0  | 0  | 0  | 0  | 0  | 0  | 0  | 0  | 0  | 0  | 0  | 0  |
| A | 0 | 0 | 0 | 0 | 0 | 0 | 0 | 0 | 0 | 0  | 0  | 0  | 0  | 0  | 0  | 0  | 0  | 0  | 0  | 0  | 0  | 0  |

Reserving four seat locations

Optimized Search Results Bit Vector 1216

|   | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|----|----|----|----|----|----|----|----|----|----|----|----|----|
| F | 1 | 0 | 0 | 0 | 0 | 0 | 0 | 1 | 0 | 0  | 0  | 0  | 0  | 0  | 0  | 0  | 0  | 0  | 1  | 0  | 0  | 0  |
| E | 1 | 0 | 0 | 0 | 0 | 0 | 1 | 0 | 1 | 1  | 0  | 1  | 0  | 0  | 0  | 0  | 0  | 1  | 0  | 0  | 0  | 0  |
| D | 1 | 0 | 0 | 0 | 0 | 0 | 1 | 0 | 1 | 0  | 1  | 0  | 0  | 0  | 0  | 0  | 1  | 0  | 0  | 0  | 0  | 0  |
| C | 1 | 0 | 0 | 0 | 0 | 0 | 0 | 0 | 0 | 0  | 0  | 0  | 0  | 0  | 0  | 1  | 0  | 0  | 0  | 0  | 0  | 0  |
| B | 1 | 0 | 0 | 0 | 0 | 0 | 1 | 0 | 1 | 0  | 0  | 0  | 0  | 0  | 0  | 0  | 0  | 0  | 0  | 0  | 0  | 0  |
| A | 1 | 0 | 0 | 0 | 0 | 0 | 0 | 0 | 0 | 0  | 0  | 0  | 0  | 0  | 0  | 0  | 0  | 0  | 0  | 0  | 0  | 0  |

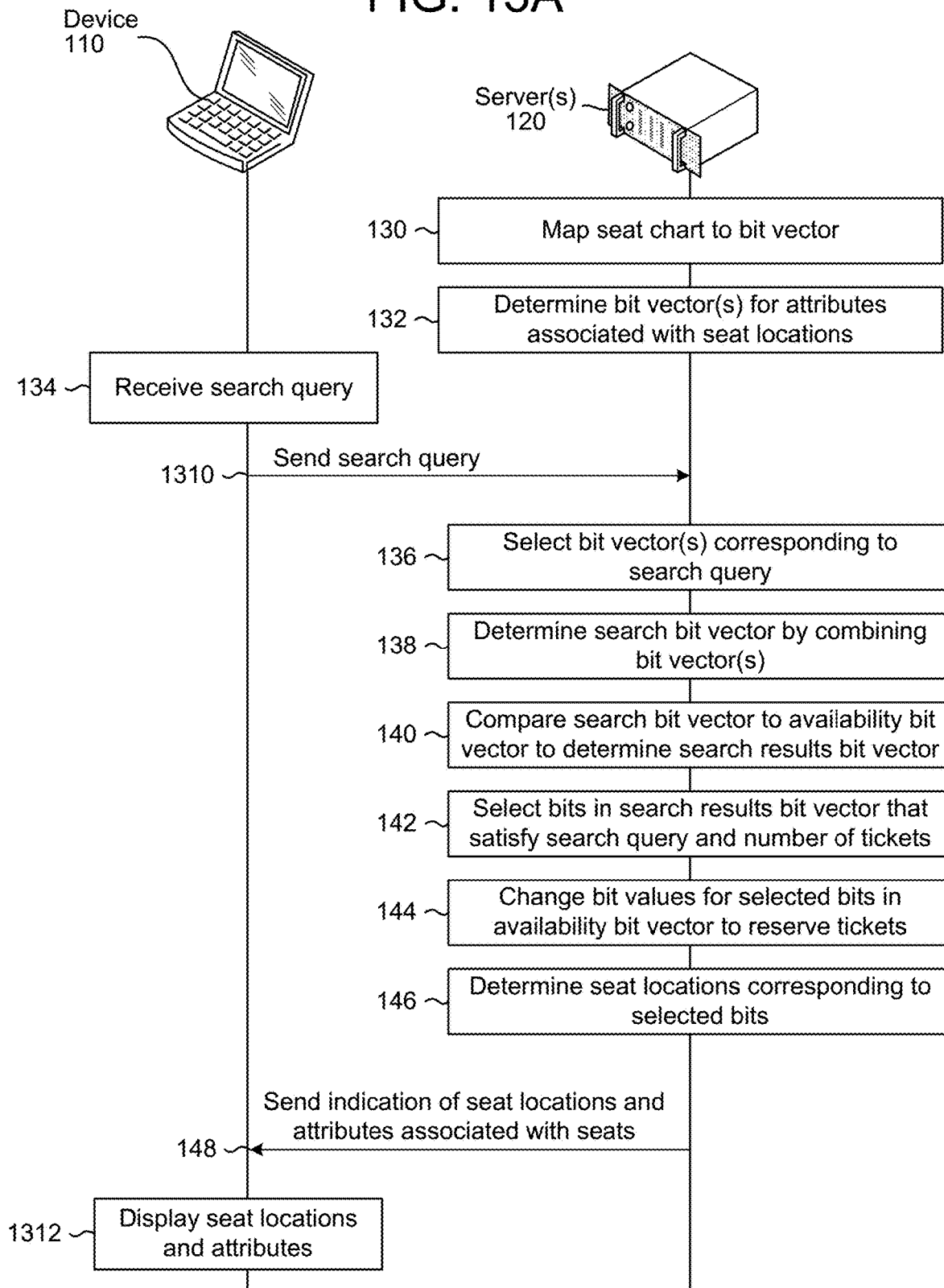

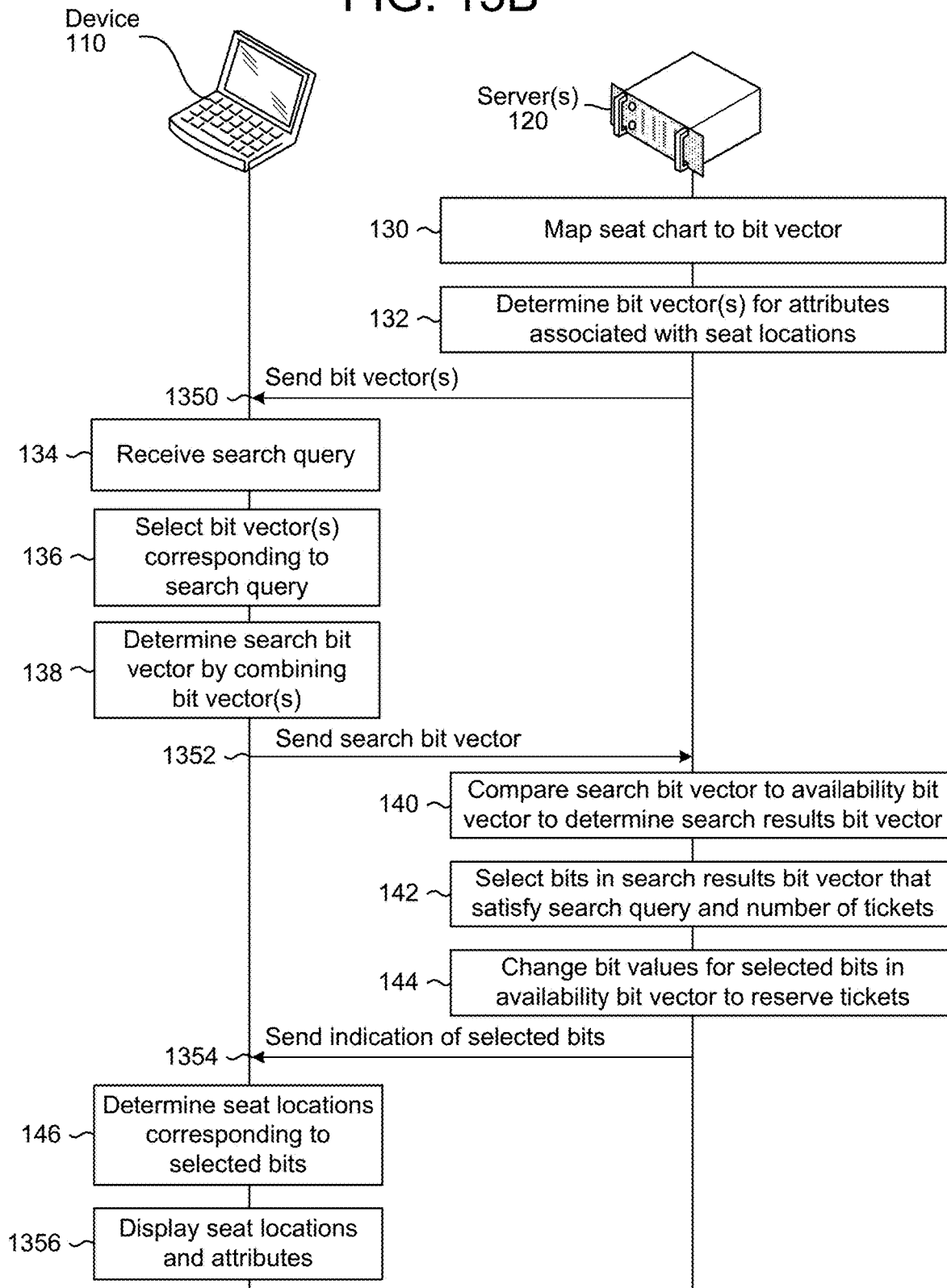

METHOD FOR SELLING AND SEARCHING FOR ITEMS

BACKGROUND

With the advancement of technology, the use and popularity of electronic devices has increased considerably. Electronic devices may be used to sell and purchase items. Disclosed herein are technical solutions to improve a process of selling and purchasing items.

BRIEF DESCRIPTION OF DRAWINGS

For a more complete understanding of the present disclosure, reference is now made to the following description taken in conjunction with the accompanying drawings.

FIG. 1 illustrates a system according to embodiments of the present disclosure.

FIGS. 2A-2C illustrate examples of generating seat bit vectors corresponding to seat charts according to examples of the present disclosure.

FIGS. 3A-3F illustrate examples of bit vectors according to examples of the present disclosure.

FIGS. 4A-4D illustrate examples of modifying bit vectors based on a number of tickets to purchase according to examples of the present disclosure.

FIGS. 5A-5B illustrate examples of generating search results bit vectors according to examples of the present disclosure.

FIGS. 6A-6B illustrate examples of generating search bit vectors and search results bit vectors according to examples of the present disclosure.

FIGS. 7A-7C illustrate examples of using shift operations to identify bits that satisfy a search query according to examples of the present disclosure.

FIGS. 8A-8B illustrate examples of an optimization technique that selects bits adjacent to unavailable bits on the left according to examples of the present disclosure.

FIGS. 9A-9B illustrate examples of an optimization technique that selects bits adjacent to unavailable bits on the right according to examples of the present disclosure.

FIGS. 10A-10B illustrate examples of an optimization technique that selects bits adjacent to unavailable bits on either the left or the right according to examples of the present disclosure.

FIGS. 11A-11B illustrate examples of an optimization technique that selects bits adjacent to unavailable bits on both the left and the right according to examples of the present disclosure.

FIGS. 12A-12C illustrate examples of an optimization technique that selects bits to avoid stranding individual available bits according to examples of the present disclosure.

FIGS. 13A-13B are communication diagrams conceptually illustrating example methods for reserving seat locations according to examples of the present disclosure.

DETAILED DESCRIPTION

Figure 2B:
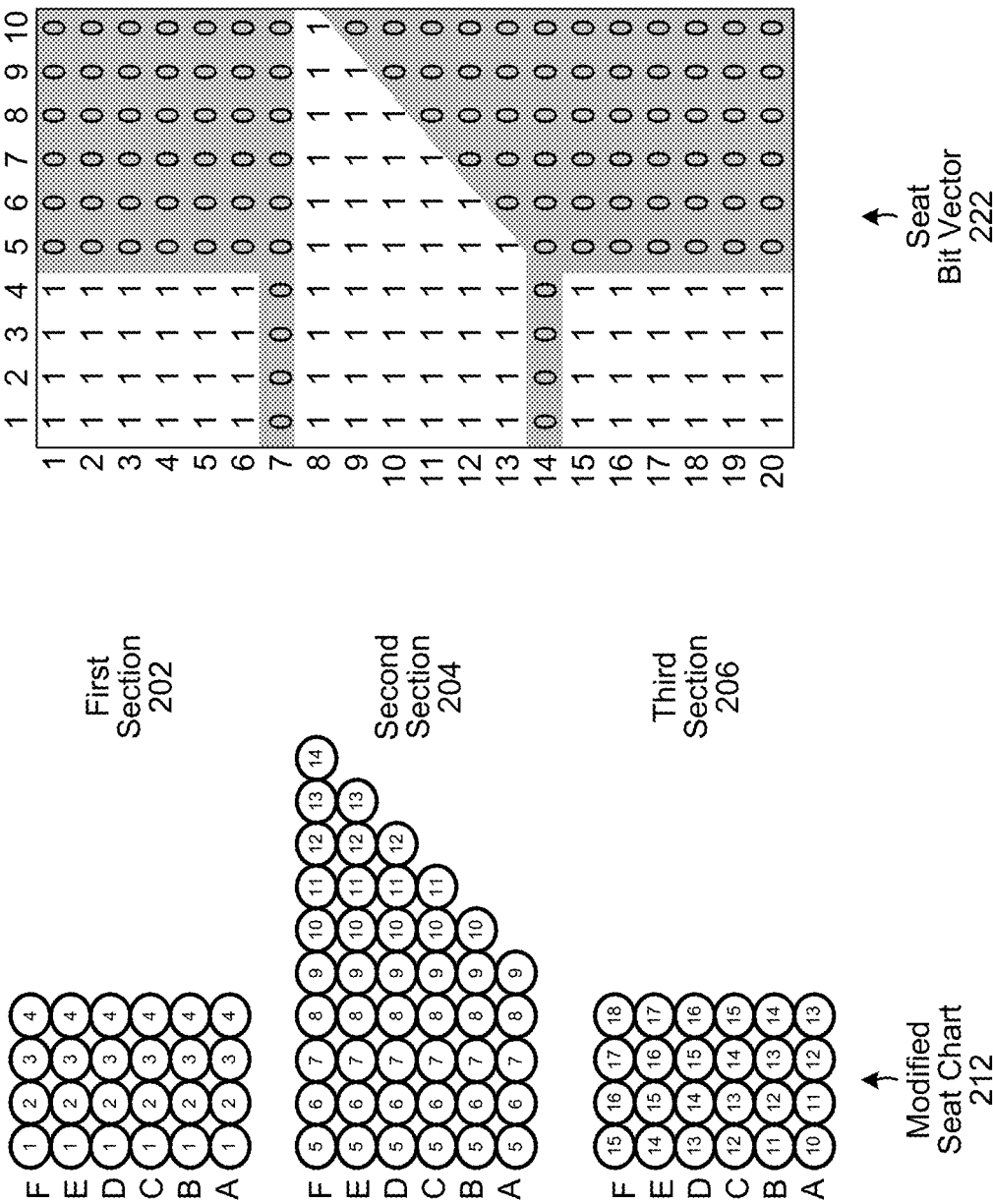

Electronic devices may be used to sell and purchase items, such as unique artwork, airline tickets, tickets to an event or the like. Sometimes a device may request to purchase multiple items as a set and will only purchase the items if each of the requested items is available. For example, the device may request four tickets to a concert that are adjacent to each other and the request is not satisfied by four individual tickets that are separated from each other. Typically, devices use a linear approach and attempt to select and reserve items individually, which results in a number of single requests for each of the items. When demand for the items is high, some of the requests may not be satisfied as other requests have reserved the item in the interim, resulting in a request failure (e.g., error). For example, when tickets to a concert are first made available, there may be thousands of requests flooding the system and the linear approach is inefficient and may result in latency and an increase in a failure rate that occurs when the device attempts to reserve an item that is no longer available.

To improve a process of identifying and locking resources (e.g., items, tickets, etc.), devices, systems and methods are disclosed that map the resources to a bit vector and use bit vectors to efficiently identify and lock the resources. For example, tickets to a concert may be mapped to a bit vector and the system may generate an availability bit vector indicating an availability of the seat locations (e.g., unsold tickets). Thus, the tickets may be reserved by changing a binary value for bits corresponding to individual tickets in the availability bit vector. In addition, the system may generate additional constraint bit vectors corresponding to metadata associated with the seat locations (e.g., aisle seat, handicap accessible, first ten rows, back ten rows, etc.), allowing the system to easily identify available seat locations that satisfy the search request. As the bit vectors are relatively small and can be processed easily, the system may handle a large number of search requests, improve a latency and reduce an error rate associated with searching for and reserving seat locations.

FIG. 1 illustrates a high-level conceptual block diagram of a system 100 configured to facilitate selling and purchasing items. Although FIG. 1, and other figures/discussion illustrate the operation of the system in a particular order, the steps described may be performed in a different order (as well as certain steps removed or added) without departing from the intent of the disclosure. As illustrated in FIG. 1, the system 100 may include server(s) 120 connected via network(s) 10 to a plurality of devices 110, such as a smartphone 110a, a laptop computer 110b and a speech controlled device 110c.

The devices 110 may connect to the server(s) 120 in order to identify and reserve resources, such as unique items (e.g., art work, numbered items, etc.), reservations (e.g., airline tickets, tickets to a concert, tickets to an event, etc.), and/or the like. A device 110 may receive input from a user that indicates a number of resources and desired attributes (e.g., search constraints) associated with the resources and the device 110 may submit a search query to the server(s) 120 indicating the number of resources and the desired attributes. The server(s) 120 may use the search query to identify free resources (e.g., unsold items that are available to reserve), select a portion of resources (e.g., four items) that satisfy the search query and encumber the selected resources (e.g., reserve or lock the selected resources so that only the device 110 may access them). As the selected resources are reserved, the selected resources are indicated as being unavailable in response to subsequent search queries, preventing other devices from reserving the selected resources. Thus, the system 100 blocks simultaneous access to the selected resources by issuing locks on the selected resources, allowing only the device 110 access to the selected resource (e.g., ability to purchase the items). If the device 110 does not complete the transaction within a certain time period, the system 100 may unencumber the selected resources (e.g., remove the reservation and/or unlock the selected resources) so that the selected resources are indicated as being available in response to subsequent search queries.

The operation of encumbering the selected resources must be atomic, meaning that the operation needs to completely succeed or to completely fail. Thus, a search request indicating four items with desired attributes should result in reserving four items associated with the desired attributes, and if the system 100 is unable to identify and reserve all four items, the system 100 does not reserve a single item. For example, the system 100 may receive a search query requesting four tickets to a concert and may identify four adjacent tickets before reserving the tickets. Therefore, the system 100 does not reserve the four tickets individually, but instead reserves them as a group.

For ease of explanation, the disclosure will refer to identifying and encumbering resources using a simplified example of identifying and reserving tickets to an event. For example, a user may submit a search query indicating the event (e.g., concert, sporting event, etc.), a number of tickets to the event (e.g., number of seat locations to reserve) and/or desired attributes (e.g., search constraints) associated with the seat locations (e.g., aisle seat, handicap accessible, price below a threshold, specific section, front rows near the stage, back rows away from standing area, etc.) and the server(s) 120 may identify and reserve tickets to the event that satisfy the search query. However, the disclosure is not limited thereto and the examples provided of identifying and reserving tickets to the event may apply to identifying and encumbering other resources, such as unique items (e.g., art work, numbered items, etc.), airline tickets, tickets to a concert, or the like without departing from the disclosure.

As used herein, a ticket refers to a right of entry to an event, venue and/or restricted location. In some examples, purchasing a ticket results in a physical and/or electronic ticket that provides a proof of purchase to gain entry to the event, but the disclosure is not limited thereto. Instead, a ticket may be associated with an account and entry to the event may be granted based on the account itself instead of presenting a physical or electronic ticket.

As will be discussed in greater detail below, the system 100 may facilitate searching for and purchasing tickets by mapping the tickets to a bit vector. Thus, each individual seat location at the event may be mapped to a bit in a bit vector, with adjacent seat locations being adjacent in the bit vector. Mapping the seat locations to the bit vector enables the system 100 to track an availability of the seat locations as well as the additional attributes associated with the seat locations using a plurality of bit vectors (e.g., constraint bit vectors). For example, an availability bit vector may indicate which seat locations are currently available (e.g., unsold tickets), an aisle bit vector may indicate which seat locations are positioned on an aisle, a handicap bit vector may indicate which seat locations are handicap accessible, etc. In addition, the system 100 may generate bit vectors for a range of other attributes, such as seat locations in the first n rows, seat locations in the back n rows, seat locations associated with a price below a threshold, etc. Thus, the user may specify desired attributes (e.g., search constraints) in the search query submitted to the system 100 and the system 100 may dynamically generate a bit vector (e.g., constraint bit vector) corresponding to each desired attribute.

As used herein, desired attributes may be referred to as search constraints. Thus, a bit vector corresponding to a search constraint may be referred to as a constraint bit vector, while a bit vector corresponding to multiple search constraints may be referred to as a search bit vector. While the examples illustrated above include a variety of attributes associated with seat locations, the disclosure is not limited thereto and the attributes may vary without departing from the disclosure. In some examples, the system 100 may generate bit vectors corresponding to attributes not listed above that are associated with seat locations without departing from the disclosure. Additionally or alternatively, the system 100 may generate bit vectors corresponding to attributes not listed above that are associated with items or other resources without departing from the disclosure. For example, a plurality of items (e.g., art work, clothing, collector's items, etc.) may be mapped to a bit vector and the system 100 may generate additional bit vectors corresponding to attributes (e.g., artist, color, price, features, etc.) associated with the plurality of items without departing from the disclosure.

The system 100 may generate a bit vector (e.g., constraint bit vector) corresponding to each desired attribute (e.g., search constraint) indicated by a search query and may combine the bit vectors to generate a search bit vector. For example, the search query may indicate that the tickets include an aisle seat, a handicap accessible seat and be located in a specific section. The system 100 may identify a first bit vector indicating seat locations located on an aisle, a second bit vector indicating seat locations that are handicap accessible, a third bit vector indicating seat locations located within the specific section, and may generate a search bit vector that combines the first bit vector, the second bit vector and the third bit vector to search for all of the desired attributes at the same time.

After determining the search bit vector, the system 100 may identify available seat locations that satisfy the search query by combining the search bit vector and the availability bit vector to generate a search results bit vector. Using the example illustrated above, the search bit vector (e.g., combination of the first bit vector, the second bit vector and the third bit vector) may be combined with the availability bit vector (e.g., indicating available seat locations for the entire venue) to generate a search results bit vector indicating seat locations that satisfy the search query. The system 100 may select a number of available seat locations that satisfy the search query and may reserve the number of seat locations by changing bit values in the availability bit vector.

In some examples, a first binary value (e.g., 1) may indicate that the seat location is available and/or is associated with a desired attribute, whereas a second binary value (e.g., 0) may indicate that the seat location in unavailable and/or is not associated with the desired attribute. Thus, the system 100 may reserve the number of seat locations by changing the bit values associated with the number of seat locations to the second binary value (e.g., 0). However, the disclosure is not limited thereto and the second binary value (e.g., 0) may indicate that the seat location is available and/or is associated with a desired attribute, whereas the first binary value (e.g., 1) may indicate that the seat location in unavailable and/or is not associated with the desired attribute without departing from the disclosure.

When mapping the seat locations to the bit vector, the system 100 may include additional bits (e.g., columns, rows, etc.) to separate different sections or the like. For example, the system 100 may map a first section to first bits having the first binary value (e.g., 1) and map a second section to second bits having the first binary value, with the first bits and the second bits separated by one or more columns of bits having the second binary value (e.g., 0) to indicate an aisle between the first section and the second section. In order to include multiple sections having different numbers of seat locations, the bit vector may also include columns and/or rows that have the second binary value to separate the sections. Thus, the system 100 may generate a bit vector indicating seat locations by storing the first binary value in bits associated with actual seat locations and the second binary value in bits that are not associated with seat locations. However, the disclosure is not limited thereto and the system 100 may track the bits that are not associated with seat locations by storing the second binary value for the bits in the availability bit vector without departing from the disclosure. In some examples, the system 100 may generate and store multiple bit vectors for a venue, with each bit vector corresponding to a different configuration of seat locations. For example, a first bit vector may correspond to seat locations in a stadium during a sporting event while a second bit vector may correspond to seat locations in the stadium during a concert.

By mapping the tickets to the bit vectors, the system 100 may decrease a latency associated with searching for tickets and/or may reduce a failure rate associated with reserving tickets. For example, the bit vectors are small enough that the system 100 may perform operations on the bit vectors without using memory (e.g., Random Access Memory (RAM) or the like), resulting in extremely fast computation times. Thus, the system 100 may perform Boolean operations, set theoretic searches (e.g., inclusion, intersection and/or set difference), identify all sets of adjacent and consecutive resources of size n (e.g., using O(n) bit operation), and/or the like without accessing the memory.

As illustrated in FIG. 1, the system 100 may map (130) a seat chart to a bit vector and may determine (132) bit vector(s) for attributes associated with the seat locations. For example, the seat chart may include a number of seat locations in a plurality of rows and/or sections and the bit vector may include individual bits corresponding to each of the seat locations. The bit vector(s) may indicate aisle seat locations, handicap accessible seat locations, seat locations in specific sections, seat locations associated with a price below a threshold, seat locations near the front and/or back of a section, etc. The system 100 may generate any number of bit vector(s) to indicate a variety of attributes associated with the seat locations.

The system 100 may receive (134) a search query indicating a number of tickets and/or desired attributes associated with the tickets. For example, the search query may indicate that the user would like to reserve three tickets in a particular section, for a price below a threshold (e.g., $60), with one ticket being on an aisle and one ticket being handicap accessible.

The system 100 may select (136) bit vector(s) corresponding to the search query and may determine (138) a search bit vector by combining the bit vector(s). For example, the system 100 may select an aisle bit vector, a handicap accessible bit vector, a section bit vector and a price bit vector and may generate the search bit vector by combining each of the bit vectors using an AND operation. Thus, a bit associated with a first binary value (e.g., 1) in the search bit vector corresponds to bits associated with the first binary value in each of the bit vectors, indicating that a corresponding seat location is associated with each of the desired attributes.

The system 100 may compare (140) the search bit vector to an availability bit vector to determine a search results bit vector. For example, the system 100 may combine the search bit vector and the availability bit vector using the AND operation. The search results bit vector indicates available seat locations that satisfy the search query. For example, bits associated with the first binary value (e.g., 1) may correspond to available seat locations, while bits associated with the second binary value (e.g., 0) may correspond to unavailable seat locations or may not correspond to seat locations at all.

The system 100 may select (142) bits in the search results bit vector that satisfy the search query and the number of tickets. For example, the system 100 may identify and select bits corresponding to three adjacent seat locations in a particular section that have a price below the threshold (e.g., $60), with at least one seat location being on an aisle and at least one seat location being handicap accessible. The system 100 may change (144) bit values for the selected bits in the availability bit vector to reserve the tickets. For example, the system 100 may change a bit value associated with the selected bits in the availability bit vector from the first binary value (e.g., 1, indicating that the seat location is available) to the second binary value (e.g., 0, indicating that the seat location is unavailable). Thus, subsequent search queries will indicate that the seat locations are unavailable, reducing a failure rate caused by multiple devices attempting to reserve the same seat locations.

The system 100 may determine (146) seat locations corresponding to the selected bits and may send (148) an indication of the seat locations and/or attributes associated with the seat locations to the device 110. For example, the system 100 may identify that the selected bits correspond to particular seat locations (e.g., Seats 10-13 in Row A in Section 101), that Seat 10 is both handicap accessible and on the aisle, that all three seat locations cost $59, and/or any other attributes associated with the seat locations.

In some examples, the server(s) 120 may determine the seat locations and the attributes associated with the seat locations and may send the indication of the seat locations and the attributes to the device 110. However, the disclosure is not limited thereto and the server(s) 120 may send an indication of the seat locations to the device 110 and the device 110 may determine the attributes associated with the seat locations without departing from the disclosure. For example, the server(s) 120 may send the bit vector(s) for attributes associated with seat locations before reserving the seat locations (e.g., before receiving the search query and/or in response to receiving the search query). Thus, after reserving the seat locations, the server(s) 120 may send a bit vector indicating the selected bits and the device 110 may receive the bit vector, determine the seat locations corresponding to the selected bits and/or determine the attributes associated with the seat locations using the bit vector(s).

FIGS. 2A-2C illustrate examples of generating seat bit vectors corresponding to seat charts according to examples of the present disclosure. As illustrated in FIG. 2C, a seat chart 200 may correspond to a number of seat locations in a venue. For example, the seat chart 200 includes Rows A-F in three different sections of seat locations, with a first aisle between a first section 202 and a second section 204 (e.g., between Seat 4 and Seat 5 for each row) and a second aisle between the second section 204 and a third section 206 (e.g., between Seats 9-14 and Seats 10-15 for rows A-F, respectively).

To map the seat chart 200 to a bit vector, FIG. 2A illustrates a modified seat chart 210 to illustrate the seat locations when aligned by row. Thus, a bottom row of the modified seat chart 210 corresponds to Row A and includes Seats 1-13, with the first aisle between Seat 4 and Seat 5 and the second aisle between Seat 9 and Seat 10, whereas a top row of the modified seat chart 210 corresponds to Row F and includes Seats 1-18, with the first aisle between Seat 4 and Seat 5 and the second aisle between Seat 14 and Seat 15.

FIG. 2A illustrates a seat bit vector 220 corresponding to the modified seat chart 210. For example, a bottom row of the seat bit vector 220 corresponds to Row A and maps the first section 202 to columns 1-4 (e.g., Seat 1 maps to column 1, Seat 2 maps to column 2, etc.), the first aisle to columns 5-6 (e.g., columns 5 and 6 have binary values of zero), the second section 204 to columns 7-11 (e.g., Seat 5 maps to column 7, Seat 6 maps to column 8, etc.), the second aisle to columns 12-13 (e.g., columns 12 and 13 have binary values of zero), the third section 206 to columns 14-17 (e.g., Seat 10 maps to column 14, Seat 11 maps to column 15, etc.), and leaves columns 18-22 blank (e.g., binary values of zero). Similarly, a top row of the seat bit vector 220 corresponds to Row F and maps the first section 202 to columns 1-4 (e.g., Seat 1 maps to column 1, Seat 2 maps to column 2, etc.), the first aisle to columns 5-6 (e.g., columns 5 and 6 have binary values of zero), the second section 204 to columns 7-16 (e.g., Seat 5 maps to column 7, Seat 6 maps to column 8, etc.), the second aisle to columns 17-18 (e.g., columns 17 and 18 have binary values of zero) and the third section 206 to columns 19-22 (e.g., Seat 15 maps to column 19, Seat 16 maps to column 20, etc.).

Thus, the seat bit vector 220 includes first binary values (e.g., 1) corresponding to each of the seat locations in the modified seat chart 210 and second binary values (e.g., 0) corresponding to the first aisle, the second aisle and the unused portion of the seat bit vector 220 in the bottom right, which are highlighted in gray for ease of illustration. While the seat bit vector 220 includes two bits for each aisle, the disclosure is not limited and the number of bits may vary without departing from the disclosure. For example, the seat bit vector 220 may model the first aisle using one bit (e.g., column 5) and/or three or more bits (e.g., columns 5-8) without departing from the disclosure.

While FIG. 2A illustrates the system 100 mapping the seat chart 200 to the modified seat chart 210 and/or the seat bit vector 220, this is only one example and the disclosure is not limited thereto. For example, the system 100 may include additional bits between the second section 204 and the third section 206, such that columns 19-22 correspond to the third section 206 for all of Rows A-F, without departing from the disclosure.

Additionally or alternatively, FIG. 2B illustrates a different example of mapping the seat chart 200 to a modified seat chart 212 and a seat bit vector 222. In contrast to the modified seat chart 210, which maps all three sections of the seat chart 200 to a single row of the modified seat chart 210, the modified seat chart 212 maps each section separately. Thus, a first portion of the modified seat chart 212 corresponds to the first section 202, a second portion of the modified seat chart 212 corresponds to the second section 204 and a third portion of the modified seat chart 212 corresponds to the third section 206.

FIG. 2B illustrates the seat bit vector 222 corresponding to the modified seat chart 212. For example, a first portion (e.g., rows 1-6) of the seat bit vector 222 corresponds to the first section 202 and includes four seats (e.g., columns 1-4 corresponding to Seats 1-4 for Rows A-F), a second portion (e.g., rows 8-13) of the seat bit vector 222 corresponds to the second section 204 and includes between five and ten seats (e.g., columns 1-5 corresponding to Seats 5-9 for Row A and columns 1-10 correspond to Seats 5-14 for Row F), and a third portion (e.g., rows 15-20) of the seat bit vector 222 corresponds to the third section 206 and includes four seats (e.g., columns 1-4 corresponding to Seats 10-13 for Row A and Seats 15-18 for Row F).

Thus, the seat bit vector 222 includes first binary values (e.g., 1) corresponding to each of the seat locations in the modified seat chart 212 and second binary values (e.g., 0) for remaining bits in the seat bit vector 222 (highlighted in gray) that are not mapped to a seat location and are used to separate the sections. While the seat bit vector 222 separates the sections by one row (e.g., row 7 and row 14), the disclosure is not limited thereto and the seat bit vector 222 may separate the sections using two or more rows without departing from the disclosure.

In some examples, the venue may have multiple seating configurations. For example, a stadium may have a first seating configuration for a sporting event (e.g., football game) and a second seating configuration for a concert. Thus, the system 100 may generate multiple seat bit vectors corresponding to the multiple seating configurations. For example, FIG. 2C illustrates a seat chart 250 that removes Seats 3-11 in Row A and Seats 3-12 in Row B.

As illustrated in FIG. 2C, the seat chart 250 may correspond to a number of seat locations in the venue and includes Rows A-F in three different sections of seat locations, with a first aisle between a first section 252 and a second section 254 (e.g., between Seat 4 and Seat 5 for each row), a second aisle between the second section 254 and a third section 256 (e.g., between Seats 9-14 and Seats 10-15 for rows A-F, respectively), and a portion of the first two rows removed (e.g., to make room for an orchestra pit or the like).

To map the seat chart 250 to a bit vector, FIG. 2C illustrates a modified seat chart 260 to illustrate the seat locations when aligned by row. Thus, a bottom row of the modified seat chart 260 corresponds to Row A and includes Seats 1-2 and Seats 12-13, with a gap including the first aisle and the second aisle between Seat 2 and Seat 12, a second row corresponds to Row B and includes Seats 1-2 and Seats 13-14, with a gap including the first aisle and the second aisle between Seat 2 and Seat 13, and so on until a top row that corresponds to Row F and includes Seats 1-18, with the first aisle between Seat 4 and Seat 5 and the second aisle between Seat 14 and Seat 15.

FIG. 2C illustrates a seat bit vector 270 corresponding to the modified seat chart 260. For example, a bottom row of the seat bit vector 270 corresponds to Row A and maps the first section 252 to columns 1-2 (e.g., Seat 1 maps to column 1 and Seat 2 maps to column 2), the gap to columns 3-15 (e.g., columns 3-15 have binary values of zero), the third section 256 to columns 16-17 (e.g., Seat 12 maps to column 16 and Seat 13 maps to column 17), and leaves columns 18-22 blank (e.g., binary values of zero). Similarly, a second row of the seat bit vector 270 corresponds to Row B and maps the first section 252 to columns 1-2 (e.g., Seat 1 maps to column 1 and Seat 2 maps to column 2), the gap to columns 3-16 (e.g., columns 3-16 have binary values of zero), the third section 256 to columns 17-18 (e.g., Seat 13 maps to column 17 and Seat 14 maps to column 18), and leaves columns 19-22 blank (e.g., binary values of zero). Finally, a top row of the seat bit vector 270 corresponds to Row F and maps the first section to columns 1-4 (e.g., Seat 1 maps to column 1, Seat 2 maps to column 2, etc.), the first aisle to columns 5-6 (e.g., columns 5 and 6 have binary values of zero), the second section to columns 7-16 (e.g., Seat 5 maps to column 7, Seat 6 maps to column 8, etc.), the second aisle to columns 17-18 (e.g., columns 17 and 18 have binary values of zero) and the third section to columns 19-22 (e.g., Seat 15 maps to column 19, Seat 16 maps to column 20, etc.).

Thus, the seat bit vector 270 includes first binary values (e.g., 1) corresponding to each of the seat locations in the modified seat chart 260 and second binary values (e.g., 0) corresponding to the first aisle, the second aisle, the gap (e.g., orchestra pit) and the unused portion of the seat bit vector 270 in the bottom right, which are highlighted in grey for ease of illustration. While the seat bit vector 270 includes two bits for each aisle, the disclosure is not limited and the number of bits may vary without departing from the disclosure. For example, the seat bit vector 270 may model the first aisle using one bit (e.g., column 5) and/or three or more bits (e.g., columns 5-8) without departing from the disclosure.

FIGS. 3A-3F illustrate examples of bit vectors according to examples of the present disclosure. After mapping the seat chart to a bit vector, the system 100 may generate additional bit vectors using the same mapping. For example, the system 100 may generate an availability bit vector indicating available seat locations, an aisle bit vector indicating seat locations on an aisle, a handicap accessible bit chart indicating seat locations that are handicap accessible, a price bit vector indicating seat locations with a price below a threshold or within a range, a front rows bit vector indicating seat locations within n rows of the front of a section, a back rows bit vector indicating seat locations within n rows of the back of a section, or the like.

FIG. 3A illustrates an example of an availability chart 300 indicating seat locations that are available (e.g., not yet reserved). As illustrated in FIG. 3A, the availability chart and a modified availability chart 310 indicates that the only reserved seat locations are A5-A9, C6-C11 and F5-F14, with the remaining seat locations being available. Thus, an availability bit vector 320 corresponding to the modified availability chart 310 is similar to the seat bit vector 220 discussed above, except with second binary values (e.g., 0) for row A, columns 7-11, which correspond to seat locations A5-A9, row C, columns 8-13, which correspond to seat locations C6-C11, and row F, columns 7-16, which correspond to seat locations F5-F14. Thus, the system 100 may perform Boolean operations using the availability bit vector 220 to determine which seat locations are available.

To identify which seat locations satisfy a search query, the system 100 may generate a number of bit vectors corresponding to attributes associated with the seat locations. For example, FIG. 3B illustrates an aisle chart 302 and a modified aisle chart 312 that indicates seat locations associated with an aisle (e.g., Seat 4 in rows A-F, Seat 5 in rows A-F, etc.). The system 100 may generate an aisle bit vector 322 that indicates the seat locations that are associated with an aisle. For example, bits in the aisle bit vector 322 that are associated with an aisle have a first binary value (e.g., 1) and the remaining bits that are not associated with an aisle have a second binary value (e.g., 0).

FIG. 3C illustrates a handicap accessible chart 314 that indicates seat locations that are handicap accessible (e.g., Seat 5 and Seat 9 in Row A, Seat 4, Seat 5, Seat 14 and Seat 15 in Row F). The system 100 may generate a handicap accessible bit vector 324 that indicates the seat locations that are handicap accessible. For example, bits in the handicap accessible bit vector 322 that are handicap accessible have the first binary value (e.g., 1) and the remaining bits that are not handicap accessible have the second binary value (e.g., 0). In some examples, handicap accessible seats are seats with special characteristics, such as seats configured to support greater weight, configured with handrails or other supports, and/or other handicap friendly features. In other examples, handicap accessible seat locations are locations configured for wheelchairs or other mobility devices, lacking a seat entirely.

While FIG. 3C describes handicap accessible seat locations, this is intended as an illustrative example and the disclosure is not limited thereto. Instead, the venue may include seat locations with multiple seat sizes or other variations between seats and the system 100 may generate a bit vector for each of the multiple seat sizes. For example, a search query may specify a seat size and/or a range of seat sizes and the system 100 may identify seat locations that satisfy the request. To illustrate an example, the venue may include different classes and/or types of seating, such as first class, business class, VIP area, sky box, etc. Thus, the system 100 may generate a bit vector for each of the different classes of seating, enabling the system 100 to identify seat locations that satisfy a search query specifying a class of seating.

FIG. 3D illustrates a price chart 316 that indicates seat locations associated with a price below a threshold and/or within a price range (e.g., Seats in the first section 202 and the third section 206). The system 100 may generate a price bit vector 326 that indicates the seat locations that have a price below the threshold and/or in the price range. For example, bits in the price bit vector 326 that are below the threshold and/or within the price range have the first binary value (e.g., 1) and the remaining bits that are above the threshold and/or outside of the price range have the second binary value (e.g., 0).

FIG. 3E illustrates a front rows chart 330 that indicates seat locations that are within n rows of a front of the venue and/or a section (e.g., seat locations located in Rows A-B). The system 100 may generate a front rows bit vector 340 that indicates the seat locations that are within the n rows of the front. For example, bits in the front rows bit vector 340 that are in the front two rows have the first binary value (e.g., 1) and the remaining bits that are not in the front two rows have the second binary value (e.g., 0).

FIG. 3F illustrates a back rows chart 332 that indicates seat locations that are within n rows of a back of the venue and/or a section (e.g., seat locations located in Rows E-F). The system 100 may generate a back rows bit vector 342 that indicates the seat locations that are within the n rows of the back. For example, bits in the back rows bit vector 342 that are in the back two rows have the first binary value (e.g., 1) and the remaining bits that are not in the back two rows have the second binary value (e.g., 0).

While FIGS. 3A-3F illustrate examples of a variety of attributes associated with seat locations, the disclosure is not limited thereto and the attributes may vary without departing from the disclosure. In some examples, the system 100 may generate bit vectors corresponding to attributes not listed above that are associated with seat locations without departing from the disclosure. Additionally or alternatively, the system 100 may generate bit vectors corresponding to attributes not listed above that are associated with items or other resources without departing from the disclosure. For example, a plurality of items (e.g., art work, clothing, collector's items, etc.) may be mapped to a bit vector and the system 100 may generate additional bit vectors corresponding to attributes (e.g., artist, color, price, features, etc.) associated with the plurality of items without departing from the disclosure.

FIGS. 3A-3F illustrate examples of a variety of positive attributes associated with seat locations. In the examples illustrated, the system 100 may identify desired attributes included in a search query and may identify seat locations associated with the desired attributes. For example, the system 100 may generate bit vectors associated with the desired attributes and may perform an AND operation with the bit vectors and an availability bit vector to identify seat locations that satisfy the search query. However, the disclosure is not limited thereto and the system 100 may also identify negative attributes associated with seat locations. without departing from the present disclosure For example, the system 100 may identify seat locations having a restricted view. Instead of performing an AND operation using the restricted view bit vector and the availability bit vector, the system 100 may perform a NOT operation with the restricted view bit vector to remove any of the available seat locations that have a restricted view.

While FIGS. 3A-3F illustrate examples of a variety of attributes associated with the seat locations themselves, the disclosure is not limited thereto and the system 100 may generate bit vectors indicating features associated with the seat locations. For example, the system 100 may identify seat locations associated with nearby amenities (e.g., concession stands, restaurants, VIP seating, lounges, private parking, parking bundled with seat locations, specific entrances, etc.), seat locations associated with additional items (e.g., free t-shirts, collector's edition memorabilia, etc.) or the like.

For the nearby amenities, the system 100 may generate multiple bit vectors indicating proximity between the amenities and the seat locations. For example, a first bit vector may correspond to a first distance (e.g., far away) and may include a number of seat locations within the first distance to the amenity, a second bit vector may correspond to a second distance (e.g., nearby) and may include a smaller number of seat locations within the second distance to the amenity, and a third bit vector may correspond to a third distance (e.g., close by) and may include an even smaller number of seat locations within the third distance to the amenity. Thus, a search query may specify the desired distance and the system 100 may determine a bit vector corresponding to the desired distance. In addition to the amenities discussed above (e.g., concession stands, restaurants, VIP seating, lounges, private parking, parking bundled with seat locations, specific entrances, etc.), amenities may correspond to highways or other means of transportation. For example, the search query may indicate that the user will travel to the venue via mass transportation and the system 100 may identify seat locations located in proximity to the subway station or the like. Similarly, the search query may indicate that the user will travel via highway from a specific direction (e.g., north, west, etc.) and the system 100 may identify seat locations located in proximity to parking lots corresponding to the specific direction.

Figure 4A:
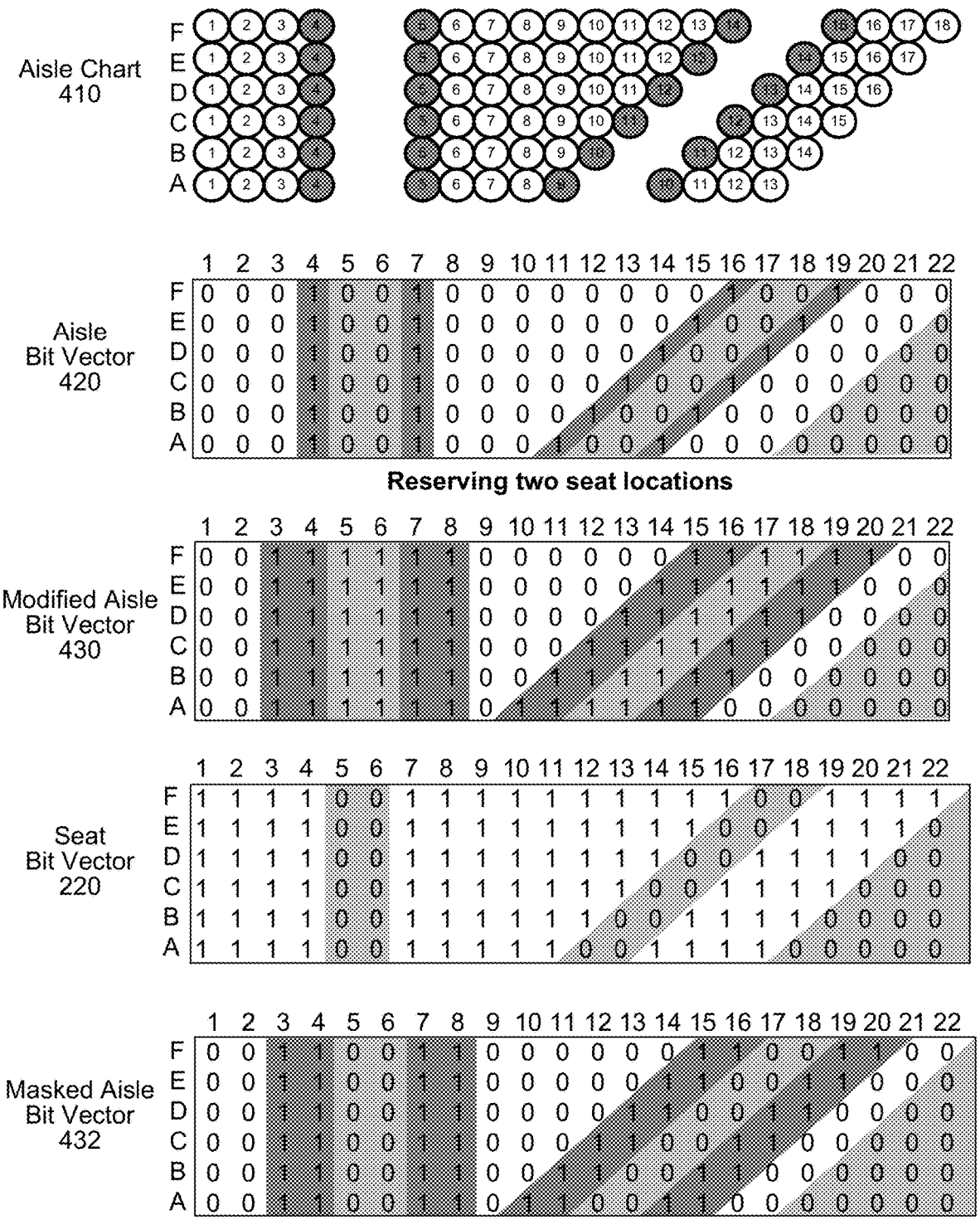

FIGS. 4A-4D illustrate examples of modifying bit vectors based on a number of tickets to purchase according to examples of the present disclosure. As illustrated in FIG. 4A, an aisle chart 410 may correspond to an aisle bit vector 420 indicating seat locations that are associated with an aisle. However, a search query typically requests two or more adjacent seats, with only one of the adjacent seats being on an aisle. Therefore, combining the aisle bit vector 420 with an availability bit vector would result in no seat locations that satisfy the search query as the aisle bit vector 420 does not include adjacent seats having the first binary value (e.g., 1).

Thus, in order to identify seat locations that satisfy the search query, the system 100 may modify the aisle bit vector 420 based on a number of seat locations to reserve indicated in the search query. For example, the system 100 may generate a first modified aisle bit vector 430 when the search query requests to reserve two seat locations, whereas the system 100 may generate a second modified aisle bit vector 440 when the search query requests to reserve three seat locations.

The first modified aisle bit vector 430 extends first binary values by one bit in both directions along a row. For example, the system 100 may determine that bits included in column 4 in the aisle bit vector 420 have the first binary value and may store the first binary value for bits included in column 3 and column 5 in the first modified aisle bit vector 430. Similarly, the system 100 may determine that bits included in column 7 in the aisle bit vector 420 have the first binary value and may store the first binary value for bits included in column 6 and column 8 in the first modified aisle bit vector 430. Thus, bits in columns 3-8 of the first modified aisle bit vector 430 are associated with the first binary value.

While the examples illustrated above are performed using individual bits, the system 100 may generate the first modified aisle bit vector 430 by performing shift operations on the aisle bit vector 420. For example, FIG. 4A illustrates reserving two seat locations, so the system 100 may perform one shift operation (e.g., the number of shift operations is equal to n−1) in both directions and combine the results from each of the shift operations. Thus, the system 100 may perform a left shift operation and a right shift operation and then may perform an OR operation to combine the results with the aisle bit vector 420 to generate the first modified aisle bit vector 430.

Combining the first modified aisle bit vector 430 with an availability vector (e.g., using an AND operation) will identify seat locations that include two seat locations that are adjacent to each other and an aisle. Note that while the first modified aisle bit vector 430 includes the first binary value for bits associated with the first aisle (e.g., columns 5-6), combining the first modified aisle bit vector 430 with the availability vector results in these bits being associated with the second binary value (e.g., 0). However, in some examples the system 100 may mask the first modified aisle bit vector 430 using the seat bit vector 220 to generate a first masked aisle bit vector 432. In contrast to the first modified aisle bit vector 430, the first masked aisle bit vector 432 indicates the aisles to avoid any confusion. Thus, the first binary values are extended only within actual seat locations and not to bits that are not associated with seat locations. While the example described above illustrates the system 100 generating the first modified aisle bit vector 430 and/or the first masked aisle bit vector 432, the disclosure is not limited thereto and the first modified aisle bit vector 430 and/or the first masked aisle bit vector 432 may be determined ahead of time by the system 100 and/or may be received from a separate device.

As illustrated in FIG. 4B, the system 100 may modify the aisle bit vector 420 based on a search query reserving three seat locations instead of two. For example, the system 100 may generate a second modified aisle bit vector 440 when the search query requests to reserve three seat locations. The second modified aisle bit vector 440 extends first binary values by two bits in both directions along a row. For example, the system 100 may determine that bits included in column 4 in the aisle bit vector 420 have the first binary value and may store the first binary value for bits included in columns 2-3 and columns 6-7 in the second modified aisle bit vector 432. Similarly, the system 100 may determine that bits included in column 7 in the aisle bit vector 420 have the first binary value and may store the first binary value for bits included in columns 5-6 and columns 8-9 in the second modified aisle bit vector 440. Thus, bits in columns 2-9 of the second modified aisle bit vector 440 are associated with the first binary value.

While the examples illustrated above are performed using individual bits, the system 100 may generate the second modified aisle bit vector 440 by performing shift operations on the aisle bit vector 420. For example, FIG. 4B illustrates reserving three seat locations, so the system 100 may perform two shift operations (e.g., the number of shift operations is equal to n−1) in both directions and combine the results from each of the shift operations. Thus, the system 100 may perform a first left shift operation, a second left shift operation, a right shift operation and a second right shift operation and then may perform an OR operation to combine the results with the aisle bit vector 420 to generate the second modified aisle bit vector 440.

Combining the second modified aisle bit vector 440 with an availability vector (e.g., using an AND operation) will identify seat locations that include three seat locations that are adjacent to each other and an aisle. Note that while the second modified aisle bit vector 440 includes the first binary value for bits associated with the first aisle (e.g., columns 5-6), combining the second modified aisle bit vector 440 with the availability vector results in these bits being associated with the second binary value (e.g., 0). However, in some examples the system 100 may mask the second modified aisle bit vector 440 using the seat bit vector 220 to generate a second masked aisle bit vector 442. In contrast to the second modified aisle bit vector 440, the second masked aisle bit vector 442 indicates the aisles to avoid any confusion. Thus, the first binary values are extended only within actual seat locations and not to bits that are not associated with seat locations. While the example described above illustrates the system 100 generating the second modified aisle bit vector 440 and/or the second masked aisle bit vector 442, the disclosure is not limited thereto and the second modified aisle bit vector 440 and/or the second masked aisle bit vector 442 may be determined ahead of time by the system 100 and/or may be received from a separate device.

Figure 4C:
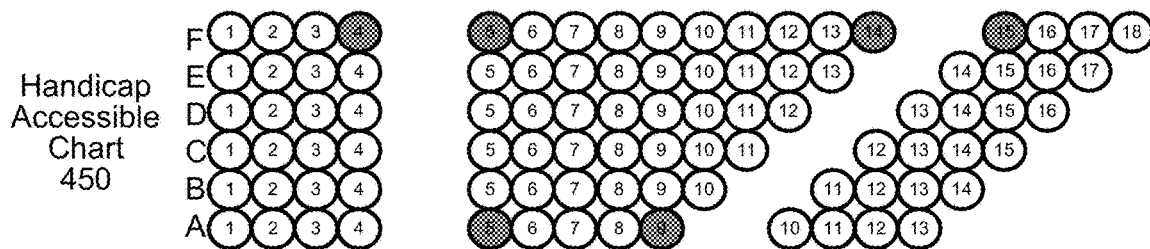

As illustrated in FIG. 4C, a handicap accessible chart 450 may correspond to a handicap accessible bit vector 460 indicating seat locations that are handicap accessible (e.g., Seats 5 and 9 in Row A and Seats 4-5 and 14-15 in Row F, which correspond to bits in columns 4, 7 and 11 of a bottom row and columns 4, 7, 16 and 19 in a top row in the handicap accessible bit vector 460). However, a search query typically requests two or more adjacent seats, with only one of the adjacent seats being handicap accessible. Therefore, combining the handicap accessible bit vector 460 with an availability bit vector would result in no seat locations that satisfy the search query as the handicap accessible bit vector 460 does not include adjacent seats having the first binary value (e.g., 1).

Thus, in order to identify seat locations that satisfy the search query, the system 100 may modify the handicap accessible bit vector 460 based on a number of seat locations to reserve indicated in the search query. For example, the system 100 may generate a first modified handicap accessible bit vector 470 when the search query requests to reserve two seat locations, whereas the system 100 may generate a second modified handicap accessible bit vector 480 when the search query requests to reserve three seat locations.

The first modified handicap accessible bit vector 470 extends first binary values by one bit in both directions along a row. For example, the system 100 may determine that a bit in column 4 of a bottom row of the handicap accessible bit vector 460 has the first binary value and may store the first binary value for bits included in column 3 and column 5 in the bottom row of the first modified handicap accessible bit vector 470. Similarly, the system 100 may determine that a bit included in column 7 in the bottom row of the handicap accessible bit vector 460 has the first binary value and may store the first binary value for bits included in column 6 and column 8 in the bottom row of the first modified handicap accessible bit vector 470. Thus, bits in columns 3-8 in the bottom row of the first modified handicap accessible bit vector 470 are associated with the first binary value.

While the examples illustrated above are performed using individual bits, the system 100 may generate the first modified handicap accessible bit vector 470 by performing shift operations on the handicap accessible bit vector 460. For example, FIG. 4C illustrates reserving two seat locations, so the system 100 may perform one shift operation (e.g., the number of shift operations is equal to n−1) in both directions and combine the results from each of the shift operations. Thus, the system 100 may perform a left shift operation and a right shift operation and then may perform an OR operation to combine the results with the handicap accessible bit vector 460 to generate the first modified handicap accessible bit vector 470.

Combining the first modified handicap accessible bit vector 470 with an availability vector (e.g., using an AND operation) will identify seat locations that include a handicap accessible seat location and an adjacent seat location. Note that while the first modified handicap accessible bit vector 470 includes the first binary value for bits associated with the first aisle (e.g., columns 5-6), combining the first modified handicap accessible bit vector 470 with the availability vector results in these bits being associated with the second binary value (e.g., 0). However, in some examples the system 100 may mask the first modified handicap accessible bit vector 470 using the seat bit vector 220 to generate a first masked handicap accessible bit vector 472. In contrast to the first modified handicap accessible bit vector 470, the first masked handicap accessible bit vector 472 indicates the aisles to avoid any confusion. Thus, the first binary values are extended only within actual seat locations and not to bits that are not associated with seat locations. While the example described above illustrates the system 100 generating the first modified handicap accessible bit vector 470 and/or the first masked handicap accessible bit vector 472, the disclosure is not limited thereto and the first modified handicap accessible bit vector 470 and/or the first masked handicap accessible bit vector 472 may be determined ahead of time by the system 100 and/or may be received from a separate device.

Figure 4D:
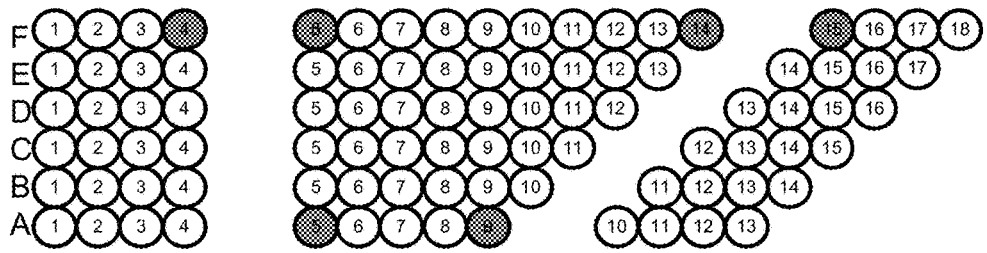

As illustrated in FIG. 4D, the system 100 may modify the aisle bit vector 420 based on a search query reserving three seat locations instead of two. For example, the system 100 may generate a second modified handicap accessible bit vector 472 when the search query requests to reserve three seat locations. The second modified handicap accessible bit vector 480 extends the first binary values by two bits in both directions along a row. For example, the system 100 may determine that the bit in column 4 of the bottom row of the handicap accessible bit vector 460 has the first binary value and may store the first binary value for bits included in columns 2-3 and columns 5-6 in the bottom row of the second modified handicap accessible bit vector 480. Similarly, the system 100 may determine that the bit included in column 7 in the bottom row of the handicap accessible bit vector 460 has the first binary value and may store the first binary value for bits included in columns 5-6 and columns 8-9 in the bottom row of the second modified handicap accessible bit vector 480. Thus, bits in columns 2-9 in the bottom row of the second modified handicap accessible bit vector 472 are associated with the first binary value.

While the examples illustrated above are performed using individual bits, the system 100 may generate the second modified handicap accessible bit vector 480 by performing shift operations on the handicap accessible bit vector 460. For example, FIG. 4D illustrates reserving three seat locations, so the system 100 may perform two shift operations (e.g., the number of shift operations is equal to n−1) in both directions and combine the results from each of the shift operations. Thus, the system 100 may perform a first left shift operation, a second left shift operation, a right shift operation and a second right shift operation and then may perform an OR operation to combine the results with the handicap accessible bit vector 460 to generate the second modified handicap accessible bit vector 480.

Combining the second modified handicap accessible bit vector 480 with an availability vector (e.g., using an AND operation) will identify seat locations that include a handicap accessible seat location and two adjacent seat locations. Note that while the second modified handicap accessible bit vector 480 includes the first binary value for bits associated with the first aisle (e.g., columns 5-6), combining the second modified handicap accessible bit vector 480 with the availability vector results in these bits being associated with the second binary value (e.g., 0). However, in some examples the system 100 may mask the second modified handicap accessible bit vector 480 using the seat bit vector 220 to generate a second masked handicap accessible bit vector 482. In contrast to the second modified handicap accessible bit vector 480, the second masked handicap accessible bit vector 482 indicates the aisles to avoid any confusion. Thus, the first binary values are extended only within actual seat locations and not to bits that are not associated with seat locations. While the example described above illustrates the system 100 generating the second modified handicap accessible bit vector 480 and/or the second masked handicap accessible bit vector 482, the disclosure is not limited thereto and the second modified handicap accessible bit vector 480 and/or the second masked handicap accessible bit vector 482 may be determined ahead of time by the system 100 and/or may be received from a separate device.

FIGS. 5A-5B illustrate examples of generating search results bit vectors according to examples of the present disclosure. As illustrated in FIG. 5A, the availability bit vector 320 may indicate seat locations that are available (e.g., all seats except Seats 5-9 in Row A, Seats 6-11 in Row C and Seats 5-14 in Row F). The system 100 may combine the availability bit vector 320 with the second modified aisle bit vector 432 to generate a search results bit vector 540 that indicates available seat locations that are within two seats of a seat location on an aisle. For example, the search results bit vector 540 indicates that there are multiple available seat locations in Section 202 (e.g., Seats 2-4 in Rows A-F), a few available seat locations in Section 204 (e.g., Seats 5-10 in Row A, Seats 5-7 and 10-12 in Row D, and Seats 5-7 and 11-13 in Row E), and multiple available seat locations in Section 206 (e.g., Seats 10-12 in Row A, Seats 11-13 in Row B, etc.) that satisfy the search query.

As illustrated in FIG. 5B, the system 100 may combine the availability bit vector 320 with the second modified handicap accessible bit vector 472 to generate a search results bit vector 542 that indicates available seat locations that are within two seats of a handicap accessible seat location. For example, the search results bit vector 542 indicates that Seats 2-4 in Row A, Seats 2-4 in Row F, and Seats 15-17 in Row F are available and satisfy the search query.

While FIGS. 5A-5B illustrate examples of determining search bit vectors based on a single attribute (e.g., combining the availability bit vector 320 with either the second modified aisle bit vector 432 or the second modified handicap accessible bit vector 472), the disclosure is not limited thereto. Instead, the system 100 may combine a plurality of bit vectors to generate a search bit vector and may determine a search results bit vector by combining the search bit vector with the availability bit vector. Thus, the search bit vector may correspond to each of the attributes indicated by the search query and the system 100 may update the search results bit vector as needed by combining the search results bit vector with the availability bit vector.

Figure 6B:
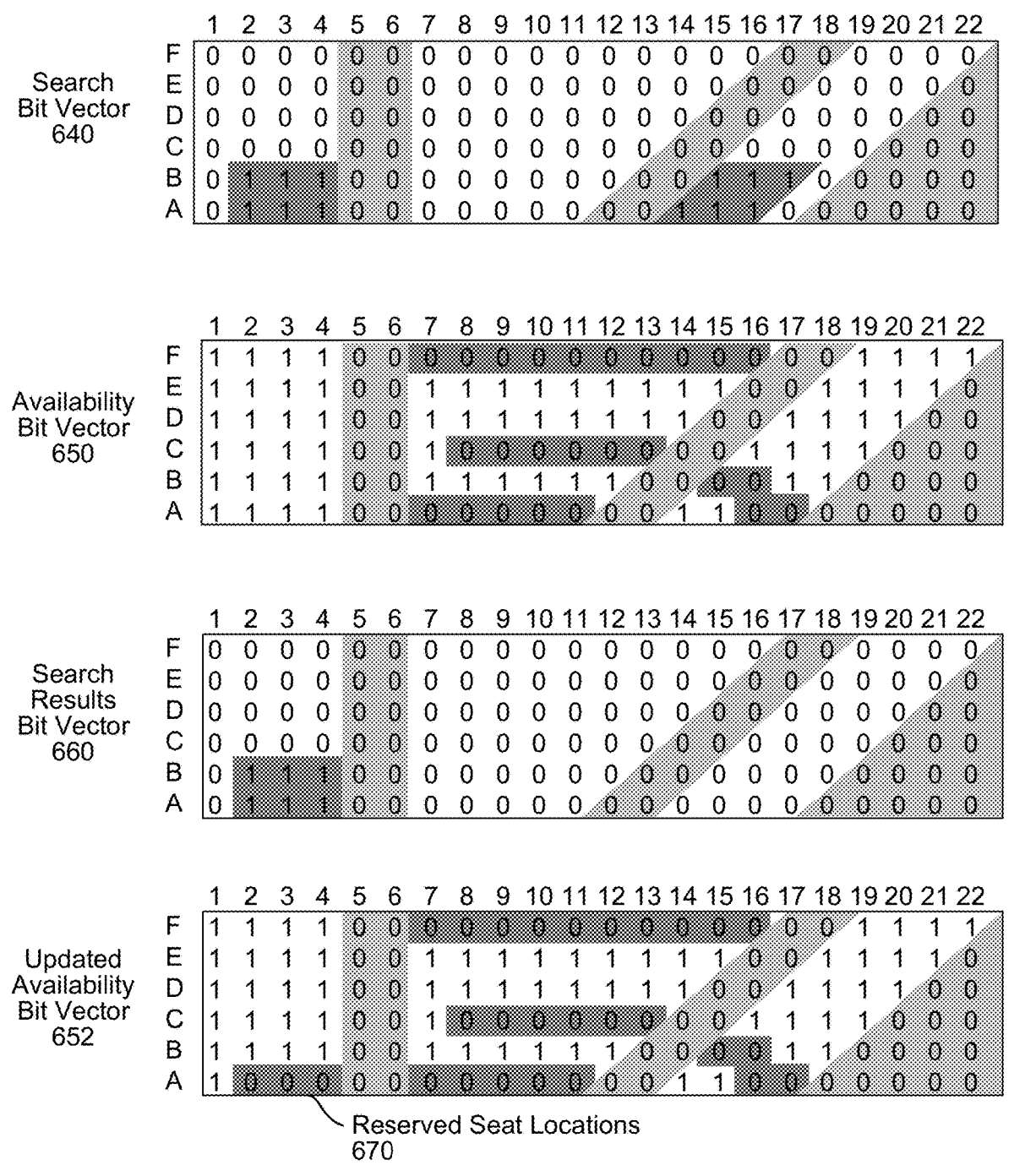

FIGS. 6A-6B illustrate examples of generating search bit vectors and search results bit vectors according to examples of the present disclosure. For example, the system 100 may receive a search query requesting that the system 100 reserve three seat locations within a price range that are located on an aisle near the stage. As illustrated in FIG. 6A, the system 100 may identify a price bit vector 610 corresponding to seat locations within the price range, a front rows bit vector 620 corresponding to seat locations within two rows of the stage, and a modified aisle bit vector 630 corresponding to seat locations on an aisle when reserving three seat locations. The system 100 may combine these bit vectors using an AND operation to generate a search bit vector 640. Thus, a first binary value (e.g., 1) in the search bit vector 640 corresponds to seat locations that are within the price range, in the first two rows and adjacent to an aisle (e.g., Seats 2-4 and Seats 10-12 in Row A and Seats 2-4 and Seats 11-13 in Row B).

As illustrated in FIG. 6B, the system 100 may combine the search bit vector 640 with an availability bit vector 650 to generate a search results bit vector 660. As Seats 12-13 in Row A and Seats 11-12 in Row B are unavailable (e.g., columns 17-18 in a bottom row and columns 15-16 in a second row of the availability bit vector 650 have the second binary value indicating that they are unavailable), the system 100 may determine that only Seats 2-4 in Row A and Seats 2-4 in Row B satisfy the search query. Thus, the system 100 may select seat locations corresponding to Seats 2-4 in Row A and may reserve the seat locations by changing the first binary value to the second binary value for the selected bits (e.g., columns 2-4 in the bottom row) in the availability bit vector 650. Thus, FIG. 6B illustrates an updated availability bit vector 652 that indicates that the reserved seat locations 670 (e.g., columns 2-4 in the bottom row, corresponding to Seats 2-4 in Row A) have the second binary value and are therefore unavailable.

In addition to identifying seat locations that are available, the system 100 may identify adjacent seat locations that satisfy the search query. For example, if the search query requests that the system 100 reserve four adjacent seat locations, the system 100 may identify four adjacent bits in the search results bit vector that have the first binary value (e.g., 1).

Figure 7A:
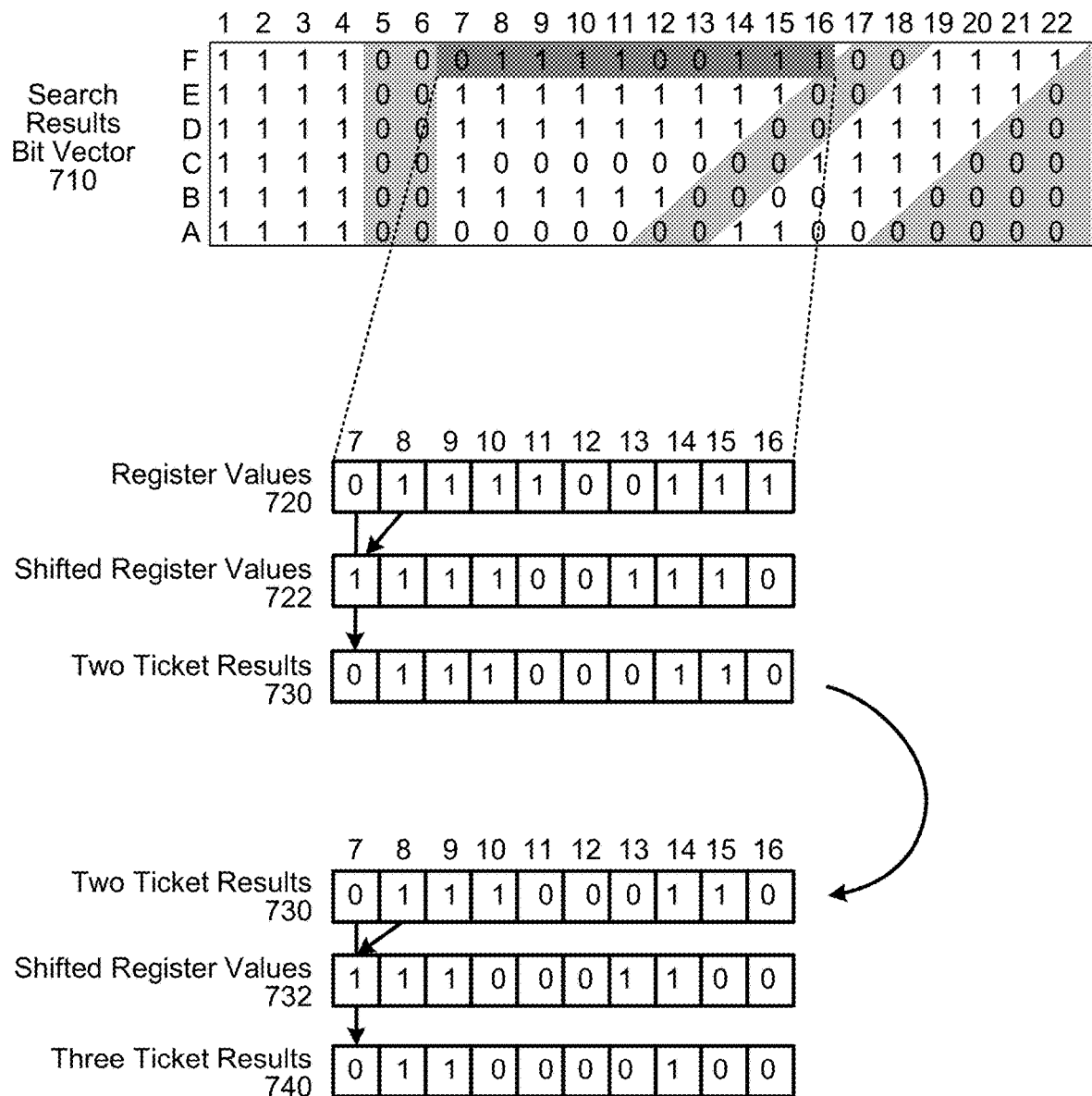

FIGS. 7A-7B illustrate examples of using shift operations to identify bits that satisfy a search query according to examples of the present disclosure. As illustrated in FIG. 7A, the system 100 may generate a search results bit vector 710 and may store at least a portion of the search results bit vector 710 in a register. The system 100 may perform a number of shift operations on the register based on the number of seat locations to reserve specified in the search query. For example, the system 100 may determine that the search query requests the system 100 to reserve a first number of seat locations (e.g., n) and may determine to perform a second number of shift operations (e.g., n−1).

For ease of illustration, FIG. 7A illustrates the system 100 storing columns 7-16 of a top row of the search results bit vector 710 (e.g., Seats 5-14 in Row F) in the register as register values 720. However, the disclosure is not limited thereto and the system 100 may store any portion and/or an entirety of the search results bit vector 710 without departing from the present disclosure.

As illustrated in FIG. 7A, the system 100 may determine that two adjacent bits in the search results bit vector 710 are available by performing a single shift operation. For example, the system 100 may perform a left shift operation on the register values 720 to generate first shifted register values 722 and may perform an AND operation on the register values 720 and the first shifted register values 722 to generate two ticket results 730. As the system 100 generated the two ticket results 730 using a shift operation in a first direction (e.g., to the left), each bit in the two ticket results 730 indicates whether a corresponding seat location and an adjacent seat location in a second direction (e.g., to the right) are available. Thus, column 8 has a first binary value (e.g., 1) indicating that seats 6-7 are available and included in the search results bit vector 710, column 9 has the first binary value (e.g., 1) indicating that seats 7-8 are available and included in the search results bit vector 710, and so on. However, while seat 9 (e.g., column 11) is available and included in the search results bit vector 710, the seat adjacent to seat 9 in the second direction (e.g., seat 10, or column 12) is unavailable. Therefore, column 11 in the two ticket results 730 has a second binary value (e.g., 0).

While FIG. 7A and the following drawings illustrates the system 100 performing the shift operation in the first direction (e.g., to the left), the disclosure is not limited thereto and the system 100 may perform the shift operation in the second direction (e.g., to the right), such that each bit indicates whether a corresponding seat location and an adjacent seat location in the first direction (e.g., to the left) are available, without departing from the present disclosure.

FIG. 7A also illustrates that the system 100 may determine that three adjacent bits in the search results bit vector 710 are available by performing an additional shift operation using the two ticket results 730. For example, the system 100 may perform a left shift operation on the two ticket results 730 to generate second shifted register values 732 and may perform an AND operation on the two ticket results 730 and the second shifted register values 732 to generate three ticket results 740. As the system 100 generated the three ticket results 740 using a shift operation in the first direction (e.g., to the left), each bit in the three ticket results 740 indicates whether a corresponding seat location and two adjacent seat locations in the second direction (e.g., to the right) are available. Thus, column 8 has the first binary value (e.g., 1) indicating that seats 6-8 are available and included in the search results bit vector 710, column 9 has the first binary value (e.g., 1) indicating that seats 7-9 are available and included in the search results bit vector 710, and so on. However, while seat 8 (e.g., column 10) is available and included in the search results bit vector 710, as well as adjacent seat 9 (e.g., column 11), the seat adjacent to seat 9 in the second direction (e.g., seat 10, or column 12) is unavailable. Therefore, column 10 in the three ticket results 740 has the second binary value (e.g., 0).

Using the technique illustrated in FIG. 7A, the system 100 may iteratively determine search results for each number of seat locations to reserve. For example, the system 100 may determine the two ticket results 730, may use the two ticket results 730 to generate the three ticket results 740, may use the three ticket results 740 to generate four ticket results, and so on. However, the system 100 may generate the three ticket results 740 and/or the four ticket results directly from the search results bit vector 710 and/or the register values 720 by performing multiple shift operations. As discussed above, the system 100 may determine that the search query requests the system 100 to reserve a first number of seat locations (e.g., n) and may determine to perform a second number of shift operations (e.g., n−1). Thus, the system 100 may perform the second number of shift operations on the search results bit vector 710 to generate one or more shifted register values and may perform an AND operation using each of the one or more shifted register values and the search results bit vector 710 to generate a results bit vector, as described in greater detail below.

FIG. 7B illustrates an example of the system 100 determining that three adjacent bits in the search results bit vector 710 are available by performing two shift operations. For example, the system 100 may perform a first left shift operation on the register values 720 to generate first shifted register values 722 and may perform a second left shift operation on the first shifted register values 722 to generate second shifted register values 724. The system 100 may generate three ticket results 740 by performing an AND operation on the register values 720, the first shifted register values 722 and the second shifted register values 724. As the system 100 generated the three ticket results 740 using shift operations in the first direction (e.g., to the left), each bit in the three ticket results 740 indicates whether a corresponding seat location and two adjacent seat locations in the second direction (e.g., to the right) are available in the search results bit vector 710. Thus, column 8 has the first binary value (e.g., 1) indicating that seats 6-8 are available and included in the search results bit vector 710, column 9 has the first binary value (e.g., 1) indicating that seats 7-9 are available and included in the search results bit vector 710, and so on. However, while seat 8 (e.g., column 10) is available and included in the search results bit vector 710, as well as adjacent seat 9 (e.g., column 11), the seat adjacent to seat 9 in the second direction (e.g., seat 10, or column 12) is unavailable. Therefore, column 10 in the three ticket results 740 has the second binary value (e.g., 0).

Similarly, FIG. 7B illustrates an example of the system 100 determining that four adjacent bits in the search results bit vector 710 are available by performing three shift operations. For example, the system 100 may perform the first left shift operation on the register values 720 to generate the first shifted register values 722, may perform the second left shift operation on the first shifted register values 722 to generate the second shifted register values 724, and may perform a third shift operation on the second shifted register values 724 to generate third shifted register values 726. The system 100 may generate four ticket results 750 by performing an AND operation on the register values 720, the first shifted register values 722, the second shifted register values 724 and the third shifted register values 726. As the system 100 generated the four ticket results 750 using shift operations in the first direction (e.g., to the left), each bit in the four ticket results 750 indicates whether a corresponding seat location and three adjacent seat locations in the second direction (e.g., to the right) are available in the search results bit vector 710. Thus, column 8 has the first binary value (e.g., 1)

indicating that seats 6-9 are available and included in the search results bit vector 710. However, while seat 7 (e.g., column 9) is available and included in the search results bit vector 710, as well as adjacent seats 8-9 (e.g., columns 10-11), the seat adjacent to seat 9 in the second direction (e.g., seat 10, or column 12) is unavailable. Therefore, column 9 in the four ticket results 750 has the second binary value (e.g., 0).

To clearly illustrate the results of performing the shift operations, FIG. 7C illustrates the search results bit vector 710 (e.g., reserving one seat location), a second search results bit vector 712 (e.g., reserving two seat locations), a third search results bit vector 714 (e.g., reserving three seat locations) and a fourth search results bit vector 716 (e.g., reserving four seat locations). As illustrated in FIG. 7C, increasing the number of seat locations to reserve shifts the second binary values (e.g., 0) to the left in a group of available seat locations. For example, columns 8-11 in Row F are available in the search results bit vector 710, columns 8-10 are available in the second search results bit vector 712, columns 8-9 are available in the third search results bit vector 714, and only column 8 is available in the fourth search results bit vector 716.

The system 100 may select available bits in the search results bit vectors that satisfy the search query using various techniques. For example, the system 100 may select the first bit having the first binary value (e.g., 1), moving from a front row to a back row in the search results bit vector. However, selecting the first available bit may result in fragmentation of the remaining available seat locations, which is inefficient and may result in unsold seat locations. For example, selecting a group of seat locations in the middle of a row of available seat locations may result in fragmented available seat locations, limiting future groups of seat locations. Therefore, the system 100 may optimize the selection of available seat locations from the search results bit vectors by identifying the available seat locations adjacent to an aisle and/or unavailable seat location, as discussed in greater detail below with regard to FIGS. 8A-11B.

Additionally or alternatively, the system 100 may optimize the selection of available seat locations from the search results bit vectors by avoiding separating groups of available seat locations and/or stranding individual seat locations, as discussed in greater detail below with regard to FIGS. 12A-12C. Thus, the system 100 may perform an optimization technique to avoid selecting n seat locations from a group of n+1 available seat locations, which would result in a single available seat location. For example, the system 100 may receive a request for three seat locations and may select seats 12-14 in Row F (e.g., columns 14-16 in search results bit vector 710) instead of selecting any of seats 1-4 in Rows A-F, as reserving three seat locations in columns 1-4 of the search results bit vector 710 would result in a single available seat location that is not adjacent to other available seat locations.

Figure 8A:
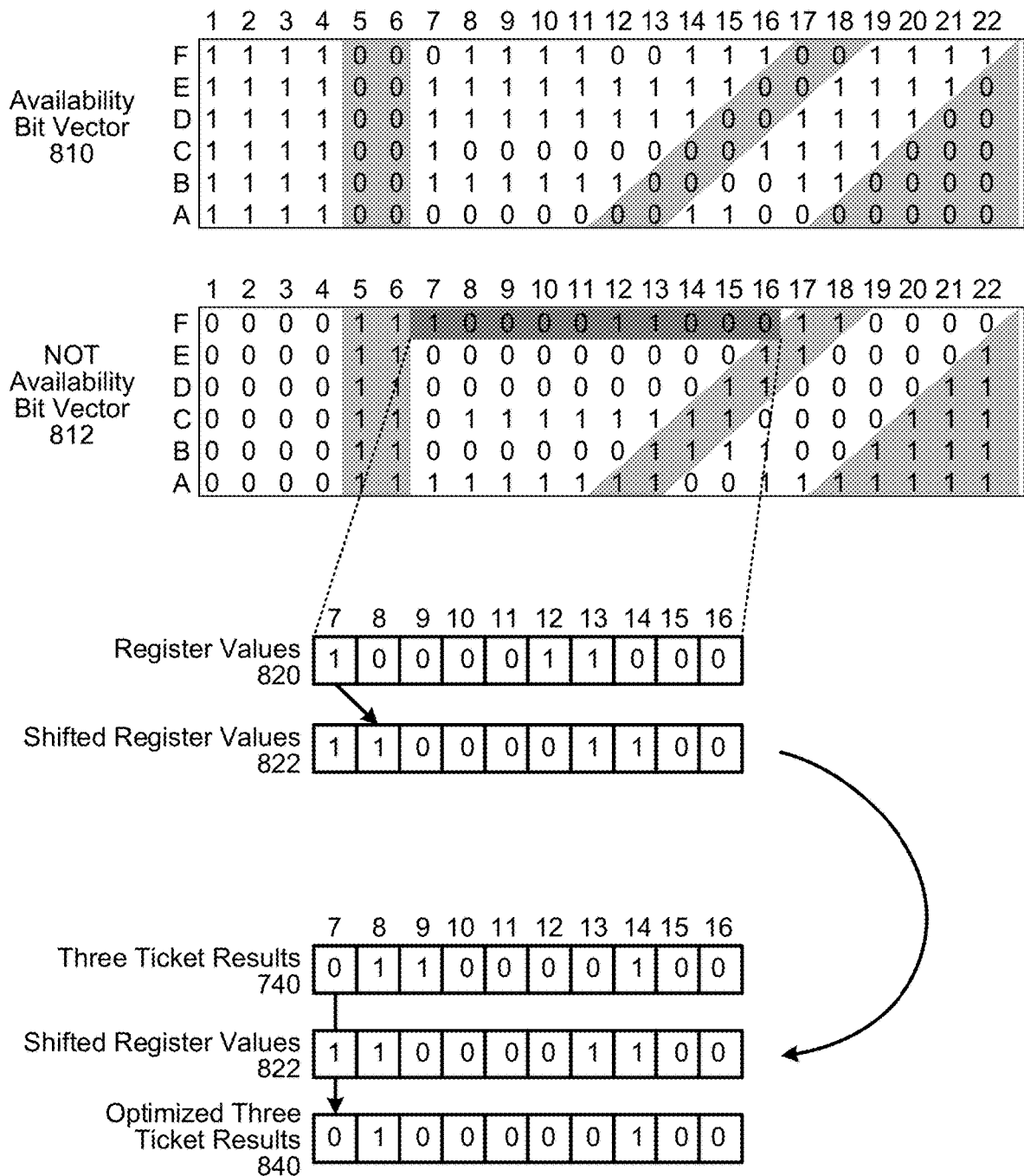

FIGS. 8A-8B illustrate examples of an optimization technique that selects bits adjacent to unavailable bits on the left according to examples of the present disclosure. As the system 100 generated the three ticket results 740 using shift operations in the first direction (e.g., to the left), each bit in the three ticket results 740 indicates whether a corresponding seat location and two adjacent seat locations in the second direction (e.g., to the right) are available in the search results bit vector 710. Thus, to identify the available seat locations that are adjacent to unavailable seat locations on the left, the system 100 may perform a single right shift operation.

As illustrated in FIG. 8A, the system 100 may determine an availability bit vector 810 indicating the available seat locations and may generate a NOT availability bit vector 812 indicating the unavailable seat locations by taking an inverse of the availability bit vector 810. For ease of illustration, FIG. 8A illustrates the system 100 storing columns 7-16 of a top row of the NOT availability bit vector 812 (e.g., Seats 5-14 in Row F) in the register as register values 820. However, the disclosure is not limited thereto and the system 100 may store any portion and/or an entirety of the NOT availability bit vector 812 without departing from the present disclosure.

As illustrated in FIG. 8A, the system 100 may determine that available seat locations are adjacent to an unavailable seat location by performing a single shift operation. For example, the system 100 may perform a right shift operation on the register values 820 to generate shifted register values 822. The system 100 may perform an AND operation on the three ticket results 740 and the shifted register values 822 to generate optimized three ticket results 840. Thus, each bit in the optimized three ticket results 840 indicates whether a corresponding seat location and two adjacent seat locations in the second direction (e.g., to the right) are available and a seat location in the first direction (e.g., to the left) is unavailable. Thus, column 8 has a first binary value (e.g., 1) indicating that seats 6-8 (e.g., columns 8-10) are available and adjacent to unavailable seat 5 (e.g., column 7). However, while seats 7-10 (e.g., columns 9-11) are available, the optimized three ticket results 840 include the second binary value for column 9 as seat 7 is adjacent to seat 6, which is available. Therefore, the optimized three ticket results 840 only show seat locations that satisfy the search query and are to the right of an unavailable seat location.

To clearly illustrate the results of performing the optimization technique illustrated in FIG. 8A, FIG. 8B illustrates the search results bit vector 710 (e.g., reserving one seat location), a second optimized search results bit vector 812 (e.g., reserving two seat locations), a third optimized search results bit vector 814 (e.g., reserving three seat locations) and a fourth optimized search results bit vector 816 (e.g., reserving four seat locations). As illustrated in FIG. 8B, the optimization technique selects left-most available seat locations in a group of available seat locations, such as seats on an aisle.

FIGS. 9A-9B illustrate examples of an optimization technique that selects bits adjacent to unavailable bits on the right according to examples of the present disclosure. As the system 100 generated the three ticket results 740 using shift operations in the first direction (e.g., to the left), each bit in the three ticket results 740 indicates whether a corresponding seat location and two adjacent seat locations in the second direction (e.g., to the right) are available in the search results bit vector 710. Thus, to identify the available seat locations that are adjacent to unavailable seat locations on the right, the system 100 may perform a n left shift operations.

As illustrated in FIG. 9A, the system 100 may determine the availability bit vector 810 indicating the available seat locations and may generate the NOT availability bit vector 812 indicating the unavailable seat locations by taking an inverse of the availability bit vector 810. For ease of illustration, FIG. 8A illustrates the system 100 storing columns 7-16 of a top row of the NOT availability bit vector 812 (e.g., Seats 5-14 in Row F) in the register as register values 920. However, the disclosure is not limited thereto and the system 100 may store any portion and/or an entirety of the NOT availability bit vector 812 without departing from the present disclosure.

As illustrated in FIG. 9A, the system 100 may determine that available seat locations are adjacent to an unavailable seat location by performing n shift operations (e.g., three shift operations when reserving three seat locations). For example, the system 100 may perform a first left shift operation on the register values 920 to generate first shifted register values 922, a second left shift operation on the first shifted register values 922 to generate second shifted register values 924, and a third left shift operation on the second register values 924 to generate third shifted register values 926. The system 100 may perform an AND operation on the three ticket results 740 and the third shifted register values 926 to generate optimized three ticket results 940. Thus, each bit in the optimized three ticket results 940 indicates whether a corresponding seat location and two adjacent seat locations in the second direction (e.g., to the right) are available and followed by an unavailable seat location. Thus, column 9 has a first binary value (e.g., 1) indicating that seats 7-9 (e.g., columns 9-11) are available and adjacent to unavailable seat 10 (e.g., column 12). However, while seats 6-9 (e.g., columns 8-10) are available, the optimized three ticket results 940 include the second binary value for column 8 as seat 9 is adjacent to seat 10, which is available. Therefore, the optimized three ticket results 940 only show seat locations that satisfy the search query and are to the left of an unavailable seat location.

To clearly illustrate the results of performing the optimization technique illustrated in FIG. 9A, FIG. 9B illustrates the search results bit vector 710 (e.g., reserving one seat location), a second optimized search results bit vector 912 (e.g., reserving two seat locations), a third optimized search results bit vector 914 (e.g., reserving three seat locations) and a fourth optimized search results bit vector 916 (e.g., reserving four seat locations). As illustrated in FIG. 9B, the optimization technique selects right-most available seat locations in a group of available seat locations, such as seats on an aisle.

FIGS. 10A-10B illustrate examples of an optimization technique that selects bits adjacent to unavailable bits on either the left or the right according to examples of the present disclosure. As illustrated in FIG. 10A, the system 100 may generate the shifted register values 822 and the third shifted register values 926 and may perform an OR operation to generate OR results 1020. The system 100 may then perform an AND operation on the three ticket results 740 and the OR results 1020 to generate optimized three ticket results 1040. Thus, each bit in the optimized three ticket results 1040 indicates whether three seat locations, beginning with a corresponding seat location and including two adjacent seat locations in the second direction (e.g., to the right), are available and adjacent to an unavailable seat location (e.g., on either the left or the right of the three seat locations).

To clearly illustrate the results of performing the optimization technique illustrated in FIG. 10A, FIG. 10B illustrates the search results bit vector 710 (e.g., reserving one seat location), a second optimized search results bit vector 1012 (e.g., reserving two seat locations), a third optimized search results bit vector 1014 (e.g., reserving three seat locations) and a fourth optimized search results bit vector 1016 (e.g., reserving four seat locations). As illustrated in FIG. 10B, the optimization technique selects left-most and right-most available seat locations in a group of available seat locations.

Figure 11A:
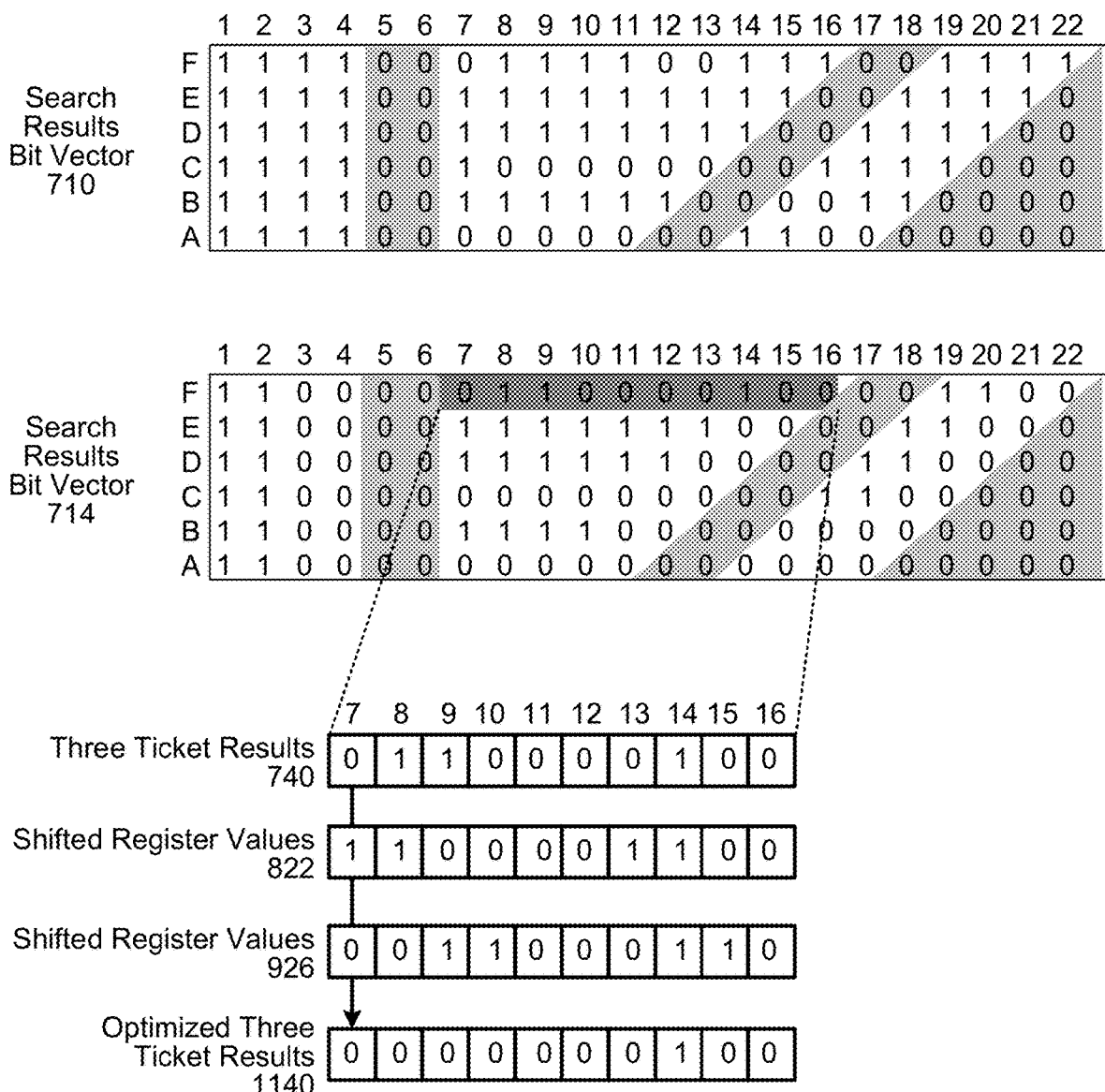

FIGS. 11A-11B illustrate examples of an optimization technique that selects bits adjacent to unavailable bits on both the left and the right according to examples of the present disclosure. In contrast to the FIGS. 10A-10B, which illustrate selecting a group of available seat locations adjacent to an unavailable seat location on either the left or the right, FIGS. 11A-11B illustrate selecting a group of available seat locations adjacent to unavailable seats on both the left and the right. Thus, the group of available seat locations are bordered on either side by unavailable seats. This optimization technique is beneficial as a first pass through the search results bit vector, as it identifies the exact size of available seat locations needed to satisfy the search query, but may not generate any results if there are a large block of available seat locations. Thus, this optimization technique is useful when performed in addition to other optimization techniques, instead of in place of other optimization techniques.

As illustrated in FIG. 11A, the system 100 may generate the shifted register values 822 and the third shifted register values 926 and may perform an AND operation on the three ticket results 740, the shifted register values 822 and the third shifted register values 926 to generate optimized three ticket results 1140. Thus, each bit in the optimized three ticket results 1140 indicates whether three seat locations, beginning with a corresponding seat location and including two adjacent seat locations in the second direction (e.g., to the right), are available and adjacent to an unavailable seat location on both the left and the right. For example, column 14 in Row F of the search results bit vector 714 has the first binary value, indicating that a group of three available seat locations (e.g., columns 14-16) are adjacent to unavailable seat locations on either side (e.g., column 13 and column 17).

To clearly illustrate the results of performing the optimization technique illustrated in FIG. 11A, FIG. 11B illustrates the search results bit vector 710 (e.g., reserving one seat location), a second optimized search results bit vector 1112 (e.g., reserving two seat locations), a third optimized search results bit vector 1114 (e.g., reserving three seat locations) and a fourth optimized search results bit vector 1116 (e.g., reserving four seat locations). As illustrated in FIG. 11B, the optimization technique selects a group of available seat locations that are equal to the number of seat locations to reserve indicated in the search query.

While FIGS. 8A-11B illustrate examples of optimization techniques that select available seats that are adjacent to unavailable seats, the system 100 may also optimize the selection of available seat locations from the search results bit vectors by avoiding separating groups of available seat locations and/or stranding individual seat locations. Thus, the system 100 may perform an optimization technique to avoid selecting n seat locations from a group of n+1 available seat locations, which would result in a single available seat location. For example, the system 100 may receive a request for three seat locations and may select seats 12-14 in Row F (e.g., columns 14-16 in search results bit vector 710) instead of selecting any of seats 1-4 in Rows A-F, as reserving three seat locations in columns 1-4 of the search results bit vector 710 would result in a single available seat location that is not adjacent to other available seat locations.

Figure 12A:
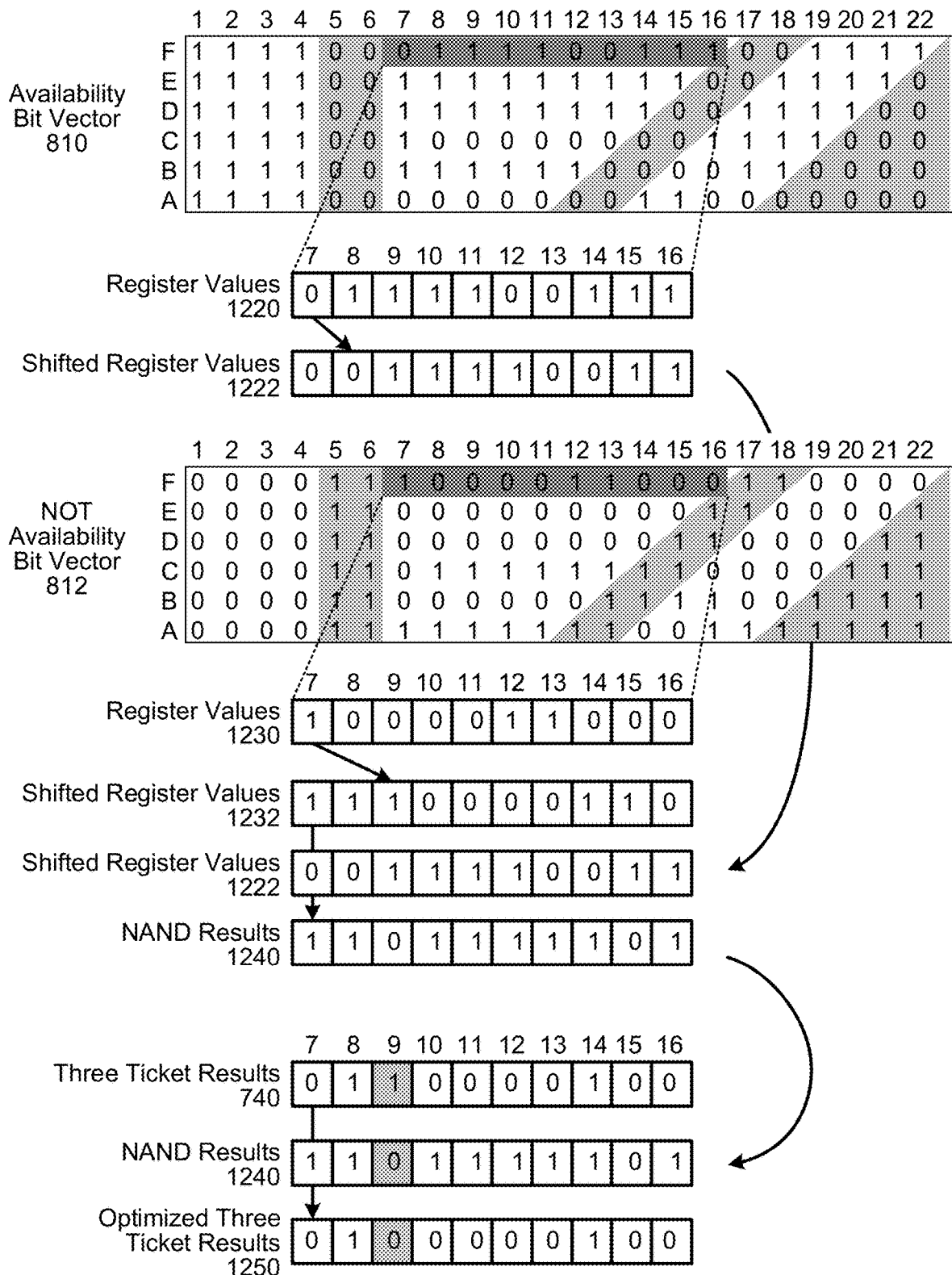
Figure 12B:
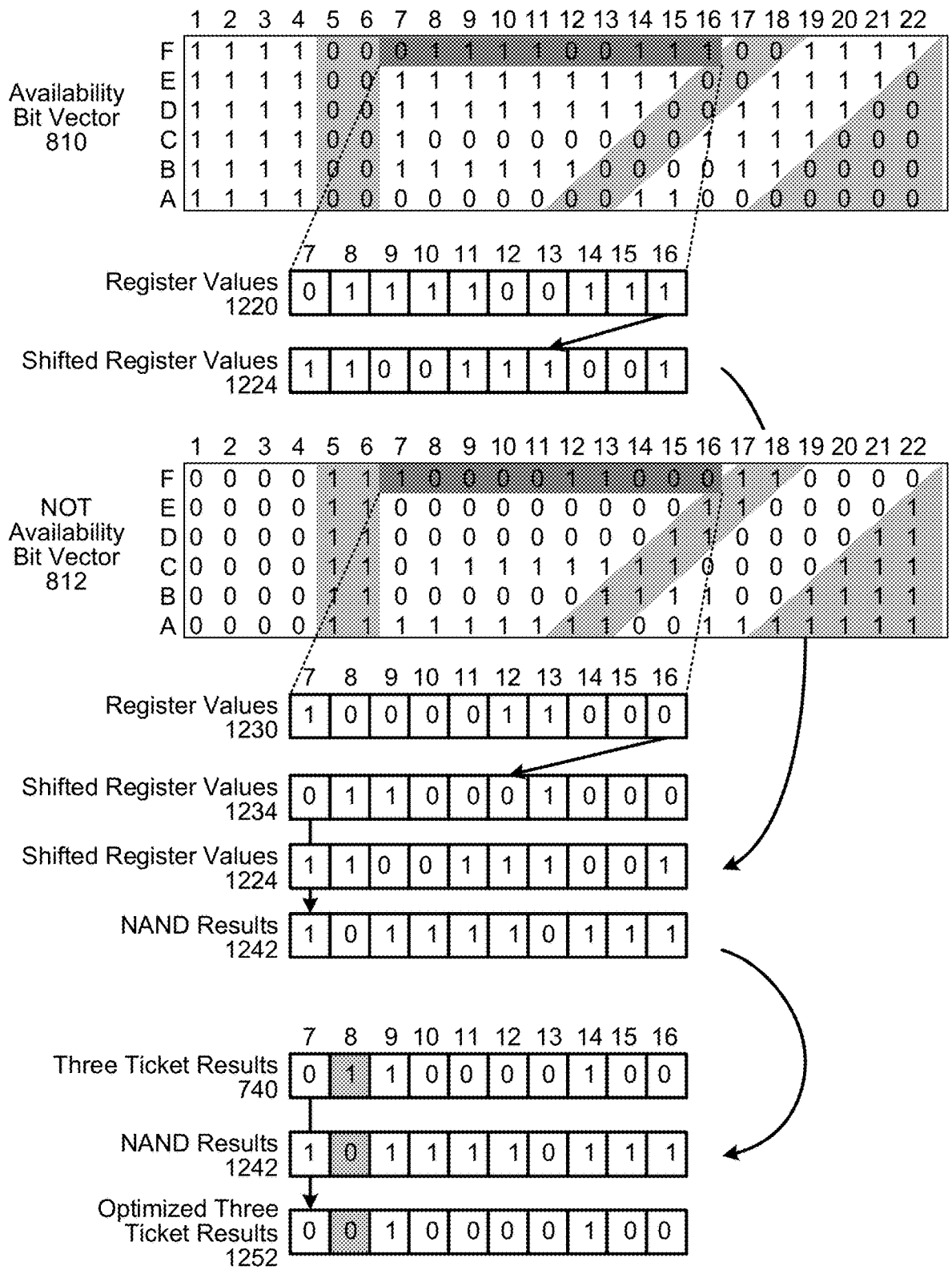

FIGS. 12A-12C illustrate examples of an optimization technique that selects bits to avoid stranding individual available bits according to examples of the present disclosure. FIG. 12A illustrates a first optimization technique to avoid stranding a single available seat location to the left of selected seat locations, whereas FIG. 12B illustrates a second optimization technique to avoid stranding a single available seat location to the right of selected seat locations.

As illustrated in FIG. 12A, the system 100 may determine the availability bit vector 810 indicating the available seat locations and may generate the NOT availability bit vector 812 indicating the unavailable seat locations by taking an inverse of the availability bit vector 810. For ease of illustration, FIG. 12A illustrates the system 100 storing columns 7-16 of a top row (e.g., Seats 5-14 in Row F) of the availability bit vector 810 as first register values 1220 and storing columns 7-16 of a top row (e.g., Seats 5-14 in Row F) of the NOT availability bit vector 812 as second register values 1230. However, the disclosure is not limited thereto and the system 100 may store any portion and/or an entirety of the availability bit vector 810 and/or the NOT availability bit vector 812 without departing from the present disclosure.

The system 100 may perform a single right shift operation on the first register values 1220 to generate first shifted register values 1222. The system 100 may perform two right shift operations on the second register values 1230 to generate second shifted register values 1232. For example, a value of a first bit location in the second register values 1230 may be equal to a value of a second bit location in the second shifted register values 1232, the second bit location offset from the first bit location by two.

The system 100 may then perform a NAND operation on the first shifted values 1222 and the second shifted values 1232 to generate first NAND results 1240. Thus, bit locations in the first NAND results 1240 that correspond to the first binary value in both the first shifted values 1222 and the second shifted values 1232 may have the second binary value, and all remaining bit locations may have the first binary value. The system 100 may use the first NAND results 1240 to remove bit locations from the search results that would result in stranding a single available seat location to the left of the selected seat locations. As an example, the system 100 may perform an AND operation using the three ticket results 740 and the first NAND results 1240 to generate optimized three ticket results 1250 that do not strand single available seat locations to the left. For example, column 9 of the three ticket results 740 has the first binary value, indicating that columns 9-11 are available, but column 9 of the optimized three ticket results 1250 has the second binary value as selecting columns 9-11 would strand column 8, which is an available seat location to the left.

As illustrated in FIG. 12B, the system 100 may determine the availability bit vector 810 indicating the available seat locations and may generate the NOT availability bit vector 812 indicating the unavailable seat locations by taking an inverse of the availability bit vector 810. The system 100 may perform a first number (e.g., n) of left shift operations on the first register values 1220 to generate third shifted register values 1224. For example, a value of a first bit location in the first register values 1220 may be equal to a value of a second bit location in the third shifted register values 1234, the second bit location offset from the first bit location by three. The system 100 may perform a second number (e.g., n+1) of left shift operations on the second register values 1230 to generate fourth shifted register values 1234. For example, a value of a first bit location in the second register values 1230 may be equal to a value of a second bit location in the fourth shifted register values 1234, the second bit location offset from the first bit location by four.

The system 100 may then perform a NAND operation on the third shifted values 1224 and the fourth shifted values 1234 to generate second NAND results 1242. Thus, bit locations in the second NAND results 1242 that correspond to the first binary value in both the third shifted values 1224 and the fourth shifted values 1234 may have the second binary value, and all remaining bit locations may have the first binary value. The system 100 may use the second NAND results 1242 to remove bit locations from the search results that would result in stranding a single available seat location to the right of the selected seat locations. As an example, the system 100 may perform an AND operation using the three ticket results 740 and the second NAND results 1242 to generate optimized three ticket results 1252 that do not strand single available seat locations to the right. For example, column 8 of the three ticket results 740 has the first binary value, indicating that columns 8-10 are available, but column 8 of the optimized three ticket results 1252 has the second binary value as selecting columns 8-10 would strand column 11, which is an available seat location to the right.

To clearly illustrate the results of performing the optimization techniques illustrated in FIGS. 12A-12B, FIG. 12C illustrates the search results bit vector 710 (e.g., reserving one seat location), a second optimized search results bit vector 1212 (e.g., reserving two seat locations), a third optimized search results bit vector 1214 (e.g., reserving three seat locations) and a fourth optimized search results bit vector 1216 (e.g., reserving four seat locations). As illustrated in FIG. 12C, the optimization techniques selects a group of available seat locations from a group of available seat locations without stranding single available seat locations. For example, if the number of seat locations to reserve indicated in the search query is n, the system 100 may select available seat locations from a group of n available seat locations or a group of n+2 available seat locations, but would not select from a group of n+1 available seat locations and/or select the seat locations to leave an isolated available seat location.

While FIGS. 12A-12C illustrate examples of avoiding stranding a single available seat location, the disclosure is not limited thereto and the system 100 may perform the optimization techniques illustrated in FIG. 12A-12C to avoid stranding any number of seat locations without departing from the disclosure. For example, the system 100 may perform similar optimization techniques in order to avoid leaving three available seat locations. Additionally or alternatively, the system 100 may combine optimization techniques to avoid leaving odd available seat locations or the like. In some examples, the system 100 may perform the optimization techniques as a first pass and, if no available seats satisfy the search query, may perform less strict optimization techniques to identify available seat locations that satisfy the search query.

FIGS. 13A-13B are communication diagrams conceptually illustrating example methods for reserving seat locations according to examples of the present disclosure. As illustrated in FIG. 13A, the server(s) 120 may map (130) a seat chart to a bit vector and may determine (132) bit vector(s) for attributes associated with the seat locations, as discussed above with regard to FIG. 1.

The device 110 may receive (134) a search query indicating a number of tickets and/or desired attributes associated with the tickets and may send (1310) the search query to the server(s) 120. For example, the device 110 may send the search query itself or may send the number of tickets and/or the desired attributes to the server(s) 120.

The server(s) 120 may select (136) bit vector(s) corresponding to the search query, may determine (138) a search bit vector by combining the bit vector(s), may compare (140) the search bit vector to an availability bit vector to determine a search results bit vector, may select (142) bits in the search results bit vector that satisfy the search query and the number of tickets, may change (144) bit values for the selected bits in the availability bit vector to reserve the tickets, may determine (146) seat locations corresponding to the selected bits and may send (148) an indication of the seat locations and/or attributes associated with the seat locations to the device 110, as discussed above with regard to FIG. 1. The device 110 may display (1312) the seat locations and attributes associated with the seat locations.

In some examples, however, the server(s) 120 may send an indication of the seat locations to the device 110 and the device 110 may determine the attributes associated with the seat locations. For example, the server(s) 120 may send the bit vector(s) for attributes associated with seat locations before reserving the seat locations (e.g., before receiving the search query and/or in response to receiving the search query). Thus, after reserving the seat locations, the server(s) 120 may send a bit vector indicating the selected bits and the device 110 may receive the bit vector, determine the seat locations corresponding to the selected bits and/or determine the attributes associated with the seat locations using the bit vector(s).

As illustrated in FIG. 13B, the server(s) 120 may map (130) the seat chart to the bit vector and may determine (132) the bit vector(s) for attributes associated with the seat locations, as discussed above with regard to FIG. 1. The server(s) 120 may then send (1350) the bit vector(s) to the device 110.

The device 110 may receive (134) the search query indicating the number of tickets and/or the desired attributes associated with the tickets, may select (136) bit vector(s) corresponding to the search query, may determine (138) a search bit vector by combining the bit vector(s), and may send (1352) the search bit vector to the server(s) 120.

The server(s) 120 may compare (140) the search bit vector to an availability bit vector to determine a search results bit vector, may select (142) bits in the search results bit vector that satisfy the search query and the number of tickets, may change (144) bit values for the selected bits in the availability bit vector to reserve the tickets, and may send (1354) an indication of the selected bits to the device 110.

The device 110 may determine (146) seat locations corresponding to the selected bits and display (1356) the seat locations and attributes associated with the seat locations.

Figure 14:
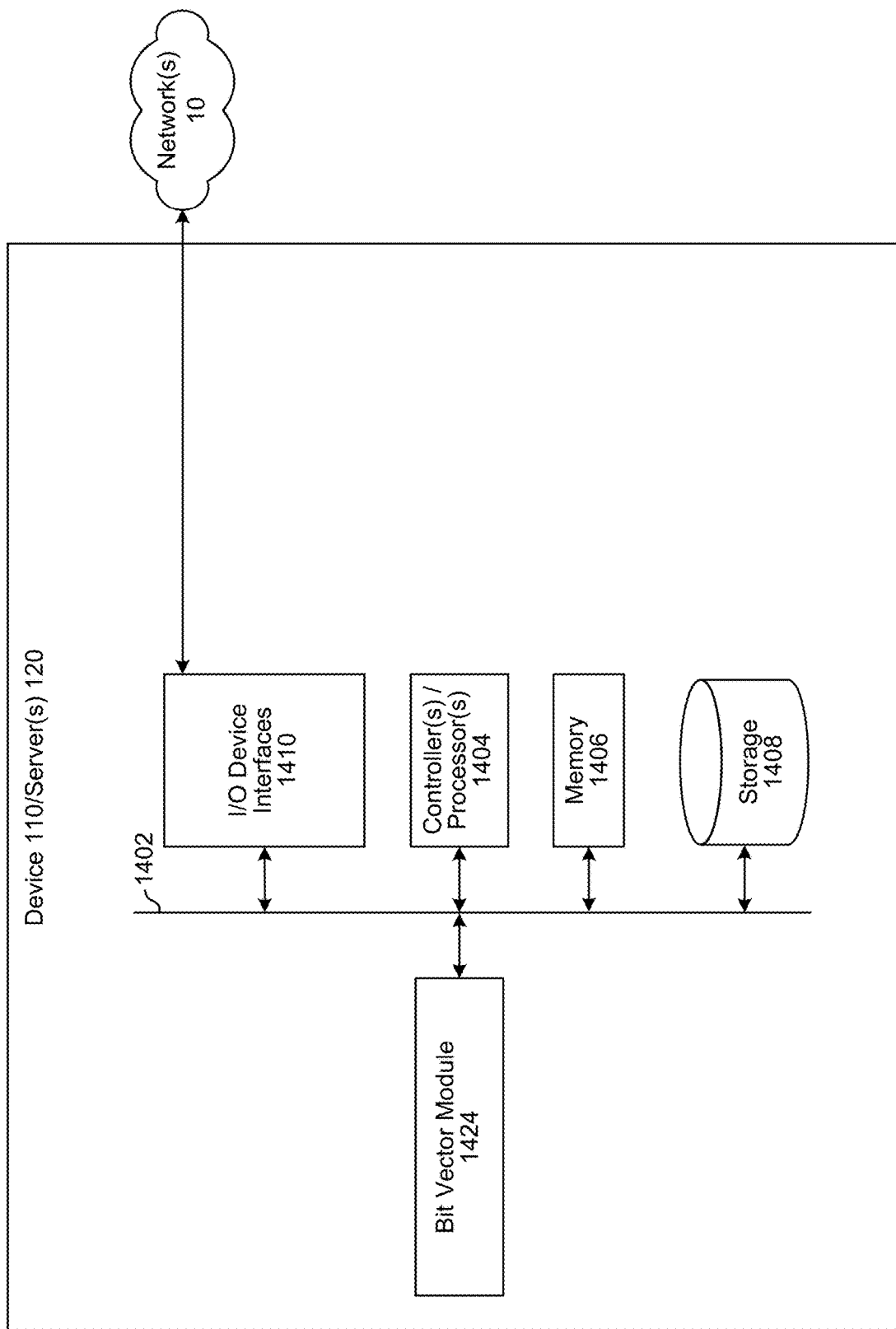
FIG. 14 is a block diagram conceptually illustrating example components of a system for sound zone reproduction according to embodiments of the present disclosure.

FIG. 14 is a block diagram conceptually illustrating example components of a system for reserving items using bit vectors according to embodiments of the present disclosure. In operation, the system 100 may include computer-readable and computer-executable instructions that reside on the device 110 and/or the server(s) 120, as will be discussed further below. The device 110/server(s) 120 may be an electronic device capable of receiving input from a user, such as a search query, using bit vectors to identify available items and reserving items by changing values of an availability bit vector. Examples of electronic devices may include computers (e.g., a desktop, a laptop, a server or the like), portable devices (e.g., smart phone, tablet or the like), media devices (e.g., televisions, video game consoles, or the like) or the like. The device 110/server(s) 120 may also be a component of any of the abovementioned devices or systems.

As illustrated in FIG. 14, the device 110/server(s) 120 may include an address/data bus 1402 for conveying data among components of the device 110/server(s) 120. Each component within the device 110/server(s) 120 may also be directly connected to other components in addition to (or instead of) being connected to other components across the bus 1402.

The device 110/server(s) 120 may include one or more controllers/processors 1404, that may each include a central processing unit (CPU) for processing data and computer-readable instructions, and a memory 1406 for storing data and instructions. The memory 1406 may include volatile random access memory (RAM), non-volatile read only memory (ROM), non-volatile magnetoresistive (MRAM) and/or other types of memory. The device 110/server(s) 120 may also include a data storage component 1408, for storing data and controller/processor-executable instructions (e.g., instructions to perform the algorithms illustrated in FIGS. 1, 13A and/or 13B). The data storage component 1408 may include one or more non-volatile storage types such as magnetic storage, optical storage, solid-state storage, etc. The device 110/server(s) 120 may also be connected to removable or external non-volatile memory and/or storage (such as a removable memory card, memory key drive, networked storage, etc.) through the input/output device interfaces 1410.

The device 110/server(s) 120 includes input/output device interfaces 1410. A variety of components may be connected through the input/output device interfaces 1410, such as microphone(s) (not shown), speakers (not shown), a display (not shown), and/or input devices (not shown) connected to the device 110/server(s) 120. In some examples, the device 110/server(s) 120 may include an inertial measurement unit (IMU), gyroscope, accelerometers or other component configured to provide motion data or the like associated with the device 110/server(s) 120. If an array of microphones is included, approximate distance to a sound's point of origin may be performed acoustic localization based on time and amplitude differences between sounds captured by different microphones of the array.

The input/output device interfaces 1410 may be configured to operate with network(s) 10, for example wired networks such as a wired local area network (LAN), and/or wireless networks such as a wireless local area network (WLAN) (such as WiFi), Bluetooth, ZigBee, a Long Term Evolution (LTE) network, WiMAX network, 3G network, etc. The network(s) 10 may include a local or private network or may include a wide network such as the internet. Devices may be connected to the network(s) 10 through either wired or wireless connections.

The input/output device interfaces 1410 may also include an interface for an external peripheral device connection such as universal serial bus (USB), FireWire, Thunderbolt, Ethernet port or other connection protocol that may connect to network(s) 10. The input/output device interfaces 1410 may also include a connection to an antenna (not shown) to connect one or more network(s) 10 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The device 110/server(s) 120 further includes a bit vector module 1424, which may comprise processor-executable instructions stored in storage 1408 to be executed by controller(s)/processor(s) 1404 (e.g., software, firmware, hardware, or some combination thereof). For example, components of the bit vector module 1424 may be part of a software application running in the foreground and/or background on the device 110/server(s) 120. The bit vector module 1424 may control the device 110/server(s) 120 as discussed above, for example with regard to FIGS. 1, 13A and/or 13B. Some or all of the controllers/modules of the bit vector module 1424 may be executable instructions that may be embedded in hardware or firmware in addition to, or instead of, software. In one embodiment, the device 110/server(s) 120 may operate using an Android operating system (such as Android 4.3 Jelly Bean, Android 4.4 KitKat or the like), an Amazon operating system (such as FireOS or the like), or any other suitable operating system.

Executable computer instructions for operating the device 110/server(s) 120 and its various components may be executed by the controller(s)/processor(s) 1404, using the memory 1406 as temporary "working" storage at runtime. The executable instructions may be stored in a non-transitory manner in non-volatile memory 1406, storage 1408, or an external device. Alternatively, some or all of the executable instructions may be embedded in hardware or firmware in addition to or instead of software.

The components of the device 110/server(s) 120, as illustrated in FIG. 14, are exemplary, and may be located a stand-alone device or may be included, in whole or in part, as a component of a larger device or system.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, video capturing devices, video game consoles, speech processing systems, distributed computing environments, etc. Thus the modules, components and/or processes described above may be combined or rearranged without departing from the scope of the present disclosure. The functionality of any module described above may be allocated among multiple modules, or combined with a different module. As discussed above, any or all of the modules may be embodied in one or more general-purpose microprocessors, or in one or more special-purpose digital signal processors or other dedicated microprocessing hardware. One or more modules may also be embodied in software implemented by a processing unit. Further, one or more of the modules may be omitted from the processes entirely.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for reserving seats at a concert, the method comprising:
    receiving an availability bit vector corresponding to seat locations at a concert, a first bit location in the availability bit vector corresponding to a first seat location, a value of the first bit location in the availability bit vector indicating whether the first seat location is available;
    receiving a search query indicating a first number of seat locations to reserve and one or more search constraints, the one or more search constraints corresponding to attributes of the seat locations;
    determining one or more constraint bit vectors corresponding to the one or more search constraints, the one or more constraint bit vectors including a first constraint bit vector, a first bit location in the first constraint bit vector corresponding to the first seat location, a value of the first bit location in the first constraint bit vector indicating whether the first seat location is associated with a first attribute;
    determining a search bit vector based on the availability bit vector and the one or more constraint bit vectors;

determining a sequence of bits in the search bit vector that satisfy the search query, a length of the sequence of bits corresponding to the first number of seat locations;

determining a first bit location in the search bit vector that corresponds to a first bit in the sequence of bits;

determining, based on the first bit location in the search bit vector, a second seat location;

determining a second bit location in the search bit vector that corresponds to a second bit in the sequence of bits;

determining, based on the second bit location in the search bit vector, a third seat location; and reserving a plurality of seat locations corresponding to the sequence of bits, the plurality of seat locations including the second seat location and the third seat location.

2. The computer-implemented method of claim 1, further comprising:

determining, based on the first bit location in the search bit vector, a second bit location in the availability bit vector, the second bit location in the availability bit vector corresponding to the second seat location;

changing a value of the second bit location in the availability bit vector from a first binary value to a second binary value, the second binary value indicating that the second seat location is not available;

determining an updated availability bit vector, the updated availability bit vector reserving the plurality of seat locations;

receiving a second search query indicating a second number of seat locations to reserve and one or more second search constraints;

determining one or more second constraint bit vectors corresponding to the one or more second search constraints;

determining a second search bit vector based on the updated availability bit vector and the one or more second constraint bit vectors;

determining a second sequence of bits in the second search bit vector that satisfy the second search query, a length of the second sequence of bits corresponding to the second number of seat locations;

reserving a second plurality of seat locations corresponding to the second sequence of bits.

3. The computer-implemented method of claim 1, further comprising:

receiving, prior to receiving the availability bit vector, the first constraint bit vector;

receiving a second constraint bit vector, a first bit location in the second constraint bit vector corresponding to the first seat location, a value of the first bit location in the second constraint bit vector indicating whether the first seat location is associated with a second attribute;

determining that the search query indicates the first attribute;

determining that the search query indicates the second attribute; and determining the search bit vector based on the availability bit vector, the first constraint bit vector and the second constraint bit vector, a first binary value of the first bit location in the search bit vector indicating that the second seat location is associated with the first attribute and the second attribute and is available.

4. The computer-implemented method of claim 1, wherein the determining the sequence of bits further comprises:

storing at least a portion of the search bit vector in a register as first register values;

performing a first shift operation on the register to generate second register values, the first shift operation shifting bits in the register in a first direction such that a value of a first bit location in the register replaces a value of a second bit location in the register, the second bit location adjacent to the first bit location in the first direction;

performing a second shift operation on the register to generate third register values, the second shift operation shifting bits in the register in the first direction such that a value of the first bit location in the register replaces a value of the second bit location in the register;

performing, using the first register values, the second register values and the third register values, a bitwise AND operation to generate fourth register values;

selecting a first bit location in the fourth register values that has a first binary value, the first binary value indicating that the first bit location in each of the first register values, the second register values and the third register values have the first binary value; and determining, using the first bit location in the fourth register values, the sequence of bits, the first bit location in the fourth register values corresponding to the first bit location in the search bit vector.

5. A computer-implemented method, comprising:

receiving a first bit vector corresponding to a plurality of items, a first bit location in the first bit vector corresponding to a first item of the plurality of items, a value of the first bit location in the first bit vector indicating whether the first item is available;

receiving a search query indicating at least a first number of items to purchase and one or more search constraints, the one or more search constraints indicating attributes associated with the plurality of items;

determining one or more constraint bit vectors corresponding to the one or more search constraints;

determining a second bit vector based on the first bit vector and the one or more constraint bit vectors, a first bit location in the second bit vector corresponding to the first item, a value of the first bit location in the second bit vector indicating whether the first item satisfies the search query and is available;

determining a plurality of bits in the second bit vector that satisfy the search query, a number of the plurality of bits corresponding to the first number of items; and reserving first items corresponding to the plurality of bits.

6. The computer-implemented method of claim 5, further comprising:

determining a first bit location in the second bit vector that corresponds to a first bit in the plurality of bits;

determining, based on the first bit location in the second bit vector, a second item of the plurality of items; and reserving the first items, the first items including the second item.

7. The computer-implemented method of claim 5, further comprising:

selecting a first bit in the plurality of bits;

determining a first bit location in the second bit vector that corresponds to the first bit in the plurality of bits;

determining, based on the first bit location in the second bit vector, a second item of the plurality of items, the second item corresponding to a first seat location in a venue;

selecting a second bit in the plurality of bits, the second bit contiguous to the first bit;

determining a second bit location in the second bit vector that corresponds to the second bit in the plurality of bits;

determining, based on the second bit location in the second bit vector, a third item of the plurality of items, the third item corresponding to a second seat location in the venue that is adjacent to the first seat location; and reserving the first seat location and the second seat location.

8. The computer-implemented method of claim 5, further comprising:

receiving a first constraint bit vector, a first bit location in the first constraint bit vector corresponding to the first item, a value of the first bit location in the first constraint bit vector indicating whether the first item is associated with a first attribute; and receiving a second constraint bit vector, a first bit location in the second constraint bit vector corresponding to the first item, a value of the first bit location in the second constraint bit vector indicating whether the first item is associated with a second attribute.

9. The computer-implemented method of claim 8, further comprising:

determining that the one or more search constraints includes the first attribute;

determining that the one or more search constraints includes the second attribute;

determining the one or more constraint bit vectors, the one or more constraint bit vectors including the first constraint bit vector and the second constraint bit vector; and determining the second bit vector based on the first bit vector, the first constraint bit vector and the second constraint bit vector, a first bit location in the second bit vector corresponding to the first item, a first binary value of the first bit location in the second bit vector indicating that the first item is associated with the first attribute and the second attribute and is available.

10. The computer-implemented method of claim 5, further comprising:

storing at least a portion of the second bit vector in a register as first register values;

performing a shift operation on the register to generate second register values, the shift operation shifting bits in the register in a first direction such that a value of a second bit location in the register replaces a value of a first bit location in the register;

performing, using the first register values and the second register values, a bitwise AND operation to generate third register values;

selecting a first bit location in the third register values that has a first binary value, the first binary value indicating that the first bit location in the first register values and the second register values has the first binary value; and determining, based on the first bit location in the third register values, the plurality of bits.

11. The computer-implemented method of claim 5, wherein reserving the first items further comprises:

determining a first bit location in the second bit vector corresponding to a first bit in the plurality of bits;

determining, based on the first bit location in the second bit vector, a second bit location in the first bit vector, the second bit location in the first bit vector corresponding to a second item of the plurality of items; and changing a value of the second bit location in the first bit vector from a first binary value to a second binary value, the second binary value indicating that the second item is not available.

12. The computer-implemented method of claim 11, further comprising:

determining that the first items were not purchased within a duration of time; and changing the value of the second bit location in the first bit vector from the second binary value to the first binary value, the first binary value indicating that the second item is available.

13. The computer-implemented method of claim 5, further comprising:

receiving a third bit vector, a first bit location in the third bit vector corresponding to the first item, a value of the first bit location in the third bit vector indicating whether the first item is associated with a first attribute;

determining, based on the search query, a second number of items that must be associated with the first attribute;

generating a fourth bit vector based on the third bit vector, the first number of items and the second number of items, wherein the generating further comprises:

setting each respective bit in the fourth bit vector to a first binary value, the first binary value indicating that the respective bit is not associated with the first attribute;

determining a second plurality of bits in the third bit vector, a number of the second plurality of bits corresponding to the first number of items and including at least a second number of bits that are associated with a second binary value, the second number of bits corresponding to the second number of items;

determining a third plurality of bits in the fourth bit vector that correspond to the second plurality of bits; and setting a value of each of the third plurality of bits in the fourth bit vector to the second binary value.

14. The computer-implemented method of claim 5, further comprising:

receiving a first request to search for alternative items while still reserving the first items;

determining an updated first bit vector, the updated first bit vector reserving the first items;

determining an updated second bit vector based on the search query and the updated first bit vector;

determining a second plurality of bits in the updated second bit vector that satisfy the search query, a length of the second plurality of bits corresponding to the first number of items;

reserving second items corresponding to the second plurality of bits;

receiving a second request indicating one of the first items or the second items; and releasing, based on the second request, one of the first items or the second items.

15. A system, comprising:

at least one processor;

a memory device including instructions operable to be executed by the at least one processor to configure the system to:

receive a first bit vector corresponding to a plurality of items, a first bit location in the first bit vector corresponding to a first item of the plurality of items, a value of the first bit location in the first bit vector indicating whether the first item is available;

receive a search query indicating at least a first number of items to purchase and one or more search constraints, the one or more search constraints indicating attributes associated with the plurality of items;

determining one or more constraint bit vectors corresponding to the one or more search constraints;

determine a second bit vector based on the first bit vector and the one or more constraint bit vectors, a first bit location in the second bit vector corresponding to the first item, a value of the first bit location in the second bit vector indicating whether the first item satisfies the search query and is available;

determine a plurality of bits in the second bit vector that satisfy the search query, a number of the plurality of bits corresponding to the first number of items; and reserve first items corresponding to the plurality of bits.

16. The system of claim 15, wherein the instructions further configure the system to:

receive a first constraint bit vector, a first bit location in the first constraint bit vector corresponding to the first item, a value of the first bit location in the first constraint bit vector indicating whether the first item is associated with a first attribute;

receive a second constraint bit vector, a first bit location in the second constraint bit vector corresponding to the first item, a value of the first bit location in the second constraint bit vector indicating whether the first item is associated with a second attribute;

determine that the one or more search constraints includes the first attribute;

determine that the one or more search constraints includes the second attribute;

determine the one or more constraint bit vectors, the one or more constraint bit vectors including the first constraint bit vector and the second constraint bit vector; and determine the second bit vector based on the first bit vector, the first constraint bit vector and the second constraint bit vector, a first bit location in the second bit vector corresponding to the first item, a first binary value of the first bit location in the second bit vector indicating that the first item is associated with the first attribute and the second attribute and is available.

17. The system of claim 15, wherein the instructions further configure the system to:

determine a first bit location in the second bit vector corresponding to a first bit in the plurality of bits;

determine, based on the first bit location in the second bit vector, a second bit location in the first bit vector, the second bit location in the first bit vector corresponding to a second item of the plurality of items; and change a value of the second bit location in the first bit vector from a first binary value to a second binary value, the second binary value indicating that the second item is not available.

18. The system of claim 15, wherein the instructions further configure the system to:

receive a third bit vector, a first bit location in the third bit vector corresponding to the first item, a value of the first bit location in the third bit vector indicating whether the first item is associated with a first attribute;

determine, based on the search query, a second number of items that must be associated with the first attribute;

generate a fourth bit vector based on the third bit vector, the first number of items and the second number of items, wherein generating the fourth bit vector further comprises:

set each bit in the fourth bit vector to a first binary value, the first binary value indicating that the respective bit is not associated with the first attribute;

determine a second plurality of bits in the third bit vector, a number of the second plurality of bits corresponding to the first number of items and including at least a second number of bits that are associated with a second binary value, the second number of bits corresponding to the second number of items;

determine a third plurality of bits in the fourth bit vector that correspond to the second plurality of bits; and set a value of each of the third plurality of bits in the fourth bit vector to the second binary value.

19. The system of claim 15, wherein the instructions further configure the system to:

receive a first request to search for alternative items while still reserving the first items;

determine an updated first bit vector, the updated first bit vector reserving the first items;

determine an updated second bit vector based on the search query and the updated first bit vector;

determine a second plurality of bits in the updated second bit vector that satisfy the search query, a length of the second plurality of bits corresponding to the first number of items;

reserve second items corresponding to the second plurality of bits;

receive a second request indicating one of the first items or the second items; and release, based on the second request, one of the first items or the second items.

20. The system of claim 15, wherein the instructions further configure the system to:

store at least a portion of the second bit vector in a register as first register values;

perform a shift operation on the register to generate second register values, the shift operation shifting bits in the register in a first direction such that a value of a second bit location in the register replaces a value of a first bit location in the register;

perform, using the first register values and the second register values, a bitwise AND operation to generate third register values;

select a first bit location in the third register values that has a first binary value, the first binary value indicating that the first bit location in the first register values and the second register values has the first binary value; and determine, based on the first bit location in the third register values, the plurality of bits.

* * * * *